(12) United States Patent
De Groot et al.

(10) Patent No.: US 6,407,816 B1
(45) Date of Patent: Jun. 18, 2002

(54) INTERFEROMETER AND METHOD FOR MEASURING THE REFRACTIVE INDEX AND OPTICAL PATH LENGTH EFFECTS OF AIR

(75) Inventors: Peter De Groot, Middletown, CT (US); Henry A. Hill, Tucson, AZ (US); Frank C. Demarest, Middletown, CT (US)

(73) Assignee: Zygo Corporation, Middlefield, CT (US)

(*) Notice: Subject to any disclaimer, the term of this patent is extended or adjusted under 35 U.S.C. 154(b) by 0 days.

(21) Appl. No.: 09/736,034

(22) Filed: Dec. 13, 2000

Related U.S. Application Data

(60) Division of application No. 09/252,266, filed on Feb. 18, 1999, now Pat. No. 6,327,039, and a continuation-in-part of application No. 09/078,254, filed on May 13, 1998, now abandoned.
(60) Provisional application No. 60/075,586, filed on Feb. 23, 1998.

(51) Int. Cl.$^7$ ................................................ G01B 9/02
(52) U.S. Cl. ...................................... 356/517; 356/484
(58) Field of Search .......................... 356/517, 484–487, 356/491–493, 496, 498, 499

(56) References Cited

U.S. PATENT DOCUMENTS

| | | |
|---|---|---|
| 3,647,302 A | 3/1972 | Zipin et al. |
| 4,005,936 A | 2/1977 | Redman et al. |
| 4,688,940 A | 8/1987 | Sommargren et al. |
| 4,907,886 A | 3/1990 | Dandliker |
| 4,948,254 A | 8/1990 | Ishida |
| 5,404,222 A | 4/1995 | Lis |
| 5,537,209 A | 7/1996 | Lis |

OTHER PUBLICATIONS

Lis, Steven A., "An Air Turbulence Compensated Interferometer For IC Manufacturing," presented at the SPIE Conference on Optical/Laser Microlithography VIII, Feb. 24, 1995, Santa Monica, California.

Zanomi, R. Carl A., "Differential Interferometer Arrangements for Distance and Angle Measurements: Principles, Advantages and Applications", VDI Berichte, 1989, pp. 93–106.

(List continued on next page.)

*Primary Examiner*—Frank G. Font
*Assistant Examiner*—Amanda Merlin
(74) *Attorney, Agent, or Firm*—Francis J. Caufield

(57) ABSTRACT

Apparatus and methods particularly suitable for use in electro-optical metrology and other applications to measure and monitor the refractive index of a gas in a measurement path and/or the change in optical path length of the measurement path due to the gas while the refractive index of the gas may be fluctuating due to turbulence or the like and/or the physical length of the measuring path may be changing. More specifically, the invention employs electronic frequency processing to provide measurements of dispersion of the refractive index, the dispersion being substantially proportional to the density of the gas, and/or measurements of dispersion of the optical path length, the dispersion of the optical path length being related to the dispersion of the refractive index and the physical length of the measurement path. The refractive index of the gas and/or the optical path length effects of the gas are subsequently computed from the measured dispersion of the refractive index and/or the measured dispersion of the optical path length, respectively. The information generated by the inventive apparatus is particularly suitable for use in interferometric distance measuring instruments (DMI) to compensate for errors related to refractive index of gas in a measurement path brought about by environmental effects and turbulence induced by rapid stage slew rates.

8 Claims, 20 Drawing Sheets

OTHER PUBLICATIONS

Ishida, Akira, "Two–Wavelength Displacement–Measuring Interferometer Using Second–Harmonic Light to Eliminate Air–Turbulence–Induced Errors", Japanese Journal of Applied Physics, vol. 28(3), Mar. 1989, pp. 587–589.

Zhu, Yucong, et al., "Long–Arm Two–Color Intererometer for Measuring the Change of Air Refractive Index", SPIE, Optics in Complex Systems, vol. 1319, 1990, pp. 538–539.

Earnshaw, K.B., et al., Two–Laser Optical Distance–Measuring Instrument That Corrects for the Atmospheric Index of Refraction, Applied Optics, vol. 11, No. 4, Apr. 1972, pp. 749–754.

Hernandez, E.N., et al., "Field Tests of a Two–Laser (4416A and 6328A) Optical Distance–Measuring Instrument Correcting for the Atmospheric Index of Refraction ", Journal of Geophysical Research, vol. 77, No. 35, Dec. 10, 1972, pp. 6994–6998.

Dandliker, Rene, et al., "Two–Wavelength Laser Interferometry Using Superheterodyne Detection", Optics Letters, vol. 13, No. 5, May 1988, pp. 339–341.

Dandliker, Rene, et al., "High–Accuracy Distance Measurements With Multiple–Wavelength Interferometry", Optical Engineering, vol. 34, No. 8, Aug. 1995, pp. 2407–2412.

Sodnik, Zoran, et al., "Two–Wavelength Double Heterodyne Interferometry Using A Matched Grating Technique", Applied Optics, vol. 30, No. 22, Aug. 1, 1991, pp. 3139–3144.

Manhart, S., et al., "Diode Laser and Fiber Optics for Dual–Wavelength Heterodyne Interferometry", SPIE, Optics in Complex Systems, vol. 1319, 1990, pp. 214–216.

Jones, Frank E., "The Refractivity of Air", Journal of Research of the National Bureau of Standards, vol. 86, No. 1, Jan.–Feb. 1981, pp. 27–32.

Estler, W. Tyler, "High–Accuracy Displacement Interferometry in Air", Applied Optics, vol. 24, No. 6, Mar. 15, 1985, pp. 808–815.

Berg, Eduard, et al., "Distance Corrections for Single—and Dual–Color Lasers by Ray Tracing", Journal of Geophysical Research, vol. 85, No. B11, Nov. 10, 1980, pp. 6513–6520.

Slater, L.E., et al., "A Multiwavelength Distance–Measuring Instrument for Geophysical Experiments", Journal of Geophysical Research, vol. 81, No. 35, Dec. 10, 1976, pp. 6299–6306.

Erickson, Kent E., "Long–Path Interferometry Through an Uncontrolled Atmosphere", Journal of Optical Society of America, vol. 52, No. 7, Jul. 1962, pp. 781–787.

Bender, Peter L., et al., "Correction of Optical Distance Measurements for the Fluctuating Atmospheric Index of Refraction", Journal of Geophysical Research, vol. 70, No. 10, May 15, 1965, pp. 2461–2462.

Terrien, J., "An Air Refractometer For Interference Length Metrology", Bureau International des Poids et Mesures, France, vol. 1, No. 3, Mar. 1965, pp. 80–83.

Matsumoto, Hirokazu, et al., "Effects of the Atmosphere Phase Fluctuation on Long–Distance Measurement", Applied Optics, vol. 23, No. 19, Oct. 1, 1984, pp. 3388–3394.

Gibson, George N.,et al., "Optical Path Length Fluctuations in the Atmosphere", Applied Optics , vol. 23, No. 23, Dec. 1, 1984, pp. 4383–4389.

Bobroff, Norman "Residual Errors in Laser Interferometry From Air Turbulence and Nonlinearity", Applied Optics, vol. 26, No. 13, Jul. 1, 1987, pp. 2676–2682.

Bobroff, Norman, "Recent Advances in Displacement Measuring Interferometry", Measurement Science & Technology, vol. 4, No. 9, Sep. 1993, pp. 907–926.

INTERFEROMETER AND METHOD FOR MEASURING THE REFRACTIVE INDEX AND OPTICAL PATH LENGTH EFFECTS OF AIR

CROSS REFERENCE TO RELATED APPLICATIONS

This application is a divisional U.S. patent application Ser. No. 09/252,266 now U.S. Pat. No. 6,327,039, filed on Feb. 18, 1999, which, in turn, claims priority from U.S. Provisional Application No. 60/075,586 filed on Feb. 23, 1998 and entitled "INTERFEROMETER AND METHOD FOR MEASURING THE REFRACTIVE INDEX AND OPTICAL PATH LENGTH EFFECTS OF AIR" and is a continuation-in-part of U.S. patent application Ser. No. 09/078,254 filed on May 13, 1998, now abandoned and entitled "INTERFEROMETRIC APPARATUS AND METHODS USING ELECTRONIC FREQUENCY PROCESSING FOR MEASURING AND COMPENSATING FOR REFRACTIVE INDEX EFFECTS IN AN OPTICAL PATH". Both of said applications are commonly owned herewith, and their contents are incorporated herein by reference. This application is also related to commonly owned U.S. Pat. No. 5,838,485.

FIELD OF THE INVENTION

The present invention relates to optical instruments for measuring distance and refractive index. The invention relates in particular to interferometric distance measurement independent of the optical path length effects of refractive index of gas in a measurement path including the effects of refractive index fluctuations.

BACKGROUND AND PRIOR ART

A frequently-encountered problem in metrology is the measurement of the refractive index of a column of air. Several techniques exist for measuring the index under highly controlled circumstances, such as when the air column is contained in a sample cell and is monitored for temperature, pressure, and physical dimension. See for example, an article entitled "An air refractometer for interference length metrology," by J. Terrien, *Metrologia* 1(3), 80–83 (1965).

Perhaps the most difficult measurement related to the refractive index of air is the measurement of refractive index fluctuations over a measurement path of unknown or variable length, with uncontrolled temperature and pressure. Such circumstances arise frequently in geophysical and meteorological surveying, for which the atmosphere is obviously uncontrolled and the refractive index is changing dramatically because of variations in air density and composition. The problem is described in an article entitled "Effects of the atmospheric phase fluctuation on long-distance measurement," by H. Matsumoto and K. Tsukahara, *Appl. Opt.* 23(19), 3388–3394 (1984), and in an article entitled "Optical path length fluctuation in the atmosphere," by G. N. Gibson et al., *Appl. Opt.* 23(23), 4383–4389 (1984).

Another example situation is high-precision distance measuring interferometry, such as is employed in microlithographic fabrication of integrated circuits. See for example an article entitled "Residual errors in laser interferometry from air turbulence and nonlinearity," by N. Bobroff, *Appl. Opt.* 26(13), 2676–2682 (1987), and an article entitled "Recent advances in displacement measuring interferometry," also by N. Bobroff, *Measurement Science &* *Tech.* 4(9), 907–926 (1993). As noted in the aforementioned cited references, interferometric displacement measurements in air are subject to environmental uncertainties, particularly to changes in air pressure and temperature; to uncertainties in air composition such as resulting from changes in humidity; and to the effects of turbulence in the air. Such factors alter the wavelength of the light used to measure the displacement. Under normal conditions the refractive index of air is approximately 1.0003 with a variation of the order of $1 \times 10^{-5}$ to $1 \times 10^{-4}$. In many applications the refractive index of air must be known with a relative precision of less than 0.1 ppm (parts per million) to 0.003 ppm, these two relative precisions corresponding to a displacement measurement accuracy of 100 nm and 3 nm, respectively, for a one meter interferometric displacement measurement.

There are frequent references in the art to heterodyne methods of phase estimation, in which the phase varies with time in a controlled way. For example, in a known form of prior-art heterodyne distance-measuring interferometer, the source emits two orthogonally polarized beams having slightly different optical frequencies (e.g. 2 MHz). The interferometric receiver in this case is typically comprised of a linear polarizer and a photodetector to measure a time-varying interference signal. The signal oscillates at the beat frequency and the phase of the signal corresponds to the relative phase difference. A further representative example of the prior art in heterodyne distance-measuring interferometry is taught in commonly-owned U.S. Pat. No. 4,688,940 issued to G. E. Sommargren and M. Schaham (1987). However, these known forms of interferometric metrology are limited by fluctuations in refractive index, and by themselves are unsuited to the next generation of microlithography instruments.

Another known form of interferometer for distance measurement is disclosed in U.S. Pat. No. 4,005,936 entitled "Interferometric Methods And Apparatus For Measuring Distance To A Surface" issued to J. D. Redman and M. R. Wall (1977). The method taught by Redman and Wall consists of employing laser beams of two different wavelengths, each of which is split into two parts. Frequency shifts are introduced into one part of the respective beams. One part of each beam reflects from an object and recombines with the other part on a photodetector. From the interference signal at the detector is derived a phase, at a difference frequency, that is a measure of the distance to the surface. The equivalent wavelength of the phase associated with the difference frequency is equal to the product of the two laser wavelengths divided by the difference of the two wavelengths. This two-wavelength technique of Redman and Wall reduces measurement ambiguities, but is at least as sensitive to the deleterious effects of refractive index fluctuations of the air as single-wavelength techniques.

Another example of a two-wavelength interferometer similar to that of Redman and Wall is disclosed in U.S. Pat. No. 4,907,886 entitled "Method And Apparatus For Two-Wavelength Interferometry With Optical Heterodyne Processes And Use For Position Or Range Finding," issued to R. Dändliker and W. Heerburgg (1990). This system is also described in an article entitled "Two-Wavelength Laser Interferometry Using Superheterodyne Detection," by R. Dändliker, R. Thalmann, and D. Prongué, *Opt. Let.* 13(5), 339–341 (1988), and in an article entitled "High-Accuracy Distance Measurements With Multiple-Wavelength Interferometry," by R. Dändliker, K. Hug, J. Politch, and E. Zimmermann. The system of Dändliker et al., as taught in U.S. Pat. No. 4,907,886, employs laser beams of two wavelengths, each of the beams comprising two polarization components separated in frequency by means of acousto-optic modulation. After passing these beams collinearly through a Michelson interferometer, the polarization components are mixed, resulting in an interference signal, i.e. a heterodyne signal. In that the heterodyne signal has a different frequency for each of the two wavelengths, a so-called superheterodyne signal results therefrom having a frequency equal to the difference in the heterodyne frequencies and a phase associated with an equivalent wavelength equal to the product of the two laser wavelengths divided by the difference of the two wavelengths. According to U.S. Pat. No. 4,907,886 (cited above), the phase of the superheterodyne signal is assumed to be dependent only on the position of a measurement object and the equivalent wavelength. Therefore, this system is also not designed to measure or compensate for the fluctuations in the refractive index of air.

Further examples of the two-wavelength superheterodyne technique developed by Redman and Wall and by Dändliker and Heerburgg (cited above) are found in an article entitled "Two-wavelength double heterodyne interferometry using a matched grating technique," by Z. Sodnik, E. Fischer, T. Ittner, and H. J. Tiziani, Appl. Opt. 30(22), 3139–3144 (1991), and in an article entitled "Diode laser and fiber optics for dual-wavelength heterodyne interferometry," by S. Manhart and R. Maurer, SPIE 1319, 214–216 (1990). However, neither one of these examples addresses the problem of refractive index fluctuations.

It may be concluded from the foregoing that the prior art in heterodyne and superheterodyne interferometry does not provide a high speed method and corresponding means for measuring and compensating the optical path length effects of air in a measuring path, particularly effects due to fluctuations in the refractive index of air. This deficiency in the prior art results in significant measurement uncertainty, thus seriously affecting the precision of systems employing such interferometers as found for example in microlithographic fabrication of integrated circuits. Future interferometers will necessarily incorporate an inventive, new method and means for measuring and compensating a fluctuating refractive index in a measurement path comprised of a changing physical length.

One way to detect refractive index fluctuations is to measure changes in pressure and temperature along a measurement path and calculate the effect on the optical path length of the measurement path. Mathematical equations for effecting this calculation are disclosed in an article entitled "The Refractivity Of Air," by F. E. Jones, J. Res. NBS 86(1), 27–32 (1981). An implementation of the technique is described in an article entitled "High-Accuracy Displacement Interferometry In Air," by W. T. Estler, Appl. Opt. 24(6), 808–815 (1985). Unfortunately, this technique provides only approximate values, is cumbersome, and corrects only for slow, global fluctuations in air density.

Another, more direct way to detect the effects of a fluctuating refractive index over a measurement path is by multiple-wavelength distance measurement. The basic principle may be understood as follows. Interferometers and laser radar measure the optical path length between a reference and an object, most often in open air. The optical path length is the integrated product of the refractive index and the physical path traversed by a measurement beam. In that the refractive index varies with wavelength, but the physical path is independent of wavelength, it is generally possible to determine the physical path length from the optical path length, particularly the contributions of fluctuations in refractive index, provided that the instrument employs at least two wavelengths. The variation of refractive index with wavelength is known in the art as dispersion, therefore this technique will be referred to hereinafter as the dispersion technique.

The dispersion technique for refractive index measurement has a long history, and predates the introduction of the laser. An article entitled "Long-Path Interferometry Through An Uncontrolled Atmosphere," by K. E. Erickson, JOSA 52(7), 781–787 (1962), describes the basic principles and provides an analysis of the feasibility of the technique for geophysical measurements. Additional theoretical proposals are found in an article entitled "Correction Of Optical Distance Measurements For The Fluctuating Atmospheric Index Of Refraction," by P. L. Bender and J. C. Owens, J. Geo. Res. 70(10), 2461–2462 (1965).

Commercial distance-measuring laser radar based on the dispersion technique for refractive index compensation appeared in the 1970's. An article entitled "Two-Laser Optical Distance-Measuring Instrument That Corrects For The Atmospheric Index Of Refraction," by K. B. Earnshaw and E. N. Hernandez, Appl. Opt. 11(4), 749–754 (1972), discloses an instrument employing microwave-modulated HeNe and HeCd lasers for operation over a 5 to 10 km measurement path. Further details of this instrument are found in an article entitled "Field Tests Of A Two-Laser (4416A and 6328A) Optical Distance-Measuring Instrument Correcting For The Atmospheric Index Of Refraction," by E. N. Hernandez and K. B. Earnshaw, J. Geo. Res. 77(35), 6994–6998 (1972). Further examples of applications of the dispersion technique are discussed in an article entitled "Distance Corrections For Single- And Dual-Color Lasers By Ray Tracing," by E. Berg and J. A. Carter, J. Geo. Res. 85(B11), 6513–6520 (1980), and in an article entitled "A Multi-Wavelength Distance-Measuring Instrument For Geophysical Experiments," by L. E. Slater and G. R. Huggett, J. Geo. Res. 81(35), 6299–6306 (1976).

Although instrumentation for geophysical measurements typically employs intensity-modulation laser radar, it is understood in the art that optical interference phase detection is more advantageous for shorter distances. In U.S. Pat. No. 3,647,302 issued in 1972 to R. B. Zipin and J. T. Zalusky, entitled "Apparatus For And Method Of Obtaining Precision Dimensional Measurements," there is disclosed an interferometric displacement-measuring system employing multiple wavelengths to compensate for variations in ambient conditions such as temperature, pressure, and humidity. The instrument is specifically designed for operation with a movable object, that is, with a variable physical path length. However, the phase-detection means of Zipin and Zalusky is insufficiently accurate for high-precision measurement.

A more modern and detailed example is the system described in an article by Y. Zhu, H. Matsumoto, T. O'ishi, SPIE 1319, Optics in Complex Systems, 538–539 (1990), entitled "Long-Arm Two-Color Interferometer For Measuring The Change Of Air Refractive Index." The system of Zhu et al. employs a 1064 nm wavelength YAG laser and an 632 nm HeNe laser together with quadrature phase detection. Substantially the same instrument is described in Japanese in an earlier article by Zhu et al. entitled "Measurement Of Atmospheric Phase And Intensity Turbulence For Long-Path Distance Interferometer," Proc. 3$^{rd}$ Meeting On Lightwave Sensing Technology, Appl. Phys. Soc. of Japan, 39 (1989). However, the interferometer of Zhu et al. has insufficient resolution for all applications, e.g. submicron interferometry for microlithography.

A recent attempt at high-precision interferometry for microlithography is represented by U.S. Pat. No. 4,948,254 issued to A. Ishida (1990). A similar device is described by Ishida in an article entitled "Two Wavelength Displacement-Measuring Interferometer Using Second-Harmonic Light To Eliminate Air-Turbulence-Induced Errors," *Jpn. J. Appl. Phys.* 28(3), L473–475 (1989). In the article, a displacement-measuring interferometer is disclosed which eliminates errors caused by fluctuations in the refractive index by means of two-wavelength dispersion detection. An $Ar^+$ laser source provides both wavelengths simultaneously by means of a frequency-doubling crystal known in the art as BBO. The use of a BBO doubling crystal results in two wavelengths that are fundamentally phase locked, thus greatly improving the stability and accuracy of the refractive index measurement. However, the phase detection means, which employ simple homodyne quadrature detection, are insufficient for high resolution phase measurement. Further, the phase detection and signal processing means are not suitable for dynamic measurements, in which the motion of the object results in rapid variations in phase that are difficult to detect accurately.

In U.S. Pat. No. 5,404,222 entitled "Interferometric Measuring System With Air Turbulence Compensation," issued to S. A. Lis (1995), there is disclosed a two-wavelength interferometer employing the dispersion technique for detecting and compensating refractive index fluctuations. A similar device is described by Lis in an article entitled "An Air Turbulence Compensated Interferometer For IC Manufacturing," *SPIE* 2440 (1995). Improvement on U.S. Pat. No. 5,404,222 by S. A. Lis is disclosed in U.S. Pat. No. 5,537,209, issued July 1996. The principal innovation of this system with respect to that taught by Ishida in *Jpn. J. Appl. Phys.* (cited above) is the addition of a second BBO doubling crystal to improve the precision of the phase detection means. The additional BBO crystal makes it possible to optically interfere two beams having wavelengths that are exactly a factor of two different. The resultant interference has a phase that is directly dependent on the refractive index but is substantially independent of stage motion. However, the system taught by Lis has the disadvantage that it is complicated and requires an additional BBO crystal for every measurement path. In that microlithography stages frequently involve six or more measurement paths, and that BBO can be relatively expensive, the additional crystals are a significant cost burden. An additional disadvantage of Lis' system is that it employs a low-speed (32-Hz) phase detection system based on the physical displacement of a PZT transducer.

It is clear from the foregoing, that the prior art does not provide a practical, high-speed, high-precision method and corresponding means for measuring refractive index of air and measuring and compensating for the optical path length effects of the air in a measuring path, particularly the effects due to fluctuations in the refractive index of the air. The limitations in the prior art arise principally from the following unresolved technical difficulties: (1) Prior-art heterodyne and superheterodyne interferometers are limited in accuracy by fluctuations in the refractive index of air; (2) Prior-art dispersion techniques for measuring index fluctuations require extremely high accuracy in interference phase measurement, typically exceeding by an order of magnitude the typical accuracy of high-precision distance-measuring interferometers; (3) Obvious modifications to prior-art interferometers to improve phase-measuring accuracy would increase the measurement time to an extent incompatible with the rapidity of stage motion in modern microlithography equipment; (4) Prior-art dispersion techniques require at least two extremely stable laser sources, or a single source emitting multiple, phase-locked wavelengths; (5) Prior-art dispersion techniques in microlithography applications are sensitive to stage motion during the measurement, resulting in systematic errors; and (6) Prior-art dispersion techniques that employ doubling crystals (e.g. U.S. Pat. No. 5,404,222 to Lis) as part of the detection system are expensive and complicated.

These deficiencies in the prior art have led to the absence of any practical interferometric system for performing displacement measurement for microlithography in the presence of a gas in a measurement path where there are typically refractive index fluctuations and the measurement path is comprised of a changing physical length.

Accordingly, it is an object of the invention to provide a method and apparatus for rapidly and accurately measuring and monitoring the refractive index of a gas in a measurement path and/or the optical path length effects of the gas wherein the refractive index may be fluctuating and/or the physical length of the measurement path may be changing.

It is another object of the invention to provide a method and apparatus for rapidly and accurately measuring and monitoring the refractive index of a gas in a measurement path and/or the optical path length effects of the gas wherein the accuracy of measurements and monitoring of the refractive index of the gas and/or of the optical path length effects of the gas are substantially not compromised by a rapid change in physical length of measurement path.

It is another object of the invention to provide a method and apparatus for rapidly and accurately measuring and monitoring the refractive index of a gas in a measurement path and/or the optical path length effects of the gas wherein the method and apparatus does not require measurement and monitoring of environmental conditions such as temperature and pressure.

It is another object of the invention to provide a method and apparatus for rapidly and accurately measuring and monitoring the refractive index of a gas in a measurement path and/or the optical path length effects of the gas wherein the method and apparatus may use but does not require the use of two or more optical beams of differing wavelengths which are phase locked.

It is another object of the invention to provide a method and apparatus for rapidly and accurately measuring and monitoring the optical path length effects of a gas in a measurement path wherein the lengths of measuring paths in an interferometric measurement are substantially not used in a computation of the optical path length effects of the gas.

Other objects of the invention will, in part, be obvious and will, in part, appear hereinafter. The invention accordingly comprises methods and apparatus possessing the construction, steps, combination of elements, and arrangement of parts exemplified in the detailed description to follow when read in connection with the drawings.

SUMMARY OF THE INVENTION

The present invention generally relates to apparatus and methods for measuring and monitoring the refractive index of a gas in a measurement path and/or the change in optical path length of the measurement path due to the gas wherein the refractive index of the gas may be fluctuating, e.g., the gas is turbulent, and/or the physical length of the measuring path may be changing. The present invention also relates to apparatus and methods for use in electro-optical metrology and other applications. More specifically, the invention operates to provide measurements of dispersion of the refractive index, the dispersion being substantially proportional to the density of the gas, and/or measurements of dispersion of the optical path length, the dispersion of the optical path length being related to the dispersion of the refractive index and the physical length of the measurement path. The refractive index of the gas and/or the optical path length effects of the gas are subsequently computed from the measured dispersion of the refractive index and/or the measured dispersion of the optical path length, respectively. The information generated by the inventive apparatus is particularly suitable for use in interferometric distance measuring instruments (DMI) to compensate for errors related to refractive index of gas in a measurement path brought about by environmental effects and turbulence induced by rapid stage slew rates.

Several embodiments of the invention have been made and these fall broadly into two categories that address the need for more or less precision in final measurements. While the various embodiments share common features, they differ in some details to achieve individual goals.

In general, the inventive apparatus comprises interferometer means having first and second measurement legs at least one of which changes in length and at least one of which is at least in part occupied by the gas. Perferably a reference leg and a measurement leg are used in preferred embodiments. The constituent legs are preferably configured and arranged so that the measurement leg has a portion of its optical path length substantially the same as the optical path length of the reference leg. The gas in the remaining portion of the optical path of the measurement leg in a typical interferometric DMI application is air.

Means for generating at least two light beams having different wavelengths are included. In preferred embodiments, a source generates a set of light beams, the set of light beams being comprised of at least two light beams, each beam of the set of light beams having a different wavelength. The relationship between the wavelengths of the beams of the set of light beams, the approximate relationship, is known.

A set of frequency-shifted light beams is generated from the set of light beams by introducing a frequency difference between two orthogonally polarized components of each beam of the set of light beams such that no two beams of the set of frequency-shifted light beams have the same frequency difference. For a given embodiment, the ratios of the wavelengths are the same as the known approximate relationship to relative precisions which depend on chosen operating wavelenghs and the corresponding known approximate relationship. Because of this wavelength dependence, these relative precisions are referred to as the respective relative precisions of the ratios of the wavelengths. In a number of embodiments, the respective relative precisions of the ratios of the wavelengths are of an order of magnitude less than the respective dispersions of the gas times the relative precision required for the measurement of the respective refractive indices of the gas and/or for the measurement of the respective changes in the optical path length of the measurement leg due to the gas.

In certain ones of the embodiments, the approximate relationship is expressed as a sequence of ratios, each ratio comprising a ratio of low order non-zero integers, e.g., 2/1, to respective relative precisions, the respective relative precisions of the sequence of ratios, wherein a respective relative precision of the respective relative precisions of the sequence of ratios is of an order of magnitude less than the respective dispersion of the gas times the respective relative precision required for the measurement of the respective refractive index of the gas and/or for the measurement of the respective change in the optical path length of the measurement leg due to the gas.

In other embodiments, where the respective relative precisions of the ratios of the wavelengths is inappropriate to the desired value, means are provided for monitoring the ratios of the wavelengths and either providing feedback to control the respective relative precisions of the ratios of the wavelengths, information to correct subsequent calculations influenced by undesirable departures of the respective relative precisions of the ratios of the wavelengths from the desired respective relative precisions of the ratios of the wavelengths, or some combination of both. Means are also provided for monitoring the wavelength used in the primary objective of DMI, the determination of a change in a length of the measurement path.

At least a portion of each of the frequency-shifted light beams is introduced into the interferometer means by suitable optical means so that a first portion of at least a portion of each frequency-shifted light beam travels through the reference leg along predetermined paths of the reference leg and a second portion of at least a portion of each frequency-shifted light beam travels through the measurement leg along predetermined paths of the measurement leg, the first and second portions of at least a portion of each frequency-shifted light beam being different. Afterwards, the first and second portions of at least a portion of each frequency-shifted light beam emerge from the interferometer means as exit beams containing information about the optical path length through the predetermined paths in the reference leg and the optical path length through the predetermined paths in the measurement leg.

Combining means are provided for receiving the exit beams to produce mixed optical signals which contain information corresponding to the phase differences between the exit beams of the first and second portions of at least a portion of each frequency-shifted light beam. The mixed optical signals are then sensed by a photodetector, preferably by photoelectric detection, which operates to generate electrical interference signals that contain information corresponding to the refractive index of the gas at the different beam wavelengths and to the optical path length in the measurement leg due to the refractive index of the gas at the different beam wavelengths.

In certain of the embodiments, modified electrical interference signals are then generated from the electrical interference signals by either multiplying or dividing the phase of each of the electrical interference signals by a number, the relationship of the numbers being either the same as the known approximate relationship of the wavelengths or the same as the reciprocal of the known approximate relationship of the wavelengths, respectively.

The electrical interference signals, or the corresponding modified electrical interference signals depending on the embodiment, are then analyzed by electronic means that operate to determine the dispersion of the optical path length of the measurement leg substantially due to the dispersion of the refractive index of the gas and/or the dispersion $(n_i-n_j)$ of the gas where i and j are integers corresponding to wavelengths and different from one another. From this information and the reciprocal dispersive power of the gas, the refractivity of the gas, $(n_r-1)$ where r is an integer corresponding to a wavelength, and/or the contribution to the optical path length of the measurement leg due to the refractive index of the gas can also be determined by the electronic means. The value of r may be different from i and j or equal to either i or j. The electronic means can comprise electronic means in the form of a microprocessor or a general purpose computer suitably programmed in well-known ways to perform the needed calculations.

In preferred form, the electrical interference signals comprise heterodyne signals containing phase information corresponding to the refractive index of the gas and to the optical path length of the measurement leg and the apparatus further comprises means to determine the phases of the heterodyne signals to generate phase information corresponding to the dispersion of the refractive index of the gas and to the dispersion of the optical path length of the measurement leg due to the dispersion of the refractive index of the gas. In certain of the embodiments, the apparatus further comprises means for mixing, i.e. multiplying, the modified heterodyne signals corresponding to the modified electrical signals to generate at least one modified superheterodyne signal containing phase corresponding to the dispersion of the refractive index of the gas and to the dispersion of the optical path length of the measurement leg due to the dispersion of the refractive index of the gas. Means are also included for resolving phase ambiguities of the heterodyne signals, modified heterodyne signals, and the modified superheterodyne signals generated in certain of the embodiments. Depending on the details of the optical paths experienced by the light beam portions as they travel through the interferometer means of the various embodiments, additional or different electronics are provided.

While the inventive method disclosed may be carried out using the preferred apparatus described, it will be evident that it may also be practiced using other well-known apparatus. In addition, it is shown that apparatus may be employed which uses homodyne signals.

BRIEF DESCRIPTION OF THE DRAWINGS

The structure and operation of the invention, together with other objects and advantages thereof, may best be understood by reading the detailed description in conjunction with the drawings wherein the invention's parts have an assigned reference numeral that is used to identify them in all of the drawings in which they appear and wherein:

FIG. 1b is a drawing showing a block diagram of the processing electronics 109;

FIG. 2b illustrates differential plane mirror interferometer 69;

FIG. 2c illustrates differential plane mirror interferometer 70;

FIG. 2d illustrates external mirror system 90, furnishing the external mirrors for differential plane mirror interferometer 69, and stage translator 67;

FIG. 2e illustrates external mirror system 90, furnishing the external mirrors for differential plane mirror interferometer 70, and stage translator 67;

FIG. 2f is a drawing showing a block diagram of the processing electronics 209;

FIG. 3b is a drawing showing a block diagram of the processing electronics 109b;

FIG. 4b illustrates the external mirror system 90b furnishing the external mirrors for differential plane mirror interferometer 69b;

FIG. 4c illustrates the external mirror system 90b furnishing the external mirrors for differential plane mirror interferometer 70b;

FIGS. 6a–6c relate to lithography and its application to manufacturing integrated circuits wherein FIG. 6a is a schematic drawing of a lithography exposure system employing the interferometry system.

FIGS. 6b and 6c are flow charts describing steps in manufacturing integrated circuits.

DETAILED DESCRIPTION OF THE INVENTION

The present invention relates to apparatus and methods by which the refractivity of a gas in at least one measurement path and/or the change in the optical path length of the measurement path due to the gas may be quickly measured and used in subsequent downstream or contemporaneous applications wherein either or both the refractive index of the gas and the physical length of the measurement path may be changing. An example of a contemporaneous application is in an interferometric distance measuring instrument to enhance accuracy by compensating for the effects of the refractive index of the gas in the measurement path, especially changes in the optical path length that take place during the measuring period because of changing environmental conditions or air turbulence induced in the measurement path by rapid stage slew rates.

A number of different embodiments of the apparatus of the invention are shown and described. While they differ in some details, the disclosed embodiments otherwise share many common elements and naturally fall into two categories depending on the degree of control demanded of their light sources. As will be seen, the disclosed embodiments within each category also differ in the details of how their interferometric optical paths are implemented and/or how certain information signals are handled electronically.

The first group of embodiments to be described comprise two embodiments and variants thereof. This group is intended for applications where the stability of the adopted light sources is sufficient and the ratio of the wavelengths of the light beams generated by the adopted light sources is matched to a sequence of known ratio values with respective relative precisions sufficient to meet the required precision imposed on the output data by the final end use application.

The second group of embodiments also comprise two embodiments and variants thereof and these are particularly suitable for use where it is necessary to monitor the stability of the light sources and measure the ratios of the wavelengths of the light beams generated by the adopted light sources to meet performance requirements on accuracy. For both groups, apparatus is disclosed for dealing with phase ambiguities and phase and group delays that may arise in analyzing homodyne, heterodyne, and/or superheterodyne signals and methods are disclosed for implementing the steps of the invention.

Figure 1A:
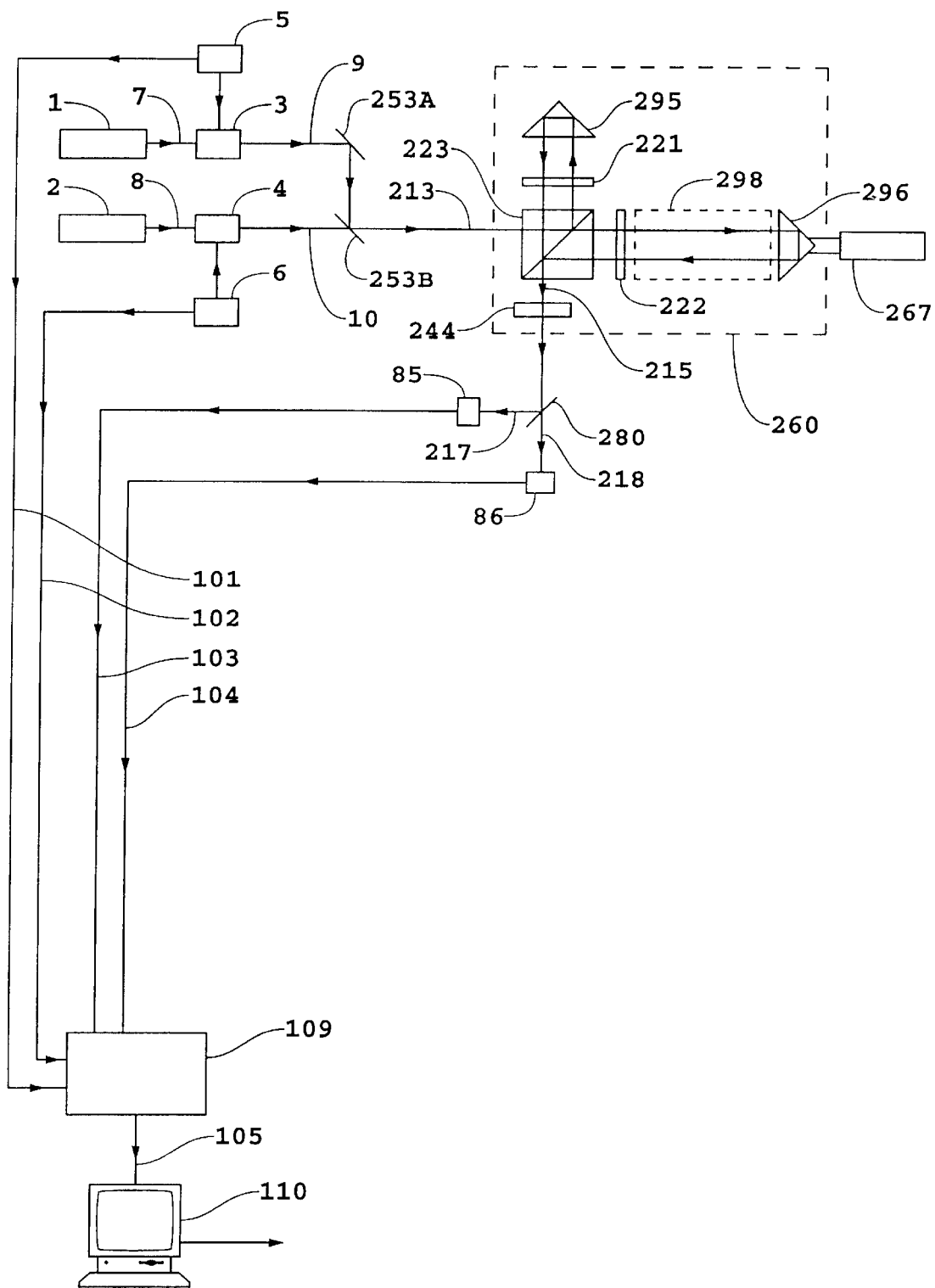
FIGS. 1a–1b taken together illustrate, in diagrammatic form, the presently first preferred embodiment of the present invention with FIG. 1a showing optical paths between indicated elements source 1, modulator 3, source 2, modulator 4, interferometer 260, detectors 85 and 86, and translator 267 and the paths of electrical signals between indicated elements driver 5, modulator 3, driver 6, modulator 4, detectors 85 and 86, electronic processor 109, and computer 110.
Figure 1B:
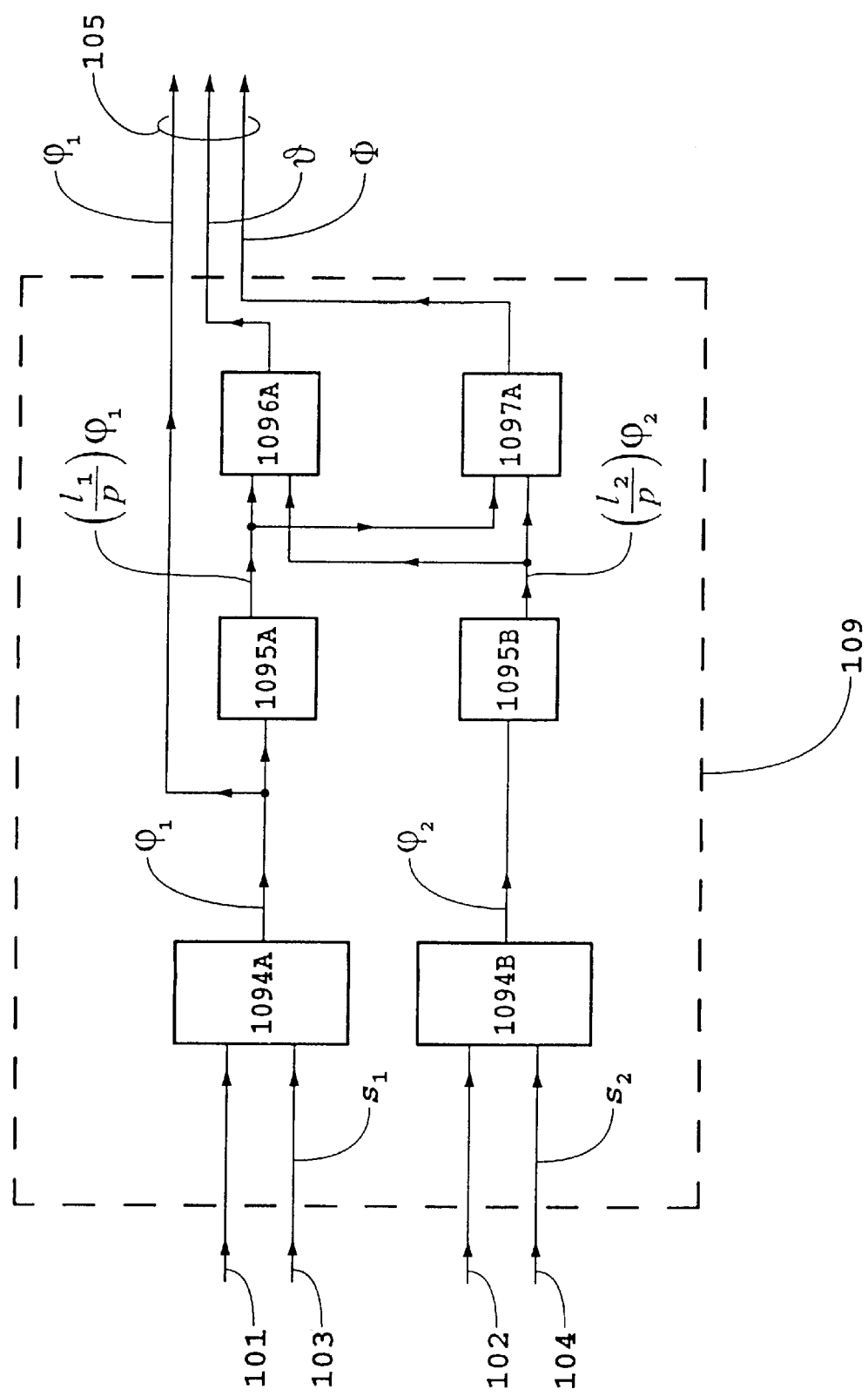

FIGS. 1a and 1b depict in schematic form one preferred embodiment of the present invention for measuring and monitoring the refractivity of a gas in a measurement path and/or the change in the optical path length of the measurement path due to the gas wherein either or both the refractive index of the gas and the physical length of the measurement path may be changing and where the stability of the adopted light sources is sufficient and the ratio of the wavelengths of the light beams generated by the adopted light sources is matched to a known ratio value with a relative precision sufficient to meet the required precision imposed on the output data by the final end use application. While the apparatus has application for a wide range of radiation sources, the following description is taken by way of example with respect to an optical measuring system.

Referring to FIG. 1a and in accordance with the preferred apparatus and method of the first preferred embodiment of the present invention, a light beam 7 emitted from source 1 passes through a modulator 3 becoming light beam 9. Modulator 3 is excited by a driver 5. Source 1 is preferably a laser or like source of coherent radiation, preferably polarized, and having a wavelength $\lambda_1$. Modulator 3 may for example be an acousto-optical device or a combination of acousto-optical devices with additional optics for selectively modulating polarization components of beam 7. Modulator 3 preferably shifts the oscillation frequency of one linearly polarized component of beam 7 an amount $f_1$ with respect to an orthogonally linearly polarized component, the directions of polarizations of the components denoted herein as x and y. In the following description of the first preferred embodiment, it will be assumed that the x polarization component of beam 9 has an oscillation frequency shifted an amount $f_1$ with respect to the y polarization component of beam 9 without departing from the spirit or scope of the present invention. The oscillation frequency $f_1$ is determined by the driver 5.

In a next step, a light beam 8 emitted from a source 2 passes through a modulator 4 becoming light beam 10. Modulator 4 is excited by a driver 6, similar to modulator 3 and driver 5, respectively. Source 2, similar to source 1, is preferably a laser or like source of polarized, coherent radiation, but preferably at a different wavelength, $\lambda_2$, wherein the ratio of the wavelengths $(\lambda_1/\lambda_2)$ has a known approximate ratio value $l_1/l_2$, i.e.

$$(\lambda_1/\lambda_2) \cong (l_1/l_2), \tag{1}$$

where $l_1$ and $l_2$ may assume integer and non-integer values, and the ratio of the wavelengths $(\lambda_1/\lambda_2)$ is the same as the ratio value $l_1/l_2$ to a relative precision of an order of magnitude or more less than the dispersion of the refractive index of the gas, $(n_2-n_1)$, times the relative precision $\epsilon$ desired for the measurement of the refractivity of the gas or of the change in the optical path length of the measurement leg due to the gas. The x polarized component of beam 10 has an oscillation frequency shifted an amount $f_2$ with respect to the y polarized component of beam 10. The oscillation frequency $f_2$ is determined by the driver 6. In addition, the directions of the frequency shifts of the x components of beams 9 and 10 are the same.

It will be appreciated by those skilled in the art that beams 7 and 8 may be provided alternatively by a single laser source emitting more than one wavelength, by a single laser source combined with optical frequency doubling means to achieve frequency doubling, tripling, quadrupling, etc., two laser sources of differing wavelengths combined with sum-frequency generation or difference-frequency generation, or any equivalent source configuration capable of generating light beams of two or more wavelengths.

A laser source, for example, can be a gas laser, e.g. a HeNe, stabilized in any of a variety of conventional techniques known to those skilled in the art, see for example, T. Baer et al., "Frequency Stabilization of a 0.633 μm He—Ne-longitudinal Zeeman Laser," *Applied Optics*, 19, 3173–3177 (1980); Burgwald et al., U.S. Pat. No. 3,889,207, issued Jun. 10, 1975; and Sandstrom et al., U.S. Pat. No. 3,662,279, issued May 9, 1972. Alternatively, the laser can be a diode laser frequency stabilized in one of a variety of conventional techniques known to those skilled in the art, see for example, T. Okoshi and K. Kikuchi, "Frequency Stabilization of Semiconductor Lasers for Heterodyne-type Optical Communication Systems," *Electronic Letters*, 16, 179–181 (1980) and S. Yamaqguchi and M. Suzuki, "Simultaneous Stabilization of the Frequency and Power of an AlGaAs Semiconductor Laser by Use of the Optogalvanic Effect of Krypton," *IEEE J. Quantum Electronics*, QE-19, 1514–1519 (1983).

It will also be appreciated by those skilled in the art that the two optical frequencies of beam 9 and of beam 10 may be produced by any of a variety of frequency modulation apparatus and/or lasers: (1) use of a Zeeman split laser, see for example, Bagley et al., U.S. Pat. No. 3,458,259, issued Jul. 29, 1969; G. Bouwhuis, "Interferometrie Mit Gaslasers," Ned. T. Natuurk, 34, 225–232 (August 1968); Bagley et al., U.S. Pat. No. 3,656,853, issued Apr. 18, 1972; and H. Matsumoto, "Recent interferometric measurements using stabilized lasers," *Precision Engineering*, 6(2), 87–94 (1984); (2) use of a pair of acousto-optical Bragg cells, see for example, Y. Ohtsuka and K. Itoh, "Two-frequency Laser Interferometer for Small Displacement Measurements in a Low Frequency Range," *Applied Optics*, 18(2), 219–224 (1979); N. Massie et al., "Measuring Laser Flow Fields With a 64-Channel Heterodyne Interferometer," *Applied Optics*, 22(14), 2141–2151 (1983); Y. Ohtsuka and M. Tsubokawa, "Dynamic Two-frequency Interferometry for Small Displacement Measurements," *Optics and Laser Technology*, 16, 25–29 (1984); H. Matsumoto, ibid.; P. Dirksen, et al., U.S. Pat. No. 5,485,272, issued Jan. 16, 1996; N. A. Riza and M. M. K. Howlader, "Acousto-optic system for the generation and control of tunable low-frequency signals," *Opt. Eng.*, 35(4), 920–925 (1996); (3) use of a single acousto-optic Bragg cell, see for example, G. E. Sommargren, commonly owned U.S. Pat. No. 4,684,828, issued Aug. 4, 1987; G. E. Sommargren, commonly owned U.S. Pat. No. 4,687,958, issued Aug. 18, 1987; P. Dirksen, et al., ibid.; (4) use of two longitudinal modes of a randomly polarized HeNe laser, see for example, J. B. Ferguson and R. H. Morris, "Single Mode Collapse in 6328 Å HeNe Lasers," *Applied Optics*, 17(18), 2924–2929 (1978); or (5) use of birefringent elements or the like internal to the laser, see for example, V. Evtuhov and A. E. Siegman, "A 'Twisted-Mode' Technique for Obtaining Axially Uniform Energy Density in a Laser Cavity," *Applied Optics*, 4(1), 142–143 (1965).

The specific device used for the sources of beams 7 and 8 will determine the diameter and divergence of beams 7 and 8, respectively. For some sources, e.g., a diode laser, it will likely be necessary to use conventional beam shaping optics, e.g., a conventional microscope objective, to provide beams 7 and 8 with a suitable diameter and divergence for the elements that follow. When the source is a HeNe laser, for example, beam shaping optics may not be required.

It will be further appreciated by those skilled in the art that both the x and y polarization components of beam 9 and/or of beam 10 may be frequency shifted without departing from the scope and spirit of the invention, $f_1$ remaining the difference in frequencies of the x and y polarization components of beam 9 and $f_2$ remaining the difference in frequencies of the x and y polarization components of beam 10. Improved isolation of an interferometer and a laser source is generally possible by frequency shifting both x and y polarization components of a beam, the degree of improved isolation depending on the means used for generating the frequency shifts.

In a next step, beam 9 is reflected by mirror 253A and then a portion of beam 9 is subsequently reflected by beamsplitter 253B, preferably a non-polarizing type, to become a component of beam 213, the $\lambda_1$ component. A portion of beam 10 is transmitted by beamsplitter 253B to become a second component of beam 213, the $\lambda_2$ component, wherein the $\lambda_2$ component is preferably parallel and coextensive with the $\lambda_1$ component. In a further step, beam 213 propagates to an interferometer 260, comprised of optical means for a introducing a phase shift $\psi_1$ between the polarization components x and y of the $\lambda_1$ component of beam 213 and a phase shift $\psi_2$ between the polarization components x and y of the $\lambda_2$ component of beam 213. The magnitude of phase shifts $\psi_1$ and $\psi_2$ are related to round-trip physical length L of measurement path 298 according to the formulae $$\psi_j = L p k_j n_j + \zeta_j, \quad j=1 \text{ and } 2, \tag{2}$$

where p is the number of passes through the respective reference and measurement legs for a multiple pass interferometer, and $n_j$ are the refractive indices of gas in measurement path 298 corresponding to wavenumber $k_j = (2\pi)/\lambda_j$. The phase offsets $\zeta_j$ comprise all contributions to the phase shifts $\psi_j$ that are not related to the measurement path 298 or reference paths.

As shown in FIG. 1a, interferometer 260 is comprised of a reference retroreflector 295, object retroreflector 296, quarter-wave phase retardation plates 221 and 222, and a polarizing beam splitter 223. This configuration is known in the art as a polarized Michelson interferometer, and is shown as a simple illustration with p=1.

Eqs. (2) are valid for the case where the paths for one wavelength and the paths for the second wavelength are substantially coextensive, a case chosen to illustrate in the simplest manner the function of the invention in the first embodiment. To those skilled in the art, the generalization to the case where the respective paths for the two different wavelengths are not substantially coextensive is a straight forward procedure.

Cyclic errors that produce nonlinearities in distance measuring interferometry (cf. the cited articles by Bobroff) have been omitted in Eqs. (2). Techniques known to those skilled in the art can be used to either reduce the cyclic errors to negligible levels or compensate for the presence of cyclic errors, techniques such as using separated beams in the interferometer and/or separated beams in the delivery system for light beams from each light beam source to the interferometer [M. Tanaka, T. Yamagami, and K. Nakayama, "Linear Interpolation of Periodic Error in a Heterodyne Laser Interferometer at Subnanometer Levels," *IEEE Trans. Instrum. and Meas.*, 38(2), 552–554, 1989] and light beam sources with reduced polarization and/or frequency mixing.

After passing through interferometer 260, beam 213 becomes a phase-shifted beam 215, which passes through a polarizer 244 preferably orientated so as to mix polarization components x and y of beam 215. A conventional dichroic beam splitter 280 preferably separates those portions of beam 215 corresponding to wavelengths $\lambda_1$ and $\lambda_2$ into beams 217 and 218, respectively.

In a next step as shown in FIG. 1a, phase-shifted beams 217 and 218 impinge upon photodetectors 85 and 86, respectively, resulting in two electrical interference signals, heterodyne signals $s_1$ and $s_2$, respectively, preferably by photoelectric detection. The signal $s_1$ corresponds to wavelength $\lambda_1$ and signal $s_2$ corresponds to the wavelength $\lambda_2$. The signals $s_j$ have the form $$s_j = A_j \cos[\alpha_j(t)], \quad j=1 \text{ and } 2, \tag{3}$$

where the time-dependent arguments $\alpha_j(t)$ are given by $$\alpha_j(t) = 2\pi f_j t + \psi_j, \quad j=1 \text{ and } 2 \tag{4}$$

Heterodyne signals $s_1$ and $s_2$ are transmitted to electronic processor 109 for analysis as electronic signals 103 and 104, respectively, in either digital or analog format, preferably in digital format.

A preferred method for electronically processing the heterodyne signals $s_1$ and $s_2$ is presented herewithin for the case when $l_1$ and/or $l_2$ are not low order integers. For the case when $l_1$ and $l_2$ are both low order integers and the ratio of the wavelengths matched to the ratio $(l_1/l_2)$ with a relative precision sufficient to meet the required precision imposed on the output data by the end use application, the preferred procedure for electronically processing the heterodyne signals $s_1$ and $s_2$ is the same as the one subsequently set down for the second variant of the first preferred embodiment of the present invention.

Referring now to FIG. 1b, electronic processor 109 further comprises electronic processors 1094A and 1094B to determine the phases $\psi_1$ and $\psi_2$, respectively, by either digital or analog signal processes, preferably digital processes, using time-based phase detection such as a digital Hilbert transform phase detector [see section 4.1.1 of "Phase-locked loops: theory, design, and applications" 2nd ed. McGraw-Hill (New York) 1993, by R. E. Best] or the like and the phase of drivers 5 and 6.

The phases of drivers 5 and 6 are transmitted by electrical signals, reference signals 101 and 102, respectively, in either digital or analog format, preferably in digital format, to electronic processor 109. Reference signals, alternatives to reference signals 101 and 102, may also be generated by an optical pick off means and detectors (not shown in figures) by splitting off portions of beams 9 and 10 with beam splitters, preferably non-polarizing beam splitters, mixing the portion of the beam 9 and the portion of the beam 10 that are split off, and detecting the mixed portions to produce alternative heterodyne reference signals.

Referring again to FIG. 1b, phase $\psi_1$ and phase $\psi_2$ are next multiplied by $\lambda_1/p$ and $\lambda_2/p$ respectively, in electronic processors 1095A and 1095B, respectively, preferably by digital processing, resulting in phases $(l_1/p)\psi_1$ and $(l_2/p)\psi_2$, respectively. The phases $(l_1/p)\psi_1$ and $(l_2/p)\psi_2$ are next added together in electronic processor 1096A and subtracted one from the other in electronic processor 1097A, preferably by digital processes, to create the phases $\theta$ and $\Phi$, respectively. Formally, $$\vartheta = \left(\frac{l_1}{p}\varphi_1 + \frac{l_2}{p}\varphi_2\right), \quad (5)$$

$$\Phi = \left(\frac{l_1}{p}\varphi_1 - \frac{l_2}{p}\varphi_2\right). \quad (6)$$

The phases $\psi_1$, $\theta$, and $\Phi$ are transmitted to computer 110 as signal 105, in either digital or analog format, preferably in digital format.

For a measuring path comprised of a vacuum, phase $\Phi$ should substantially be a constant independent of Doppler shifts due to a motion of retroreflector 296. This may not be the case in practice due to differences in the group delay experienced by the electrical signals $s_1$ and $s_2$. Group delay, often called envelope delay, describes the delay of a packet of frequencies, and the group delay at a particular frequency is defined as the negative of the slope of the phase curve at the particular frequency [see H. J. Blinchikoff and A. I. Zverev, *Filtering in the Time and Frequency Domains*, Section 2.6, 1976 (Wiley, N.Y.)]. If phase $\Phi$ is not a constant for a measuring path comprised of a vacuum, techniques known to those skilled in the art can be used to compensate for departures of phase $\Phi$ from a constant (cf. Blinchikoff and Zveriv, ibid.). It is important to note that the group delay effects in $\Phi$ can not only be detected but can also be determined by measuring $\Phi$ as a function of different translational velocities of retroreflector 296 produced by translator 267 for a measuring path comprising a vacuum. It is also important to note that the group delay effects in $\Phi$ can be significantly reduced by performing analog-to-digital conversion of signals $s_1$ and $s_2$ as close as practical to the photoelectric detectors in detectors 85 and 86, respectively, followed by digital signal processing as opposed to transmitting the signals $s_1$ and $s_2$ as analog signals for subsequent analog signal processing and/or analog-to-digital conversion downstream. The compensation for a particular group delay can generally be introduced before or after, or in part before and in part after, the processing elements producing the particular group delay.

The refractivity of the gas, $(n_1-1)$, can be calculated using the formula $$n_1 - 1 = \frac{\Gamma}{\chi L[1-(K/\chi)^2]}\{[\vartheta(K/\chi)-\Phi]-Q\}, \quad (7)$$

where $$\chi = (l_1 k_1 + l_2 k_2)/2, \quad (8)$$

$$K = (l_1 k_1 - l_2 k_2)/2 \quad (9)$$

and $$\Gamma = \frac{n_1 - 1}{n_2 - n_1}, \quad (10)$$

the quantity $\Gamma$ being the reciprocal dispersive power of the gas which is substantially independent of environmental conditions and turbulence in the gas. The offset term Q is defined as $$Q = \xi(K/\chi) - Z \quad (11)$$

where $$\xi = \left(\frac{l_1}{p}\zeta_1 + \frac{l_2}{p}\zeta_2\right), \quad (12)$$

$$Z = \left(\frac{l_1}{p}\zeta_1 - \frac{l_2}{p}\zeta_2\right). \quad (13)$$

Values of $\Gamma$ may be computed from knowledge of the gas composition and from knowledge of the wavelength dependent refractivities of the gas constituents. For the example of $\lambda_1 = 0.63\,\mu m$, $\lambda_2 = 0.32\,\mu m$, and a standard atmosphere, $\Gamma \cong 24$.

In addition, Eq. (7) is valid for the case where the combined paths for optical beams at one wavelength are substantially coextensive with the combined paths for optical beams at a second wavelength, a preferred configuration that also serves to illustrate in the simplest manner the function of the invention. To those skilled in the art, the generalization to the case where combined paths for optical beams at one wavelength are not substantially coextensive with the combined paths for optical beams at a second wavelength is a straight forward procedure.

For those applications related to distance measuring interferometry, the heterodyne phase $\psi_1$ and phases $\theta$ and $\Phi$ may be used to determine a physical distance L, independent of the effects of the refractive index of the gas in the measuring path of a distance measuring interferometer, using the formula $$L = \frac{1}{(\chi+K)}\left\{\frac{l_1}{p}(\varphi_1 - \zeta_1) - \frac{\Gamma}{[1-(K/\chi)]}[(K/\chi)\vartheta - \Phi - Q]\right\}. \quad (14)$$

The ratio of the wavelengths can be expressed in terms of $(K/\chi)$ from Eqs. (8) and (9) with the result $$\frac{\lambda_1}{\lambda_2} = \left(\frac{l_1}{l_2}\right)\left[\frac{1-(K/\chi)}{1+(K/\chi)}\right]. \quad (15)$$

When operating under the condition $$|K/\chi| \ll \frac{(n_2 - n_1)}{(n_2 + n_1)}, \qquad (16)$$

the ratio of the phases $\Phi$ and $\theta$ has the approximate value $$(\Phi/\theta) \cong -\frac{(n_2 - n_1)}{(n_2 + n_1)}. \qquad (17)$$

Therefore, for the case of the first preferred embodiment where the ratio of the wavelengths $(\lambda_1/\lambda_2)$ has a known approximate ratio value $l_1/l_2$, cf. Eq. (1), where $l_1$ and $l_2$ may assume integer and non-integer values, and the ratio of the wavelengths $(\lambda_1/\lambda_2)$ is the same as the ratio value $l_1/l_2$ to a relative precision of an order of magnitude or more less than the dispersion of the refractive index of the gas, $(n_2 - n_1)$, times the relative precision $\epsilon$ desired for the measurement of the refractivity of the gas or of the change in the optical path length of the measurement leg due to the gas, expressed formally by the inequality $$\left|\frac{\lambda_1}{\lambda_2} - \frac{l_1}{l_2}\right| \ll \left(\frac{l_1}{l_2}\right)(n_2 - n_1)\varepsilon, \qquad (18)$$

Eqs. (7) and (14) reduce to more simple forms of $$n_1 - 1 = -\frac{\Gamma}{\chi L}(\Phi + Q), \qquad (19)$$

$$L = \frac{1}{\chi}\left[\frac{l_1}{p}(\varphi_1 - \zeta_1) + \Gamma(\Phi + Q)\right], \qquad (20)$$

respectively. It will also be obvious to someone skilled in the art to perform similar calculations for L with respect to $n_2$, $$(n_2 - 1) = (n_1 - 1)(1 + 1/\Gamma), \qquad (21)$$

in place of or in addition to $n_1$.

In a next step, electronic processing means 109 transmits to the computer 110 $\psi_1$ and $\Phi$ as electronic signal 105 in either digital or analog format, preferably a digital format, for the computation of $(n_1-1)$ and/or L. The resolution of phase redundancy in $(1/l_1)\Phi$ is required in the computation of either $(n_1-1)$ or changes in L due to the gas using either Eqs. (19) or (20), respectively. In addition, the resolution of phase redundancy in $\psi_1$ is required in the computation of L using Eq., and the resolution of the phase redundancy in $\psi_1$ is required in the computation of changes L using Eq. (20) if $\chi$ is variable in time.

The equivalent wavelength comprising $(1/l_1)\Phi$ is significantly larger than either of the wavelengths $\lambda_1$ and $\lambda_2$ and as a consequence, produces a significant simplification in a procedure implemented for resolution of phase redundancy in $(1/l_1)\Phi$. The equivalent wavelength $\lambda_{(1/l_1)\Phi}$ for $(1/l_1)\Phi$ is $$\lambda_{(1/l_1)\Phi} = \frac{\lambda_1}{(n_2 - n_1)}. \qquad (22)$$

For the example of $\lambda_1 = 0.63$ μm, $\lambda_2 = 0.32$ μm, and $(n_2 - n_1) \cong 1 \times 10^{-5}$ for a standard atmosphere, the equivalent wavelength given by Eq. (22) is $$\lambda_{(1/l_1)\Phi} \cong 63 \text{ mm}. \qquad (23)$$

Any one of several procedures may be easily employed to resolve the phase redundancy in $(1/l_1)\Phi$, given the equivalent wavelength as expressed by Eq. (22). For those applications where changes in the measurement path can be measured interferometrically, a feature for example of an application based on a distance measuring interferometer employed for measuring changes in the measurement path, the movable retroreflector 296 of interferometer 260 can be scanned by translator 267 in a controlled manner over a given length and the concomitant change in $(1/l_1)\Phi$ recorded. From the recorded change in $(1/l_1)\Phi$ and the length scanned, as recorded by the change in $\psi_1$, the equivalent wavelength $\lambda_{(1/l_1)\Phi}$ can be calculated. With the computed value for the equivalent wavelength $\lambda_{(1/l_1)\Phi}$, the phase redundancy in $(1/l_1)\Phi$ can be easily resolved in view of the relatively large value for the equivalent wavelength $\lambda_{(1/l_1)\Phi}$.

For those applications where the determination of the refractivity and/or or the change in the optical path length due to the gas in a measurement leg is made and retroreflector 296 does not have a scanning capability such as considered in the preceding paragraph, other procedures are available for the resolution of the phase redundancy of $(1/l_1)\Phi$. One procedure which may be employed to resolve the phase redundancy in $(1/l_1)\Phi$ is based on the use of a retroreflector or series of retroreflectors inserted at a series of positions in measurement path 298, the retroreflector at each position of the series of positions performing the same function as retroreflector 296, wherein the round-trip physical length L for the measurement leg for each position of the series of positions of the inserted retroreflectors form a geometric progression. The smallest or first round-trip physical length in the series of positions will be approximately $\lambda_1/[4(n_2 - n_1)]$ divided by the relative precision that the initial value of $(1/l_1)\Phi$ is known. The round-trip physical length of the second position of the series of positions will be approximately the round-trip physical length of the first position of the series of positions divided by the relative precision that $\Phi$ is measured using the first position of the series of positions. This is a geometric progression procedure, the resulting sequence of roundtrip physical lengths forming a geometric progression, which is continued until the round-trip physical length of the retroreflector 296 used to measure the refractivity or the change in optical path length due to the refractivity of the gas would be exceeded if the number of positions in the series of positions were incremented by one.

A third procedure is based upon the use of a source not shown in FIGS. 1a and 1b) of a series of known wavelengths and measuring $\Phi$ for these wavelengths. The number of known wavelengths required for the resolution of the phase redundancy is generally comprised of a small set because of the relatively large value for $\lambda_{(1/l_1)\Phi}$ as given by Eq. (22).

Another procedure to resolve the phase redundancy in $(1/l_1)\Phi$ would be to observe the changes in $(1/l_1)\Phi$ as the measuring path 98 is changed from being filled with a gas to an evacuated state (the vacuum chamber and pump and requisite gas handling system are not shown in FIGS. 1a and 1b) to resolve the phase redundancy in $(1/l_1)\Phi$. The problems normally encountered in measuring absolute values for refractivity and changes in the optical path length due to the refractivity of the gas based in part on changing the gas pressure from a non-zero value to a vacuum are not present in the first preferred embodiment because of the relative large equivalent wavelength of $(1/l_1)\Phi$ as expressed by Eq. (22).

The resolution of the phase redundancy in $\psi_1$, if required, presents a problem similar to the one as subsequently described with respect to the required resolution of phase redundancy in θ in the fourth embodiment and variants thereof of the present invention. As a consequence, the procedure described for the resolution of phase redundancy in θ with respect to the fourth embodiment and variants thereof can be adapted for use in the resolution of the phase redundancy in $\psi_1$.

The offset terms involving $\zeta_1$ or/and Q that are present in Eqs. (19) and (20) and defined in Eqs. (2) and (11) are terms that require some combination of determination and/or monitoring depending on whether $\chi$ is variable in time, whether the refractivity or/and the length L are to be determined, respectively, or whether changes in refractivity or/and the length L are to be determined, respectively. The determination and/or monitoring of $\zeta_1$ or/and Q as required presents a problem similar to the one as subsequently described with respect to the determination and/or monitoring of $\zeta_3$ and/or Q in the second and fourth embodiments and variants thereof of the present invention. As a consequence, the procedures described for the determination and/or monitoring of $\zeta_3$ and/or Q with respect to the second and fourth embodiments and variants thereof can be adapted for use in the first embodiment for the determination and/or monitoring of $\zeta_1$ and/or Q as required.

A first variant of the first preferred embodiment is disclosed wherein the description of the apparatus of the first variant of the first embodiment is the same as that given for the apparatus of the first embodiment except with regard to the detection of beams 217 and 218 of the first embodiment shown in FIG. 1a. In the first variant of the first embodiment, a first portion of beam 217 is detected by a detector (not shown in the figures) creating a signal proportional to $s_1$, as$_1$, where a is a constant, and beam 218 and a second portion of beam 217 are detected by a second single detector (not shown in the figures) creating signal $S_{b1+2}=bs_1+s_2$ where b is a constant. Heterodyne signals as$_1$ and $S_{b1+2}$ are transmitted as electronic signals 1103 and 1104, respectively, in either digital or analog format, preferably in digital format, to electronic processor 109A shown in diagrammatic form in FIG. 1c for analysis.

Figure 1C:
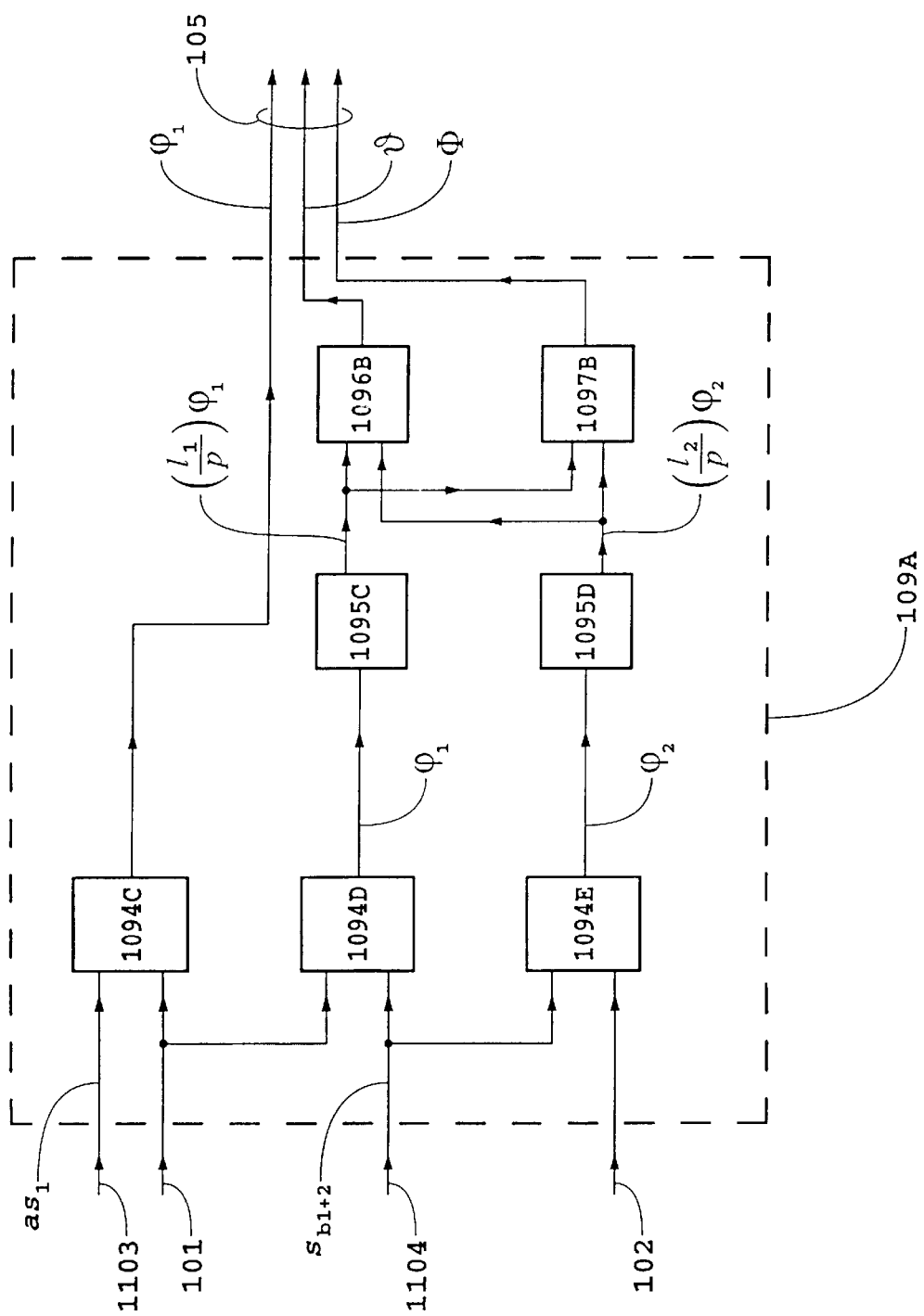
FIG. 1c is a drawing showing a block diagram of the processing electronics 109A for the first variant of the first embodiment.

Referring now to FIG. 1c, electronic processor 109A preferably comprises alphameric numbered elements wherein the numeric component of the alphameric numbers indicate the function of an element, the same numeric component/function association as described for the electronic processing elements of the first embodiment depicted in FIG. 1b. The description of the steps performed by electronic processor 109A in processing heterodyne signals bs$_1$ and s$_2$ comprising $S_{b1+2}$ for phases θ and Φ is the same as corresponding portions, according to the numeric component of the alphameric numbers of elements, of the description of steps performed by electronic processor 109 in processing heterodyne signals s$_1$ and s$_2$ of the first embodiment. The description of the steps in processing heterodyne signal as$_1$ by electronic processor 109A for phase $\psi_1$ is the same as corresponding portions, according to the numeric component of the alphameric numbers of elements, of the description of steps in the processing of the heterodyne signal s$_1$ of the first embodiment by electronic processor 109.

The phases $\psi_1$, θ, and Φ created by electronic processor 109A formally have the same properties as $\psi_1$, θ, and Φ, respectively, created by electronic processor 109 of the second embodiment.

The feature of the first variant of the first embodiment which can be a significant feature is the detection the optical beams creating heterodyne signals bs$_1$ and s$_2$ by a single detector. It will be apparent to those skilled in the art that the single detector feature of the first variant of the first embodiment can be important in reducing or eliminating the effects of differences in certain group delays possible in the first embodiment. The remaining description of the first variant of the first embodiment is the same as corresponding portions of the description given for the first embodiment.

A second variant of the first preferred embodiment is disclosed wherein the description of the apparatus of the second variant of the first embodiment is the same as that given for the apparatus of the first embodiment except with regard to the frequencies $f_1$ and $f_2$ of drivers 5 and 6, respectively, shown in FIG. 1a. In the second variant of the first embodiment, the frequencies of the two drivers 5 and 6 are the same, i.e. $f_1=f_2$. This feature of the second variant of the first embodiment eliminates the effects of differences in group delays in the first embodiment resulting from $f_1 \neq f_2$. The remaining description of the second variant of the first embodiment is the same as the corresponding portions of the description given for the first preferred embodiment.

Figure 1D:
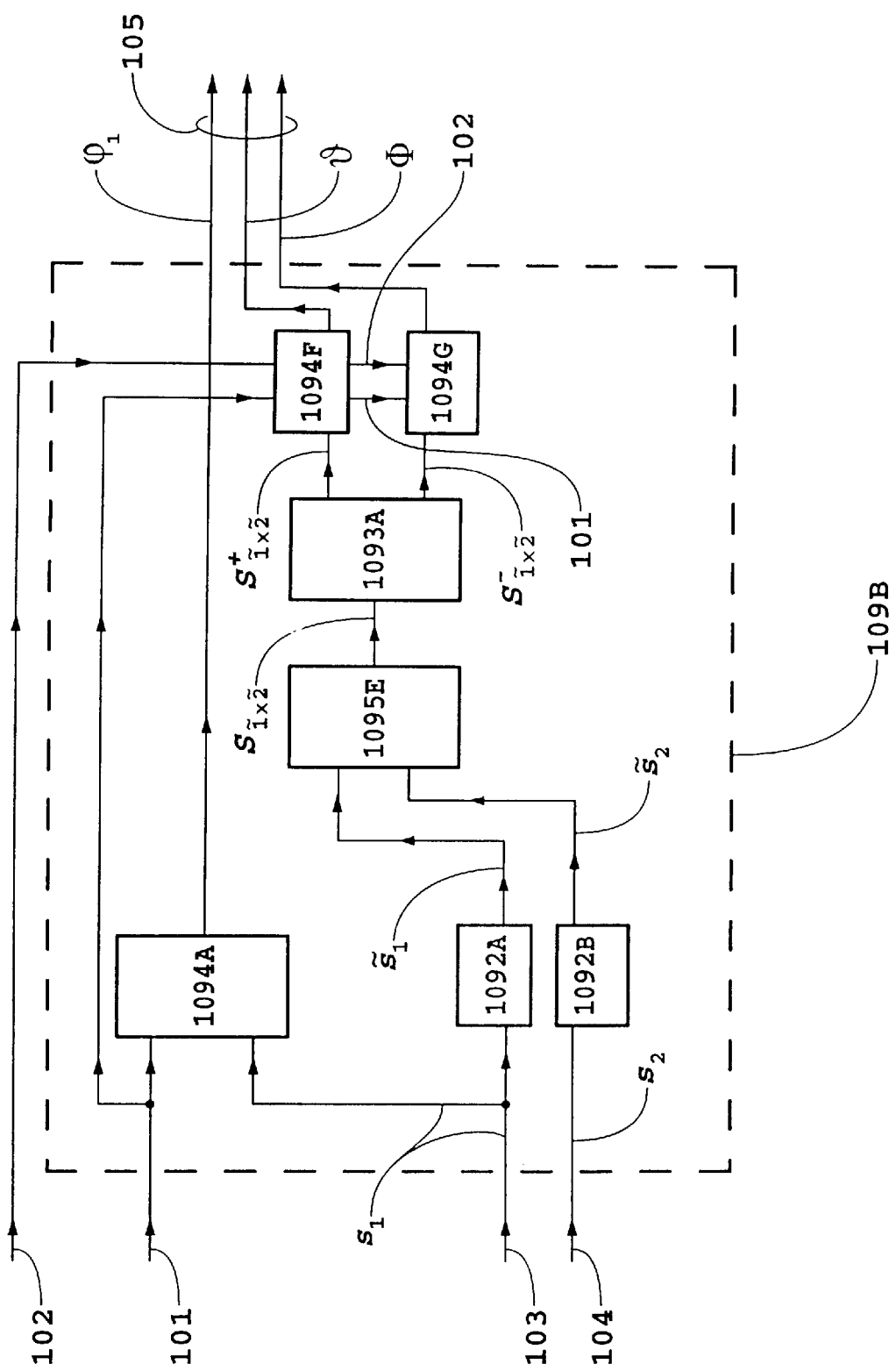
FIG. 1d is a drawing showing a block diagram of the processing electronics 109B for the third variant of the first embodiment.

Reference is now made to FIGS. 1a and 1d which taken together depict in diagrammatic form a third variant of the first preferred embodiment of the present invention for measuring and monitoring the refractivity of a gas in a measurement path and/or the change in the optical path length of the measurement path due to the gas wherein either or both the refractive index of the gas and the physical length of the measurement path may be changing and where the stability of the adopted light sources is sufficient and the wavelengths of the light beams generated by the adopted light sources are harmonically related to a relative precision sufficient to meet the required precision imposed on the output data by the final end use application. The condition wherein the wavelengths are approximately harmonically related corresponds to the special case of the first embodiment in which the ratio $(l_1/l_2)$ is expressible as the ratio of low order non-zero integers $(p_1/p_2)$, i.e.

$$l_1 = p_1, l_2 = p_2, \qquad (24)$$

$$\left(\frac{l_1}{l_2}\right) = \left(\frac{p_1}{p_2}\right), p_1, p_2 = 1, 2, \ldots, p_1 \neq p_2.$$

The description of the sources of light beams 9 and 10 and of light beams 9 and 10 for the second variant of the first embodiment is the same as that for description of the sources of light beams 9 and 10 and of light beams 9 and 10 given for the first embodiment with the additional requirement that the wavelengths be harmonically related to a relative precision sufficient to meet the required precision imposed on the output data by the final end use application. The description of the apparatus for the second variant of the first embodiment depicted in FIG. 1a is the same as corresponding portions of the description given for the first embodiment.

Referring now to FIG. 1d, electronic processing means 109B preferably comprises means 1092A and 1092B for electronically multiplying time-dependent arguments $\alpha_1(t)$ and $\alpha_2(t)$, respectively, of heterodyne signals $s_1$ and $s_2$, respectively, by coefficients $p_1$ and $p_2$, respectively, so as to create two modified heterodyne signals $\tilde{s}_1$ and $\tilde{s}_2$ having the form $$\tilde{s}_j = \tilde{A}_j \cos[p_j \alpha_j(t)], j=1 \text{ and } 2. \qquad (25)$$

The multiplication may be achieved by any one of the conventional frequency multiplying techniques commonly known in the art, such as signal squaring followed by electronic filtering.

Referring again to FIG. 1d, electronic processing means 109B preferably comprises means 1095E for electronically multiplying together, either as an analog or digital process, preferably a digital process, modified heterodyne signals $\tilde{s}_1$ and $\tilde{s}_2$ to create a superheterodyne signal $S_1 \times 2$ having the mathematical form $$S_{1 \times 2} = \tilde{s}_1 \tilde{s}_2. \tag{26}$$

The superheterodyne signal $S_1 \times 2$ is comprised of two sidebands with a suppressed carrier and may be rewritten as $$S_{1 \times 2} = S_{1 \times 2}^{+} + S_{1 \times 2}^{-} \tag{27}$$

where $$S_{1 \times 2}^{+} = \tfrac{1}{2} \tilde{A}_1 \tilde{A}_2 \cos(2\pi \tilde{v} t + \theta), \tag{28}$$

$$S_{1 \times 2}^{-} = \tfrac{1}{2} \tilde{A}_1 \tilde{A}_2 \cos(2\pi \tilde{F} t + \Phi), \tag{29}$$

$$\tilde{v} = (p_1 f_1 + p_2 f_2), \tag{30}$$

$$\theta = (p_1 \psi_1 + p_2 104_2), \tag{31}$$

$$\tilde{F} = (p_1 f_1 - p_2 f_2), \tag{32}$$

$$\Phi = (p_1 \psi_1 - p_2 104_2). \tag{3}$$

Superheterodyne signal $S_1 \times 2$ is therefore comprised of two sidebands, $S_1 \times 2^{+}$ and $S_1 \times 2^{-}$, of equal amplitude, one sideband with frequency $\tilde{v}$ and phase $\theta$ and a second sideband with frequency $\tilde{F}$ and phase $\Phi$.

Referring once again to FIG. 1d, electronic processor 109B preferably comprises processor 1093A to separate the two sideband signals $S_1 \times 2^{+}$ and $S_1 \times 2^{-}$, using filtering or any of the like techniques for separating two signals that are separated in frequency. The frequency $\tilde{F}$ of the lower frequency sideband of the superheterodyne signal can be very much smaller than the frequency $\tilde{v}$ of the higher frequency sideband of the superheterodyne signal as subsequently described in the remaining discussion of the third variant of the first embodiment, considerably simplifying the separating task of processor 1093A. Electronic processor 109B further comprises processors 1094F and 1094G to determine the phases $\theta$ and $\Phi$ using time-based phase detection such as a Hilbert transform phase detector (see section 4.1.1 of "Phase-locked loops: theory, design, and applications" by R. E. Best, ibid.) or the like and the phases of the drivers 5 and 6.

The phases of the drivers 5 and 6 are transmitted as electrical signals in either digital or analog format, preferably a digital format, for use as reference signals 101 and 102, respectively, to electronic processor 109B. The reference signal for the determination of phases $\theta$ and $\Phi$ by way of phase sensitive detection is generated by mixing reference signals 101 and 102 and high pass and low pass filtering, respectively. Electronic processor 109B additionally comprises processor 1094A to determine the phase shift $\psi_1$ using time-based phase detection or the like, reference signal 101 serving as the reference signal in phase sensitive detection.

Reference signals, alternatives to reference signals 101 and 102, may also be generated by an optical pick off means and detectors (not shown in figures) by splitting off portions of beams 9 and 10 with beam splitters, preferably nonpolarizing beam splitters, mixing the portion of the beam 9 and the portion of beam 10 that are split off, and detecting the mixed portions to produce heterodyne reference signals.

The quantities $p\theta$, $p\Phi$, $p\xi$, and $pZ$ of the third variant of the first embodiment are formally the same as $\theta$, $\Phi$, $\xi$, and Z, respectively, of the first embodiment with $l_1 = p_1$ and $l_2 = p_2$. Thus, the refractivity $(n_1 - 1)$ of the gas or changes in L due to the gas in the measuring path can be expressed in terms of other quantities obtained in the third variant of the first embodiment by use of the known relationships cited in this paragraph and by the use of Eqs. (11), (12), (13), (19), and (20) with $l_1 = p_1$ and $l_2 = p_2$ as specified by Eqs. (24).

A preferred embodiment of the invention having been disclosed in the description of the third variant of the first embodiment, the underlying advantages of the third variant of the first embodiment will be made more clear by the following discussion. It is evident from the calculation of the refractivity by Eq. (7) or the calculation of the effect of the refractivity of the gas on the optical path by Eq. (14), that the required accuracies to which the superheterodyne sideband phases $\theta$ and $\Phi$ must be determined are related to the values of the wavenumbers K and $\chi$. In that the frequency $\tilde{F}$ can be very much smaller than the frequency $\tilde{v}$, and since it is generally easier to calculate the phase with high resolution of an electronic signal of lower frequency, it is generally most advantageous to rely on a high-accuracy measurement of the superheterodyne sideband phase $\Phi$. This is readily achieved in the inventive apparatus when the wavenumbers K and $\chi$ are related according to Eq. (16), the calculation of the refractivity by Eq. (19) or the calculation of the effect of the refractivity of the gas on the optical path by Eq. (20) substantially not involving the superheterodyne sideband phase $\theta$. Further, the magnitude of the superheterodyne sideband phase $\Phi$ is less than the magnitude superheterodyne sideband phase $\theta$, less by a factor of approximately $(n_2 - n_1)/(n_2 + n_1)$ as expressed by Eq. (17). This greatly improves in general the phase detection accuracy of the quantity $[\theta(K/\chi) - \Phi]$ that appears in Eqs. (7) and (14) and in particular for moving objects, such as are commonly encountered in microlithography equipment, which may be coupled to the interferometric apparatus as at 267.

Eq. (18) also forms the basis for a conclusion that sources 1 and 2 need not be phase locked for the third variant of the first embodiment. Eq. (18) is actually a weak condition when viewed in terms of a phase-locked requirement for sources 1 and 2. Consider for an example a desired precision of $\epsilon \cong 3 \times 10^{-6}$ for measuring the refractivity $(n_1 - 1)$ of the gas or for the change in the optical path length of the measurement leg due to the gas, corresponding to a relative distance measuring precision of approximately $1 \times 10^{-9}$ in a distance measuring interferometer, $(n_1 - 1) \cong 3 \times 10^{-4}$, and $(n_2 - n_1) \cong 1 \times 10^{-5}$. For the example, the condition expressed by Eq. (18) written in terms of source frequencies $v_1$ and $v_2$ instead of wavelengths $\lambda_1$ and $\lambda_2$, respectively, is $$\left| v_2 - \frac{p_1}{p_2} v_1 \right| \ll 3 \times 10^{-11} v_2. \tag{34}$$

For source wavelengths in the visible part of the spectrum and for low order integers for $p_1$ and $p_2$, Eq. (34) translates into a condition $$\left| v_2 - \frac{p_1}{p_2} v_1 \right| \ll 30 \text{ kHz.} \tag{35}$$

The result expressed in Eq. (35) is clearly a significantly less restrictive condition on the frequencies of sources 1 and 2 than a phase-locked condition.

The remaining description of the third variant of the first embodiment is the same as corresponding portions of the descriptions given for the first embodiment.

It will be appreciated by those skilled in the art that alternative data processing may be considered for the third variant of the first embodiment without departing from the spirit and scope of the present invention. For example, it may prove useful to generate the modified heterodyne signals by electronically dividing time-dependent arguments $\alpha_1(t)$ and $\alpha_2(t)$ of heterodyne signals $s_1$ and $s_2$, respectively, by coefficients $p_2$ and $p_1$, respectively, so as to create two modified heterodyne signals $\tilde{s}_1'$ and $\tilde{s}_2'$ having the forms $$\tilde{s}_1' = \tilde{A}_1' \cos[\alpha_1(t)/p_2], \quad (36)$$

$$\tilde{s}_2' = \tilde{A}_2' \cos[\alpha_2(t)/p_1].$$

The dividing may be achieved by any one of the conventional frequency dividing techniques commonly known in the art, such as the use of phase-locked loops or generation of a rectangle wave signal which changes sign at every other zero crossing of the signal whose argument is being divided by two. The subsequent description of the variant of the first embodiment based on modified heterodyne signals $\tilde{s}_1'$ and $\tilde{s}_2'$ is the same as corresponding portions of the description of the third variant of the first embodiment based on modified heterodyne signals $\tilde{s}_1$ and $\tilde{s}_2$.

Another alternative data processing that may be considered for the third variant of the first preferred embodiment without departing from the spirit and scope of the present invention is the addition of the modified heterodyne signals $\tilde{s}_1$ and $\tilde{s}_2$ together, rather than multiplying them as in the third variant of the first embodiment, resulting in the expression:

$$S_A = \tilde{s}_1 + \tilde{s}_2. \quad (37)$$

A superheterodyne signal would be obtained from $S_A$ by conventional techniques commonly known in the art such as square law detection or by signal rectification. (cf. Dändliker et al., ibid., and Redman and Wall, ibid.). Further, another alternative signal to $S_1 \times 2$ may be generated by selecting the appropriate term in the binomial expansion of $(s_1+s_2)^{p+q}$ through the use of phase sensitive detection.

Reference is now made to FIGS. 2a–2f which depict in diagrammatic form the second preferred embodiment of the present invention for measuring and monitoring the refractivity of a gas in a measurement path and/or the change in the optical path length of the measurement path due to the gas wherein either or both the refractive index of the gas and the physical length of the measurement path may be changing and where the stability of the adopted light sources is sufficient and the ratio of the wavelengths of the light beams generated by the adopted light sources is matched to a known ratio value with a relative precision sufficient to meet the required precision imposed on the output data by the final end use application.

A preferred method for electronically processing the heterodyne signals $s_3$ and $s_4$ is presented herewithin for the case when $l_1$ and/or $l_2$ are not low order integers. For the case when $l_1$ and $l_2$ are both low order integers and the ratio of the wavelengths matched to the ratio $(l_1/l_2)$ with a relative precision sufficient to meet the required precision imposed on the output data by the end use application, the preferred procedure for electronically processing the heterodyne signals $s_1$ and $s_2$ is the same as the one subsequently set down for the second variant of the first preferred embodiment of the present invention.

The second preferred embodiment of the present invention is comprised of a set of differential plane mirror interferometers, the first embodiment being comprised of a polarized Michelson interferometer, wherein the differential plane mirror interferometer is well suited to requirements of micro-lithographic fabrication of integrated circuits. The description of the sources of light beams 9 and 10 and of light beams 9 and 10 for the second embodiment is the same as the description of the sources of light beams 9 and 10 and of light beams 9 and 10 given for the first preferred embodiment of the present invention.

Figure 2A:
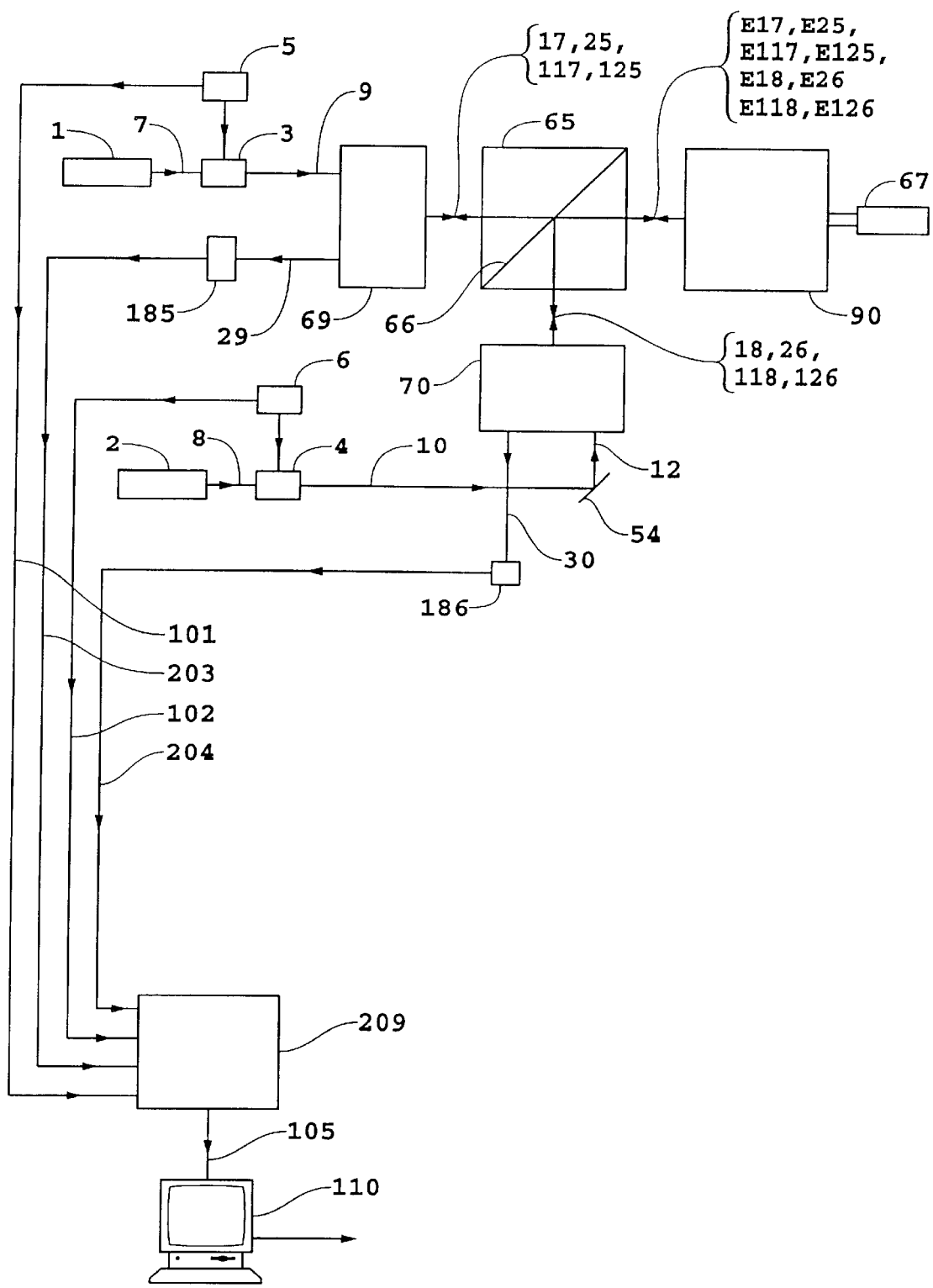
FIGS. 2a–2f taken together illustrate, in diagrammatic form, the presently second preferred embodiment of the present invention with FIG. 2a showing optical paths between indicated elements source 1, modulator 3, source 2, modulator 4, differential plane mirror interferometers 69 and 70, beam splitter 65, external mirror system 90, detectors 185 and 186, and translator 67 and the paths of electrical signals between indicated elements driver 5, modulator 3, driver 6, modulator 4, detectors 185 and 186, electronic processor 209, and computer 110.

As illustrated in FIG. 2a, beam 9 is incident on differential plane mirror interferometer 69 and beam 10 is reflected by mirror 54 as beam 12 which is incident on differential plane mirror interferometer 70. Differential plane mirror interferometers 69 and 70, beam splitter 65, and external mirrors furnished by external mirror system 90 comprise interferometric means for introducing a phase shift $\psi_3$ between the x and y components of beam 9 and a phase shift $\psi_4$ between the x and y components of beam 12.

Figure 2B:
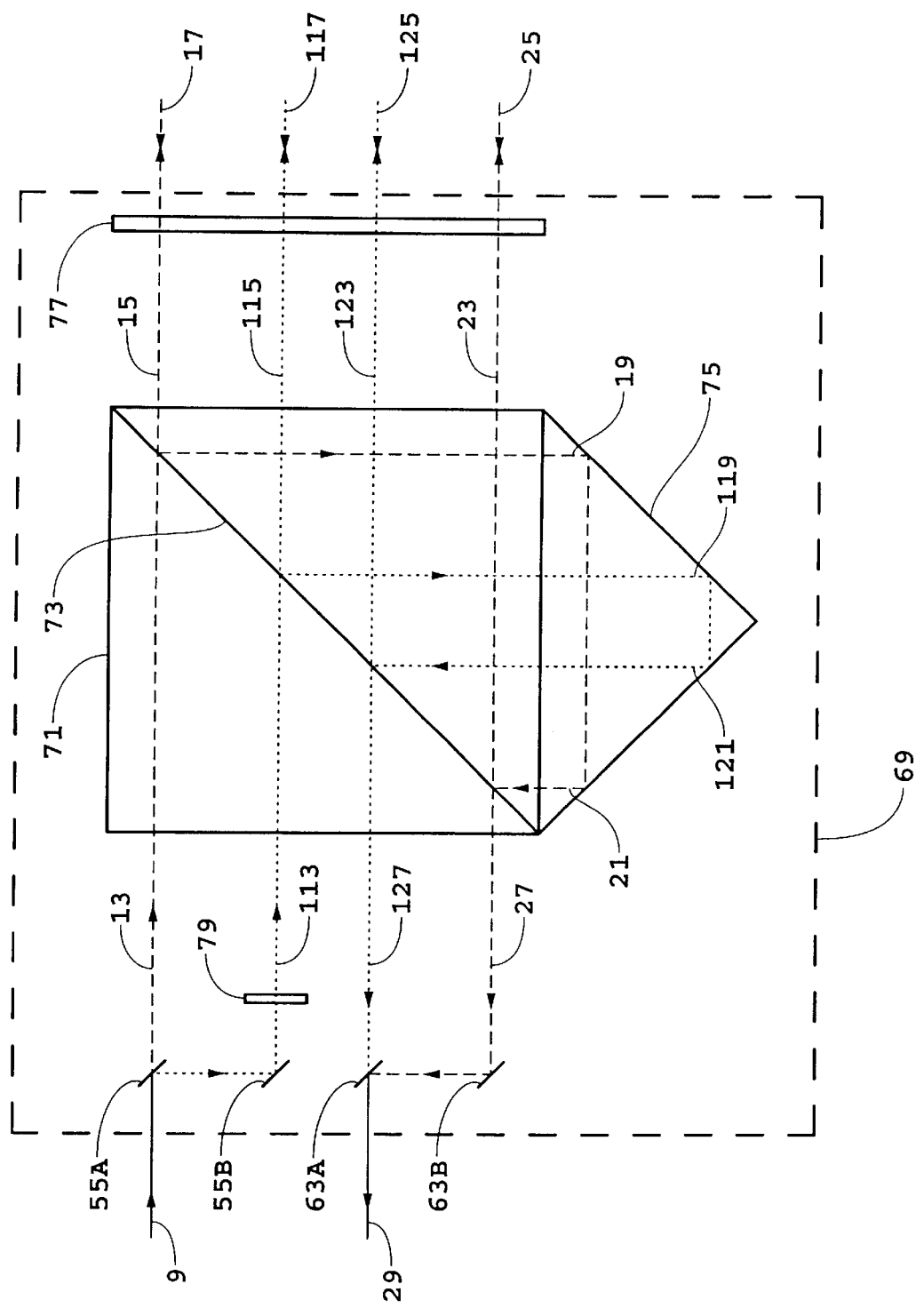

A differential plane mirror interferometer measures the optical path changes between two external plane mirrors. In addition, it is insensitive to thermal and mechanical disturbances that may occur in the interferometer beam splitting cube and associated optical components. Differential plane mirror interferometer 69 has four exit/return beams 17, 25, 117, and 125 as shown in FIG. 2b. Beams 17 and 25 originating from one frequency component of beam 9 comprise one measurement leg and beams 117 and 125 originating from a second frequency component of beam 9 comprise a second measurement leg. Beams for which the first frequency component of beam 9 is the sole progenitor are indicated in FIG. 2b by dashed lines and beams for which the second frequency component of beam 9 is the sole progenitor are indicated in FIG. 2b by dotted lines.

Figure 2C:
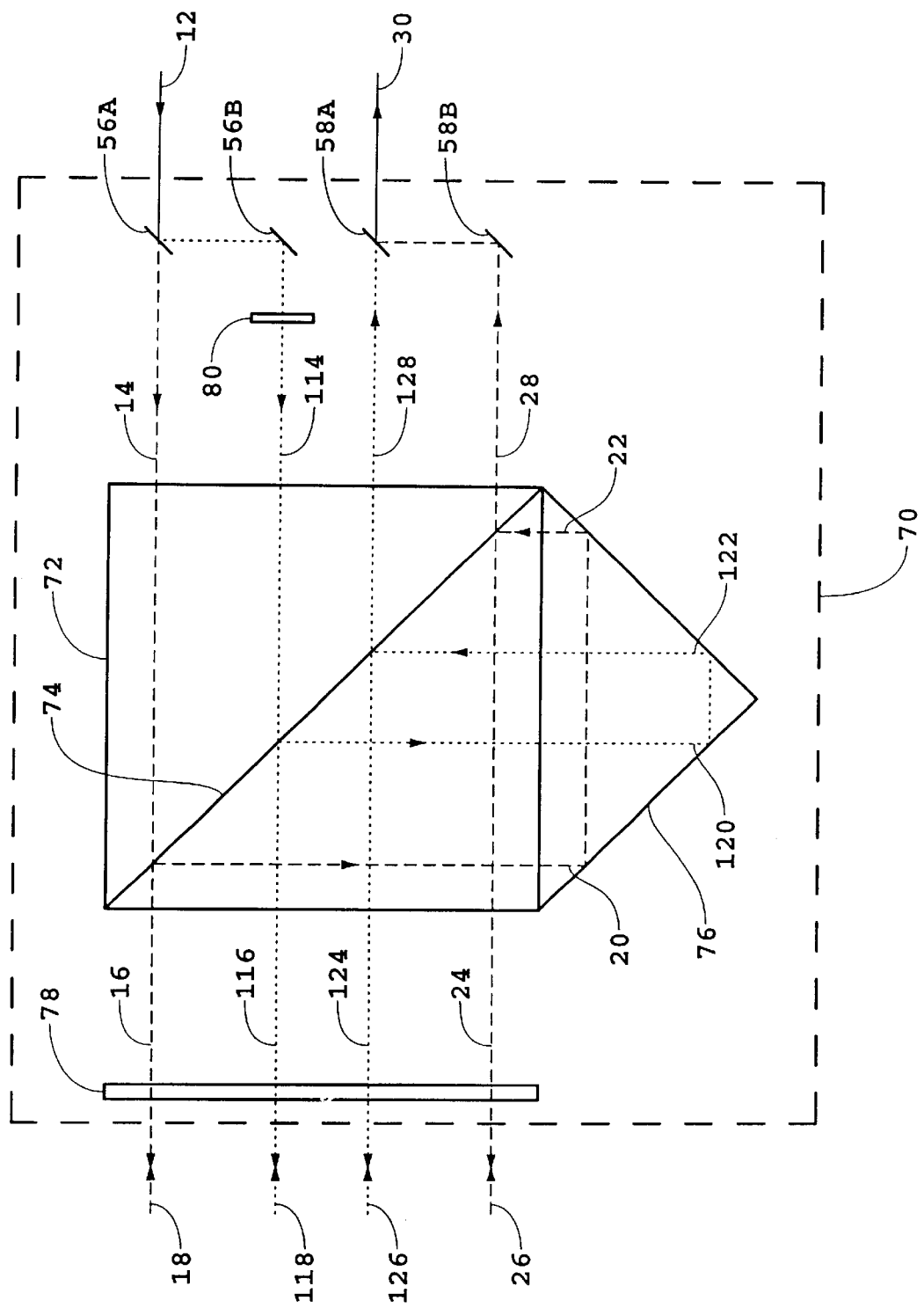

Differential plane mirror interferometer 70 has four exit/return beams 18, 26, 118, and 126 as shown in FIG. 2c. Beams 18 and 26 originating from one frequency component of beam 12 comprise one measurement leg and beams 118 and 126 originating from a second frequency component of beam 12 comprise a second measurement leg. Beams for which the first frequency component of beam 12 is the sole progenitor are indicated in FIG. 2c by dashed lines and beams for which the second frequency component of beam 12 is the sole progenitor are indicated in FIG. 2c by dotted lines.

Beams 17, 25, 117, and 125 are incident on beam splitter 65 and are transmitted by coating 66, preferably a dichroic coating, as beams E17, E25, E117, and E125, respectively. Beams E17, E25, E117, and E125 are incident on external mirror system 90, illustrated in FIG. 2d, which results in beams 27 and 127 shown in FIG. 2b. Beams 127 and 27 contain information at wavelength $\lambda_1$ about the optical path length through the gas in measuring path of external mirror system 90 and about the optical path length through a reference path, respectively. Likewise, beams 18, 26, 118, and 126 are incident on beam splitter 65 and reflected by dichroic coating 66 as beams E18, E26, E118, and E126, respectively. Beams E18, E26, E118, and E126 are incident on external mirror system 90, illustrated in FIG. 2e, which results in beams 28 and 128 shown in FIG. 2c. Beam 128 contains information at wavelength $\lambda_2$ about optical path lengths through the gas in the measuring path of external mirror system 90 and beam 28 contains information at wavelength $\lambda_2$ about optical path lengths through a reference path.

In FIG. 2b, beam 27 is reflected by mirror 63B, a portion of which is reflected by beam splitter 63A, preferably a non-polarizing type, to become one component of beam 29.

A portion of beam 127 is transmitted by beam splitter 63A to become a second component of beam 29. Beam 29 is a mixed beam, the first and second components of beam 29 having the same linear polarizations. Beam 29 exits the differential plane mirror interferometer 69.

Referring to FIG. 2c, beam 28 is reflected by mirror 58B, a portion of which is reflected by beam splitter 58A, preferably a non-polarizing beam splitter, to become a first component of beam 30. A portion of beam 128 is transmitted by beam splitter 58A to become a second component of beam 30. Beam 30 is a mixed beam, the first and second components of beam 30 having the same linear polarizations.

The magnitude of phase shifts $\psi_3$ and $\psi_4$ are related to the difference $L_i$ between the round-trip physical length of path i of measurement path 98 and of reference paths shown in FIGS. 2a–2e according to the formulae $$\varphi_3 = \sum_{i=1}^{i=p} \varphi_{3,i} = \sum_{i=1}^{i=p} L_i k_1 n_{1i} + \zeta_3, \quad (38)$$

$$\varphi_4 = \sum_{i=1}^{i=p} \varphi_{4,i} = \sum_{i=1}^{i=p} L_i k_2 n_{2i} + \zeta_4,$$

where $n_{ji}$ are the refractive indices of gas in path i of measurement path 98 corresponding to wavenumber $k_j$. The nominal value for $L_i$ corresponds to twice the spatial separation of mirror surfaces 95 and 96 in external mirror system 90 (cf. FIGS. 2d and 2e). The phase offsets $\zeta_j$ comprise all contributions to the phase shifts $\psi_j$ that are not related to the measurement path 98 or reference paths. In FIGS. 2a–2e, differential plane mirror interferometers 69 and 70, beam splitter 65, and external mirror system 90 are configured so that p=2 so as to illustrate in the simplest manner the function of the apparatus of the second preferred embodiment of the present invention.

Eqs. (38) are valid for the case where the paths for one wavelength and the paths for the second wavelength are substantially coextensive, a case chosen to illustrate in the simplest manner the function of the invention in the second embodiment. To those skilled in the art, the generalization to the case where the respective paths for the two different wavelengths are not substantially coextensive is a straight forward procedure.

Cyclic errors that produce nonlinearities in distance measuring interferometry (cf. the cited articles by Bobroff) have been omitted in Eqs. (38). The description of techniques known to those skilled in the art for either the reduction of the cyclic errors to negligible levels or for the compensation for the presence of cyclic errors is the same as corresponding portions of the description given for the first preferred embodiment.

In a next step as shown in FIG. 2a, phase-shifted beams 29 and 30 impinge upon photodetectors 185 and 186, respectively, resulting in two electrical interference signals, heterodyne signals $s_3$ and $s_4$, respectively, preferably by photoelectric detection. The signal $s_3$ corresponds to wavelength $\lambda_1$ and signal $s_4$ corresponds to the wavelength $\lambda_2$. The signals $s_j$ have the form the same as that expressed by Eq. (3) with j=3 and 4. Heterodyne signals $s_3$ and $s_4$ are transmitted to electronic processor 209 for analysis as electronic signals 203 and 204, respectively, in either digital or analog format, preferably in digital format.

Figure 2D:
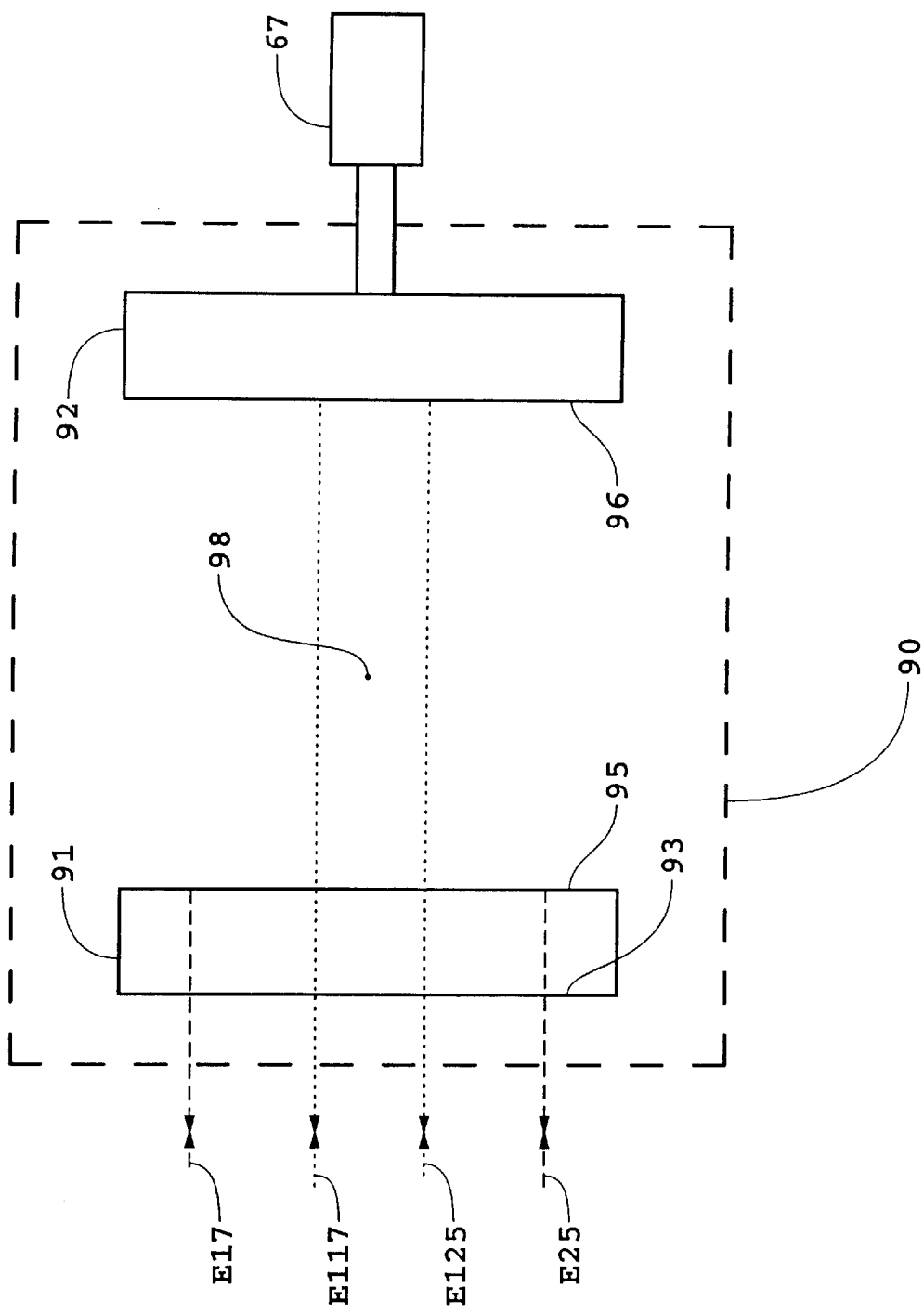
Figure 2E:
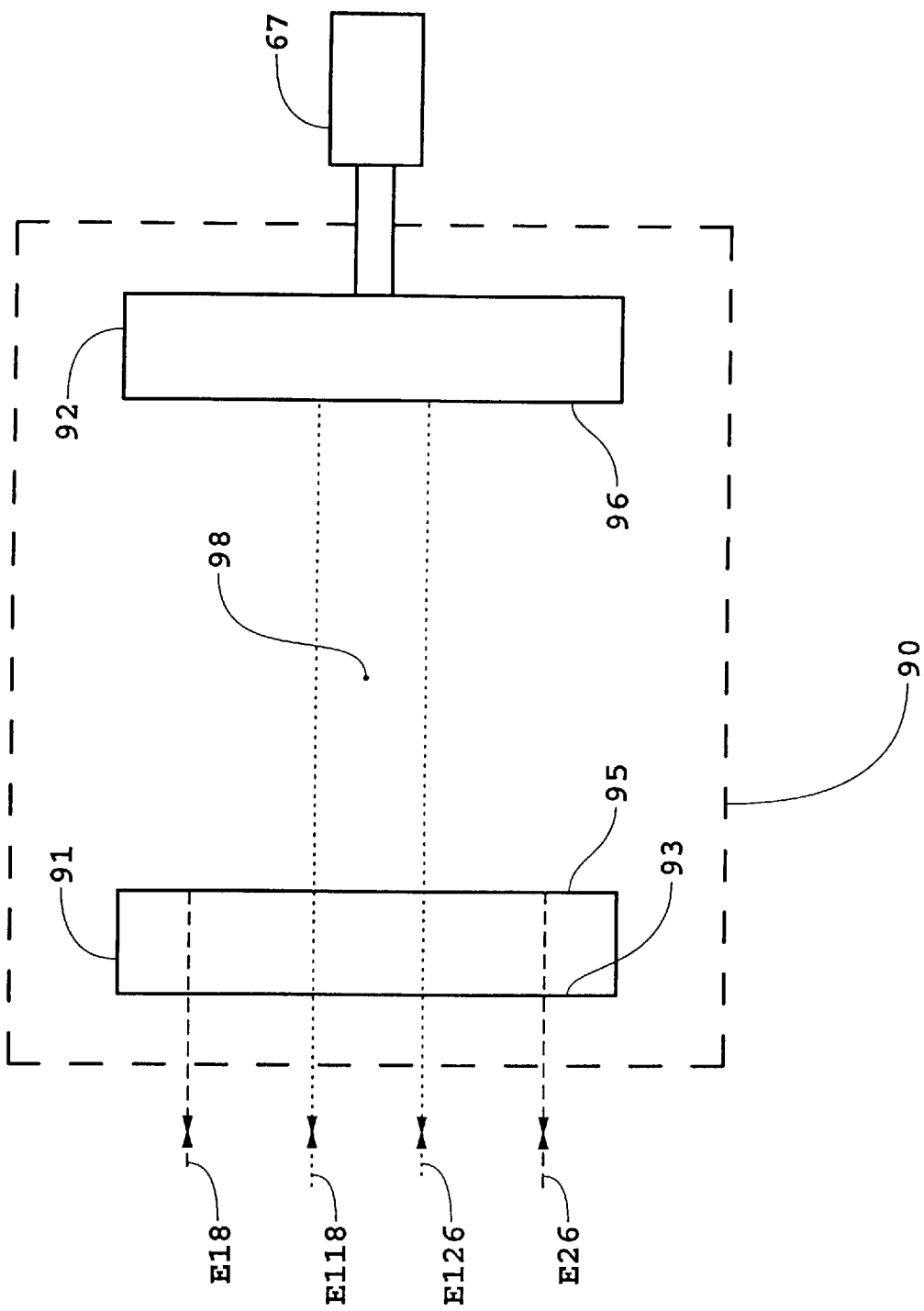
Figure 2F:
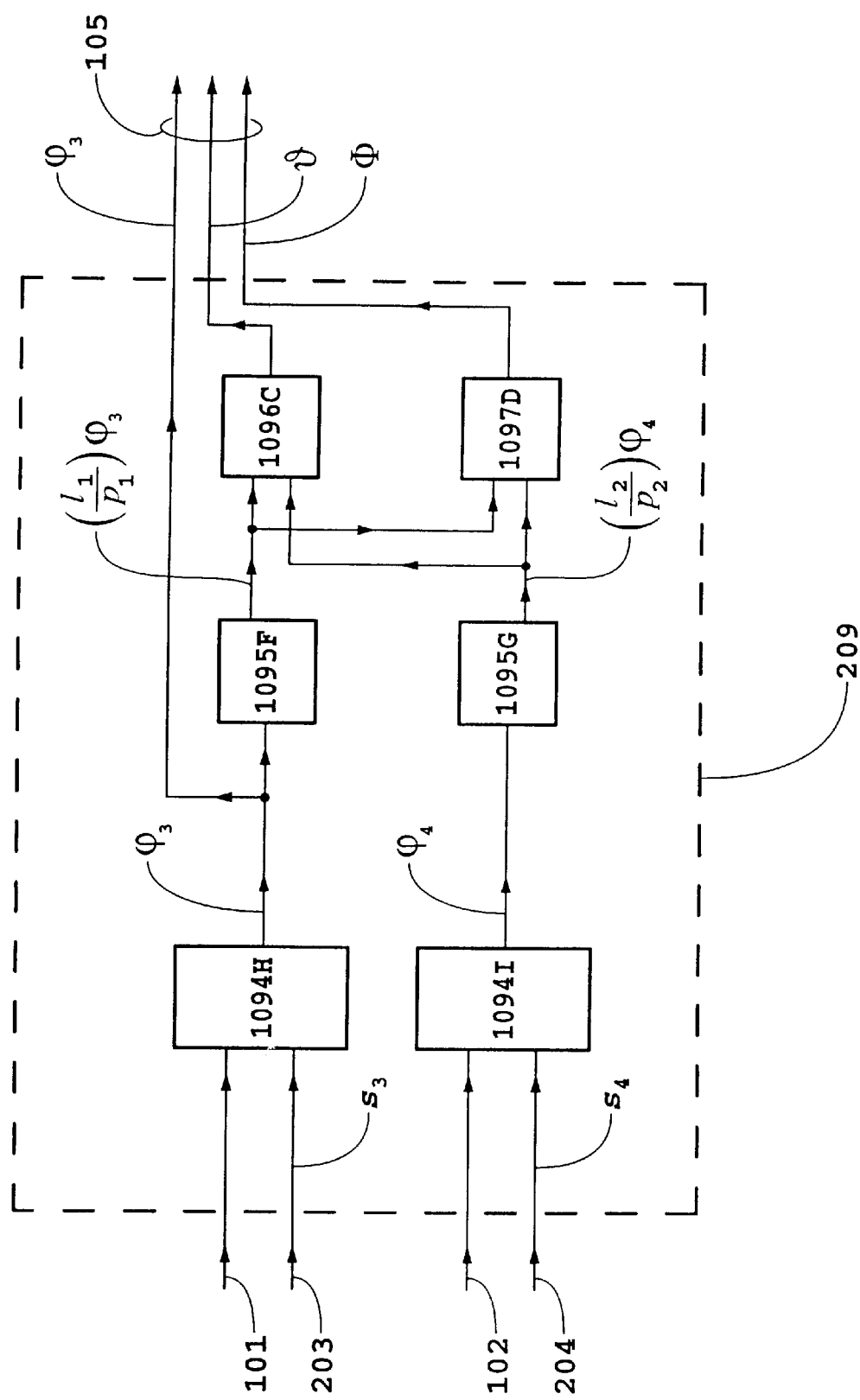

Referring now to FIG. 2f, electronic processor 209 preferably is comprised of alphameric numbered elements wherein the numeric component of the alphameric numbers indicate the function of an element, the same numeric component/function association as described for the electronic processing elements of the first embodiment depicted in FIG. 1b. The description of the steps in processing of the heterodyne signals $s_3$ and $s_4$ by electronic processor 209 for phases $\theta$ and $\Phi$ is the same as corresponding portions, according to the numeric component of the alphameric numbers of elements, of the description of steps in the processing of the heterodyne signals $s_1$ and $s_2$ of the first embodiment by electronic processor 109.

The phases $\psi_3$, $\theta$, and $\Phi$ created by electronic processor 209 formally have the same properties as $\psi_1$, $\theta$, and $\Phi$, respectively, created by electronic processor 109 of the first embodiment. Thus, the refractivity $(n_1-1)$ of the gas or changes in L due to the gas in the measuring path can be expressed in terms of other quantities obtained in the second embodiment by use of the known relationships cited in this paragraph and by the use of Eqs. (19) and (20).

The resolution of phase redundancy in $\psi_3$ is required in the computation of L using Eq. (20) and the resolution of the phase redundancy in $\psi_3$ is required in the computation of changes L using Eq. (20) if $\chi$ is variable in time. The resolution of the phase redundancy in $\psi_3$, if required, presents a problem similar to the one as subsequently described with respect to the resolution of phase redundancy in $\theta$ in the fourth embodiment of the present invention. As a consequence, the procedures described for the resolution of phase redundancy in $\theta$ with respect to the fourth embodiment can be adapted for use in the resolution of the phase redundancy in $\theta_3$.

The offset terms involving $\zeta_3$ and Q that are present in Eqs. (19) and (20) and defined in Eqs. (2) and (11) are terms that may require determination and monitoring depending on whether the refractivity $(n_1-1)$ and/or L are being measured, whether changes in the refractivity $(n_1-1)$ and/or L are being measured, whether $\zeta_3$ and/or Q are variable in time, and/or whether $\chi$ is variable in time. One procedure for the determination of $\theta_3$ and Q is based on replacement of mirror 91 of the external mirror system 90 with a mirror R91 (not shown in FIGS. 2d and 2e) having a surface R93 corresponding to surface 93 of mirror 91 coated so as be a reflecting surface for both wavelengths $\lambda_1$ and $\lambda_2$ and measuring the resulting values of $\psi_3$ and $\Phi$. Let the resulting values of $\psi_3$ and $\Phi$ be $\psi_{3R}$ and $\Phi_R$, respectively. The quantities $\zeta_3$ and Q are related to $\psi_{3R}$ and $\Phi_R$, respectively, as evident from Eqs. (2) and (19) by the formulae $$\zeta_3 = \psi_{3R}, \quad (39)$$

$$Q = -\Phi_R. \quad (40)$$

The non-electronic contributions to $\zeta_3$ and Q should be substantially constant in time because of the significant level of compensation that takes place in the differential plane mirror interferometers 69 and 70, beam splitter 65, and external mirror system 90. The electronic contributions to $\zeta_3$ and Q may be monitored by purely electronic means (not shown).

It will be apparent to someone skilled in the art that as a consequence of the incorporation of beam splitter 65 in the second preferred embodiment, polarizing coating 73 of beam splitter 71 and quarter-wave retardation plate 77 need only meet performance specifications at $\lambda_1$ while polarizing coating 74 of beam splitter 72 and quarter-wave retardation plate 78 need only meet performance specifications at $\lambda_2$. This assignment of critical operations according to wavelength as disclosed in the second embodiment is an important aspect of the present invention, particularly in applications requiring precision such as the case of microlithographic fabrication of integrated circuits. However, the assignment of operations according to wavelength need not done as disclosed in the second preferred embodiment, e.g. the function of beam splitters 71 and 72 being achieved by a single beam splitter with an appropriately modified polarizing surface, without departing from the spirit or scope of the present invention.

FIG. 2b depicts in schematic form one embodiment of the differential plane mirror interferometer 69 shown in FIG. 2a. It operates in the following way: beam 9 is incident on beam splitter 55A, preferably a polarizing beam splitter, with a portion of beam 9 being transmitted as beam 13. A second portion of beam 9 is reflected by beam splitter 55A, subsequently reflected by mirror 55B, and then transmitted by half-wave phase retardation plate 79 as beam 113, the half-wave phase retardation plate 79 rotating by 90° the plane of polarization of the second portion of beam 9 reflected by beam splitter 55A. Beams 13 and 113 have the same polarizations but still have different frequencies. The function of beam splitter 55A and mirror 55B is to spatially separate the two frequency components of beam 9 using conventional polarization techniques.

Beams 13 and 113 enter polarizing beam splitter 71, which has a polarizing coating 73, and are transmitted as beams 15 and 115, respectively. Beams 15 and 115 pass through quarter-wave phase retardation plate 77 and are converted into circularly polarized beams 17 and 117, respectively. Beams 17 and 117 are transmitted by beam splitter 65 with dichroic coating 66, reflected back on themselves by mirrors within external mirror system 90 as illustrated in FIG. 2d, pass back through beam splitter 65, and subsequently pass back through quarter-wave retardation plate 77 and converted into linearly polarized beams that are orthogonally polarized to the original incident beams 15 and 115. These beams are reflected by polarizing coating 73 to become beams 19 and 119, respectively. Beams 19 and 119 are reflected by retroreflector 75 to become beams 21 and 121, respectively. Beams 21 and 121 are reflected by polarizing coating 73 to become beams 23 and 123, respectively. Beams 23 and 123 pass through quarter-wave phase retardation plate 77 and are converted into circularly polarized beams 25 and 125, respectively. Beams 25 and 125 are transmitted by beam splitter 65, reflected back on themselves by mirrors within external mirror system 90 as illustrated in FIG. 2d, pass back through beam splitter 65, and subsequently pass back through quarter-wave retardation plate 77 and converted into linearly polarized beams, the linear polarizations being the same as the linear polarizations of the original incident beams 15 and 115. These beams are transmitted by polarizing coating 73 to become beams 27 and 127, respectively.

Beam 27 is reflected by mirror 63B, and then a portion reflected by beam splitter 63A, preferably a non-polarizing type, as a first component of beam 29. Beam 127 is incident on beam splitter 63A with a portion of beam 127 being transmitted as a second component of beam 29, the first and second components of beam 29 having the same linear polarizations but still having different frequencies. Phase-shifted beam 29 is a mixed beam, the first and second components of beam 29 having the same linear polarizations.

FIG. 2c depicts in schematic form one embodiment of differential plane mirror interferometer 70 shown in FIG. 2a. It operates in the following way: Beam 12 is incident on beam splitter 56A, preferably a polarizing beam splitter, with a portion of beam 12 being transmitted as beam 14. A second portion of beam 12 is reflected by beam splatter 56A, subsequently reflected by mirror 56B, and then transmitted by half-wave phase retardation plate 80 as beam 114, the half-wave phase retardation plate 80 rotating by 90° the plane of polarization of the second portion of beam 12 reflected by beam splitter 56A. Beams 14 and 114 have the same polarizations but still have different frequencies. The function, in part, of beam splitter 56A and mirror 56B is to spatially separate the two frequency components of beam 12 using conventional polarization techniques.

Beams 14 and 114 enter polarizing beam splitter 72, which has a polarizing coating 74, and are transmitted as beams 16 and 116, respectively. Beams 16 and 116 pass through quarter-wave phase retardation plate 78 and are converted into circularly polarized beams 18 and 118, respectively. Beams 18 and 118 are reflected by beam splitter 65 with dichroic coating 66, reflected back on themselves by mirrors within external mirror system 90 as illustrated in FIG. 2e, reflected by surface 66 of beam splitter 65 a second time, and subsequently pass back through quarter-wave retardation plate 78 and converted into linearly polarized beams that are orthogonally polarized to the original incident beams 16 and 116. These beams are reflected by polarizing coating 74 to become beams 20 and 120, respectively. Beams 20 and 120 are reflected by retroreflector 76 to become beams 22 and 122, respectively. Beams 22 and 122 are reflected by polarizing coating 74 to become beams 24 and 124, respectively. Beams 24 and 124 pass through quarter-wave phase retardation plate 78 and are converted into circularly polarized beams 26 and 126, respectively. Beams 26 and 126 are reflected by surface 66 of beam splitter 65, reflected back on themselves by mirrors within external mirror system 90 as illustrated in FIG. 2e, reflected by surface 66 of beam splitter 65 a second time, and subsequently pass back through quarter-wave retardation plate 78 and converted into linearly polarized beams, the same linear polarizations as the linear polarizations of the original incident beams 16 and 116. These beams are transmitted by polarizing coating 74 to become beams 28 and 128, respectively. Beams 28 and 128 contain information at wavelength $\lambda_2$ about the optical path lengths through the gas in measurement path 98 wherein the effects of the refractivity of the gas is to be determined and about the optical path lengths through the reference leg, respectively.

Beam 28 is reflected by mirror 58B, and then a portion reflected by beam splitter 58A, preferably a non-polarizing type, as a first component of beam 30. Beam 128 is incident on beam splitter 58A with a portion of beam 128 being transmitted as a second component of beam 30, the first and second components of beam 30 having the same linear polarizations but still having different frequencies. Phase-shifted beam 30 is a mixed beam, the first and second components of beam 30 having the same linear polarizations.

The remaining description of the second preferred embodiment is the same as corresponding portions of the description given for the first preferred embodiment.

There are three variants of the second embodiment wherein the description of each of the three variants of the second embodiment is the same as corresponding portions of descriptions given for the three variants of the first preferred embodiment.

The description of the first preferred embodiment noted that the configuration of interferometer illustrated in FIG. 1a is known in the art as a Michelson interferometer. The description of the second preferred embodiment noted that the configuration of interferometers illustrated in FIGS.

2a–2e are known in the art as differential plane mirror interferometers. Other forms of the differential plane mirror interferometer and forms of other interferometers such as the plane mirror interferometer or the angle-compensating interferometer or similar device such as is described in an article entitled "Differential interferometer arrangements for distance and angle measurements: Principles, advantages and applications" by C. Zanoni, *VDI Berichte* Nr. 749, 93–106 (1989), is preferably incorporated into the apparatus of the first embodiment of the present invention as when working with stages commonly encountered in the microlithographic fabrication of integrated circuits without significantly departing from the spirit and scope of the present invention.

The third and fourth preferred embodiments of the present invention and variants thereof, illustrated in FIGS. 3a–3b and 4a–4c, respectively, are embodiments to measure a refractivity of a gas and/or the change in the optical path length of a measurement path due to the gas when the condition set fourth in Eq. (18) for the first and second preferred embodiments and variants thereof is not satisfied, i.e.

$$\left|\frac{\lambda_1}{\lambda_2} - \frac{l_1}{l_2}\right| \ll \left(\frac{l_2}{l_1}\right)(n_2 - n_1)\varepsilon. \tag{41}$$

Under the condition set fourth in Eq. (41), the approximate ratio, preferably the ratio $(K/\chi)$, must be either known or measured in accordance with Eqs. (7) and (14) for the third and fourth embodiments and variants thereof in addition to already described quantities in order to achieve the required accuracy in the determination of a refractivity of the gas and/or the change in the optical path of the measurement path due to the gas.

Each of the first and second preferred embodiments and variants thereof can be converted from an apparatus and method for measuring a refractivity of the gas and/or the change in the optical path of the measurement path due to the gas to an apparatus and method for measuring $\chi$ and/or the ratio $(K/\chi)$. The conversion, as demonstrated in the following descriptions, is accomplished by changing the measurement legs of the first and second embodiments and variants thereof so that the measuring paths through a gas in respective measurement paths 298 and 98 are replaced by a predetermined medium, preferably a vacuum, and the respective measurement legs have a fixed physical length. Accordingly, the third embodiment and variants thereof are each comprised of an unmodified and a modified apparatus and method from the first embodiment or a variant thereof and the fourth embodiment and variants thereof are each comprised of an unmodified and a modified apparatus and method from the second embodiment of a variant thereof, the modified apparatus and method being comprised of the respective unmodified apparatus and method with a modified measurement leg.

Figure 3A:
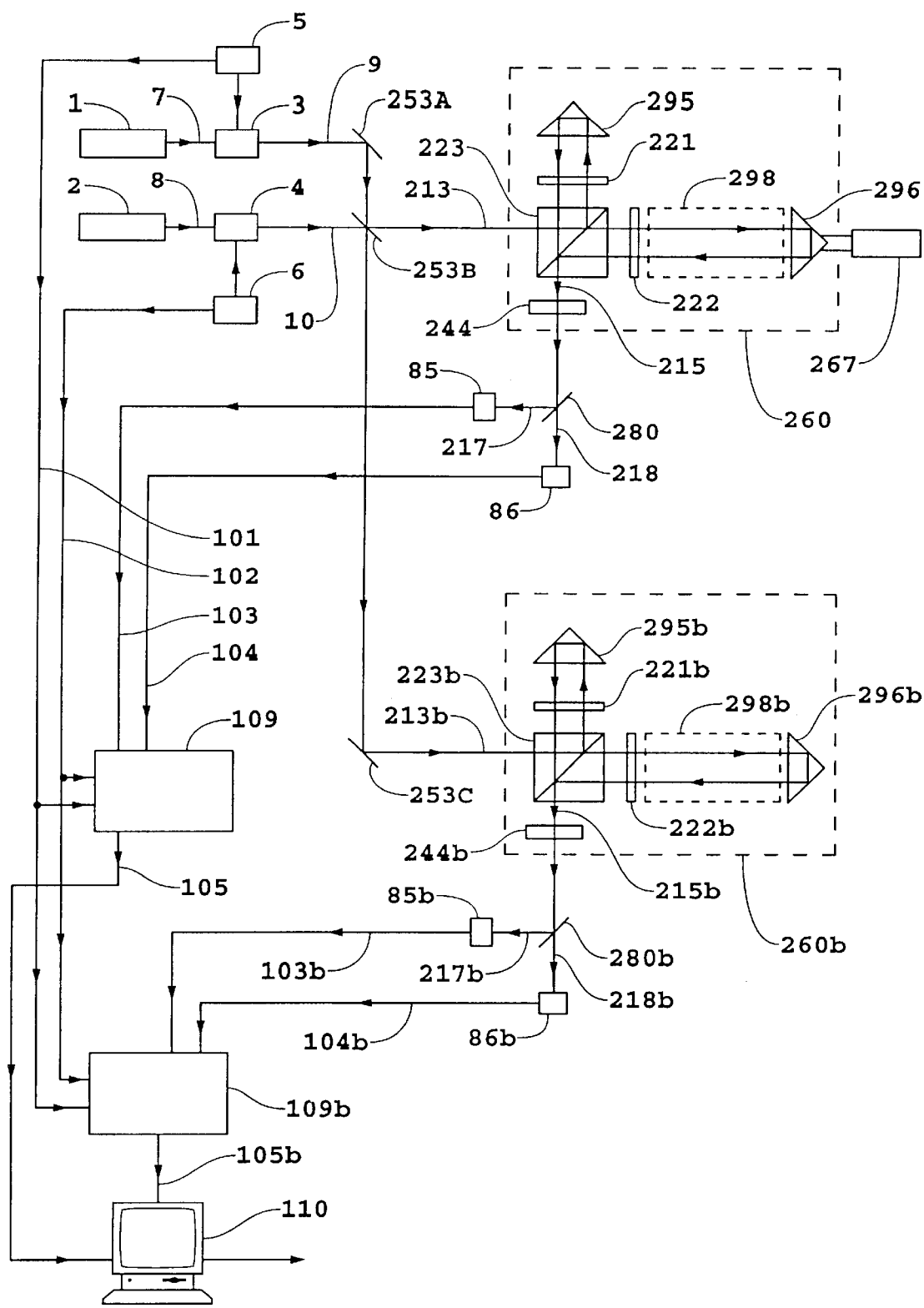
FIGS. 3a–3b taken together illustrate, in diagrammatic form, the presently preferred third embodiment of the present invention with FIG. 3a showing optical paths and electronic paths of apparatus for determination of refractive index of a gas and/or the optical path length effects of the gas comprised in part of the same apparatus as for the first preferred embodiment and optical paths and electronic paths of apparatus for determination of $\chi$ and the ratio $K/\chi$, a number of elements of the apparatus for determination of $\chi$ and the ratio $K/\chi$ performing analogous operations as apparatus of the first preferred embodiment apart from the suffix "b" when referring to apparatus for determination of $\chi$ and the ratio $K/\chi$.
Figure 3B:
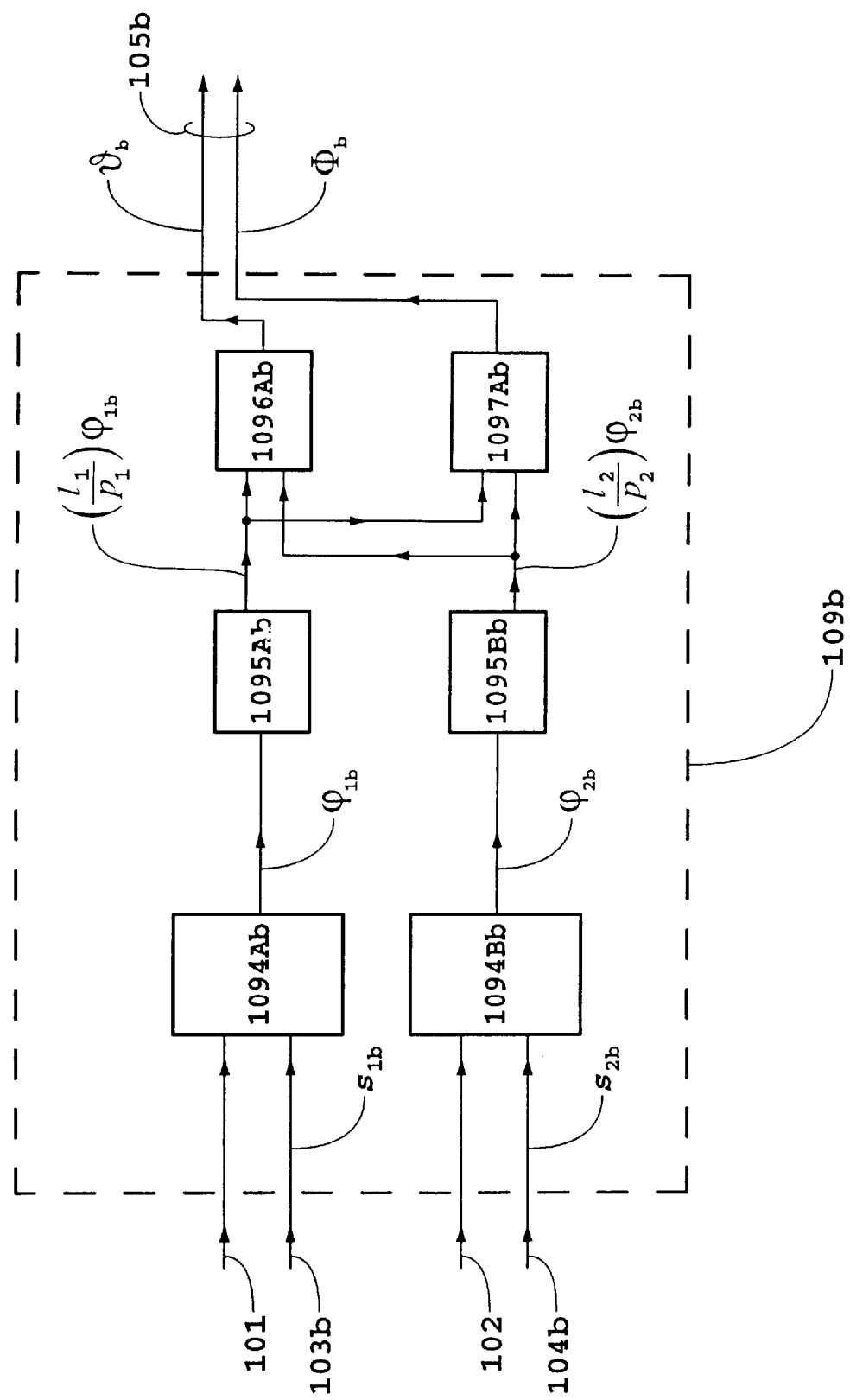

Reference is now made to FIGS. 3a–3b that depict in diagrammatic form the third preferred embodiment of the present invention. The description of the source of light beam 9 of the third embodiment is the same as that for light beam 9 of the first preferred embodiment and the description of the source of light beam 10 of the third embodiment is the same as that for light beam 10 of the first preferred embodiment except that the condition on wavelengths $\lambda_1$ and $\lambda_2$ expressed by Eq. (18) is replaced by the condition set fourth in Eq. (41). Light beam 9 is reflected by mirror 253A and a first portion reflected by beam splitter 253B, preferably a non-polarizing type, to become one component of beam 213, the $\lambda_1$ component. A second portion of beam 9 reflected by mirror 253A is transmitted by beam splitter 253B and reflected by mirror 253c to become one component of beam 213b, the $\lambda_1$ component. Light beam 10 is incident on beam splitter 253B and a first portion transmitted to become a second component of beam 213, the $\lambda_2$ component. A second portion of beam 10 is reflected by beam splitter 253B and reflected by mirror 253c to become a second component of beam 213b, the $\lambda_2$ component (see FIG. 3a). The $\lambda_1$ and $\lambda_2$ components of beams 213 and 213b are preferably parallel and coextensive, respectively.

Because of the requirement in the third preferred embodiment to measure $\chi$ and/or the ratio $(K/\chi)$, the third preferred embodiment as described in a preceding paragraph is comprised in part of the same apparatus and method as for the first preferred embodiment and of additional means for determination of $\chi$ and/or the ratio $(K/\chi)$. The additional means for determination of $\chi$ and/or the ratio $(K/\chi)$ is the same as the apparatus and method of the first preferred embodiment except for the measurement path 298. Consequently, a number of elements of the apparatus shown in FIGS. 3a–3b for determination of $\chi$ and/or the ratio $(K/\chi)$ perform analogous operations as apparatus for determination of a refractivity of a gas and/or the change in the optical path length of a measurement path due to the gas of the first preferred embodiment, apart from the suffix "b" when referring to apparatus for determination of $\chi$ and/or the ratio $(K/\chi)$.

The description of interferometer 260b is the same as that for interferometer 260 except with respect to the gas in measurement path 298b and the round-trip physical length of the measurement path 298b. The measurement leg in the interferometer 260b of the third preferred embodiment includes measurement path 298b as illustrated in FIGS. 3a, measurement path 298b preferably being an evacuated volume of fixed length $(L_b/2)$.

The differences in the measurement path 298b and 298 lead to modifications of Eqs. (2) such that the magnitude of phase shifts $\psi_{1b}$ and $\psi_{2b}$, counterparts to phase shifts $\psi_i$ and $\psi_2$, respectively, are related to the round-trip physical length $L_b$ of measurement path 298b and to reference paths as shown in FIG. 3a according to the formulae $$\psi_{jb} = L_b p k_j + \zeta_{jb}, \ j=1 \text{ and } 2 \tag{42}$$

In a next step as shown in FIG. 3a, phase-shifted beams 217b and 218b impinge upon photodetectors 85b and 86b, respectively, resulting in two interference signals, heterodyne signals $s_{1b}$ and $s_{2b}$, respectively, preferably by photoelectric detection. The signal $s_{1b}$ corresponds to wavelength $\lambda_1$ and signal $s_{2b}$ corresponds to the wavelength $\lambda_2$. The signals $s_{jb}$ have the form $$s_{jb} = A_{jb} \cos[\alpha_{jb}(t)], \ j=1 \text{ and } 2 \tag{43}$$

where the time-dependent arguments $\alpha_{jb}(t)$ are given by $$\alpha_{jb}(t) = 2\pi f_j t + \psi_{jb}, \ j=1 \text{ and } 2. \tag{44}$$

Heterodyne signals $s_{1b}$ and $s_{2b}$ are transmitted to electronic processor 109b for analysis as electronic signals 103b and 164b, respectively, in either digital or analog format, preferably in digital format.

A preferred method for electronically processing the heterodyne signals s1b and s2b is presented herewithin for the case when $I_1$ and/or $I_2$ are not low order integers. For the case when $I_1$ and $I_2$ are both low order integers and the ratio of the wavelengths matched to the ratio $(l_1/l_2)$ with a relative precision sufficient to meet the required precision imposed on the output data by the end use application, the preferred procedure for electronically processing the heterodyne signals $s_1$ and $s_2$ is the same as the one subsequently set down for the third variant of the third preferred embodiment of the present invention.

Referring now to FIG. 3b, electronic processor 109b further comprises electronic processors 1094Ab and 1094Bb to determine the phases $\psi_{1b}$ and $\psi_{2b}$, respectively, by either digital or analog signal processes, preferably digital processes, using time-based phase detection such as a digital Hilbert transform phase detector [R. E. Best, ibid.] or the like and the phase of drivers 5 and 6.

Referring again to FIG. 3b, the phase $\psi_{1b}$ and the phase $\psi_{2b}$ are next multiplied by $l_1/P$ and $l_2/p$, respectively, in electronic processors 1095Ab and 1095Bb, respectively, preferably by digital processing, resulting in phases $(l_1/p)\psi_{1b}$ and $(l_2/p)\psi_{2b}$, respectively. The phases $(l_1/p)\psi_{1b}$ and $(l_2/p)\psi_{2b}$ are next added together in electronic processor 1096Ab and subtracted one from the other in electronic Processor 1097Ab, preferably by digital processes, to create the phases $\theta_{1b}$ and $\Phi_{1b}$, respectively. Formally, $$\vartheta_{1b} = \left(\frac{l_1}{p}\varphi_{1b} + \frac{l_2}{p}\varphi_{2b}\right), \quad (45)$$

$$\Phi_{1b} = \left(\frac{l_1}{p}\varphi_{1b} - \frac{l_2}{p}\varphi_{2b}\right). \quad (46)$$

The phases $\theta_{1b}$ and $\Phi_{1b}$ are transmitted to computer 110 as signals 105b, in either digital or analog format, preferably in digital format.

The quantities $\chi$ and K are related to phase $\theta_b$ and phase $\Phi_b$ according to the formulae $$\chi = (\theta_b - \xi_b)/(2L_b), \quad (47)$$

$$K = (\Phi_b - Z_b)/(2L_b), \quad (48)$$

where $$\xi_{2b} = \left(\frac{l_1}{p}\zeta_{1b} + \frac{l_2}{p}\zeta_{2b}\right), \quad (49)$$

$$Z_{2b} = \left(\frac{l_1}{p}\zeta_{1b} - \frac{l_2}{p}\zeta_{2b}\right). \quad (50)$$

Eqs. (47) and (48) show that within a multiplicative factor $[1/(2L_b)]$ and phase offset terms $\xi_b$ and $Z_b$, $\chi$ and K are equal to the phase $\theta_b$ and the phase $\Phi_b$, respectively.

The ratio (K/$\chi$) can be expressed by the formula $$\frac{K}{\chi} = \frac{(\Phi_b - Z_b)}{(\vartheta_b - \xi_b)} \quad (51)$$

using Eqs. (47) and (48). Therefore the ratio (K/$\chi$) is obtained by substantially dividing $\Phi_b$ by $\theta_b$ without the requirement for an accurate measurement of L to the same precision as required for (K/$\chi$). The phase redundancy of $\Phi_b$ can be determined as part of the same procedure used to remove the phase redundancy of $\Phi$ in the unmodified apparatus and method of the first preferred embodiment incorporated as part of the third preferred embodiment.

The determination of the phase offsets $\xi_b$ and $Z_b$ is a problem similar to the one described with respect to the determination of $\xi_b$ and $Z_b$ in the fourth preferred embodiment. As a consequence, the procedures described for the determination of $\xi_b$ and $Z_b$ with respect to the fourth embodiment can be adapted for determination of $\xi_b$ and $Z_b$ in the third embodiment.

The refractivity of the gas and/or the change in the optical path length of a measurement path due to the gas is subsequently obtained using Eqs. (7) and/or (14), respectively. Because of the non-negligible effect of $\theta$ in Eqs. (7) and (14), the phase redundancy of $\theta$ must also be resolved in addition to the resolution of the phase redundancy of $\theta_b$. The remainder of the description of the third preferred embodiment is the same as that given for corresponding aspects of the first preferred embodiment except with respect to the description of the procedure for the resolution of the phase redundancies of $\theta$ and of $\theta_b$. The resolution of the phase redundancies in $\theta$ and $\theta_b$ is a problem similar to the one as subsequently described with respect to the required resolution of phase redundancy in $\theta$ and $\theta_b$ in the fourth embodiment of the present invention. As a consequence, the procedures described for the resolution of phase redundancies in $\theta$ and $\theta_b$ with respect to the fourth embodiment can be adapted for use in the resolution of the phase redundancies in $\theta$ and $\theta_b$ for the third embodiment.

There are three variants of the third embodiment wherein the description of each of the three variants of the third embodiment is the same as the description given for corresponding portions of the three variants of the first preferred embodiment.

Figure 4A:
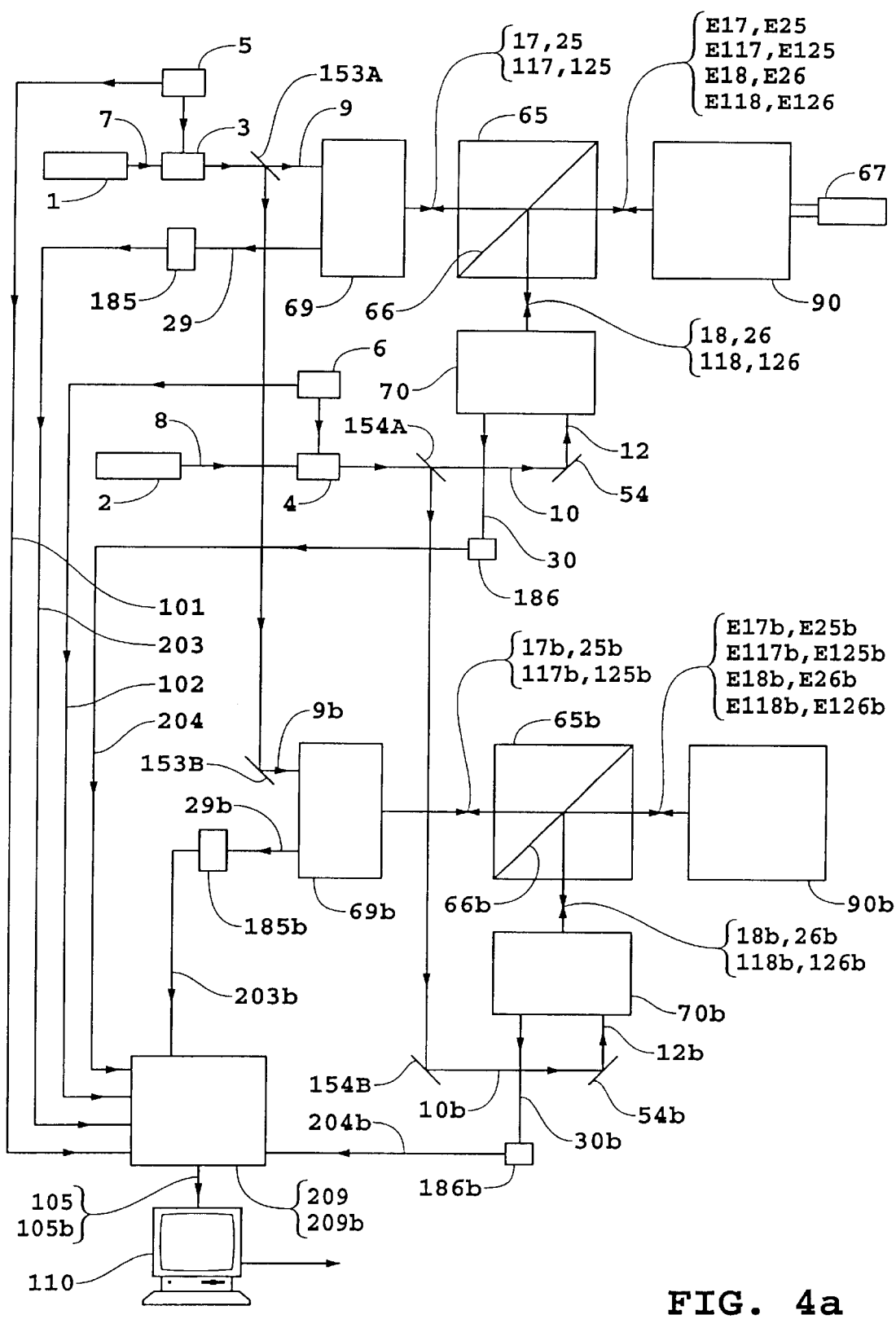
FIGS. 4a–4c taken together illustrate, in diagrammatic form, the presently preferred fourth embodiment of the present invention with FIG. 4a showing optical paths and electronic paths of apparatus for determination of refractive index of a gas and/or the optical path length effects of the gas comprised in part of the same apparatus as for the second preferred embodiment and optical paths and electronic paths of apparatus for determination of the $\chi$ and ratio $K/\chi$, a number of elements of the apparatus for determination of $\chi$ and the ratio $K/\chi$ performing analogous operations as apparatus of the second preferred embodiment apart from the suffix "b" when referring to apparatus for determination of $\chi$ and the ratio $K/\chi$.
Figure 4B:
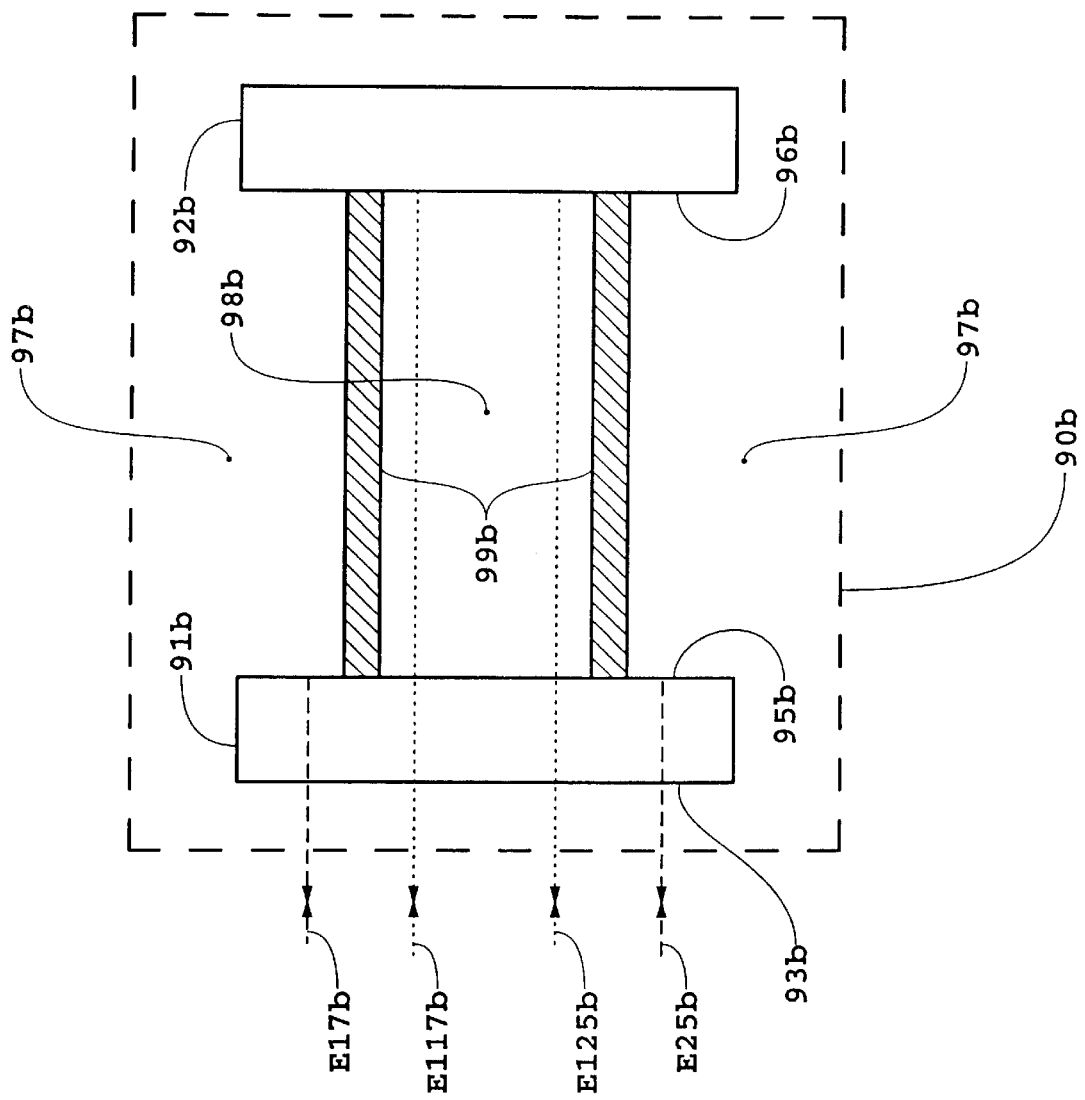
Figure 4C:
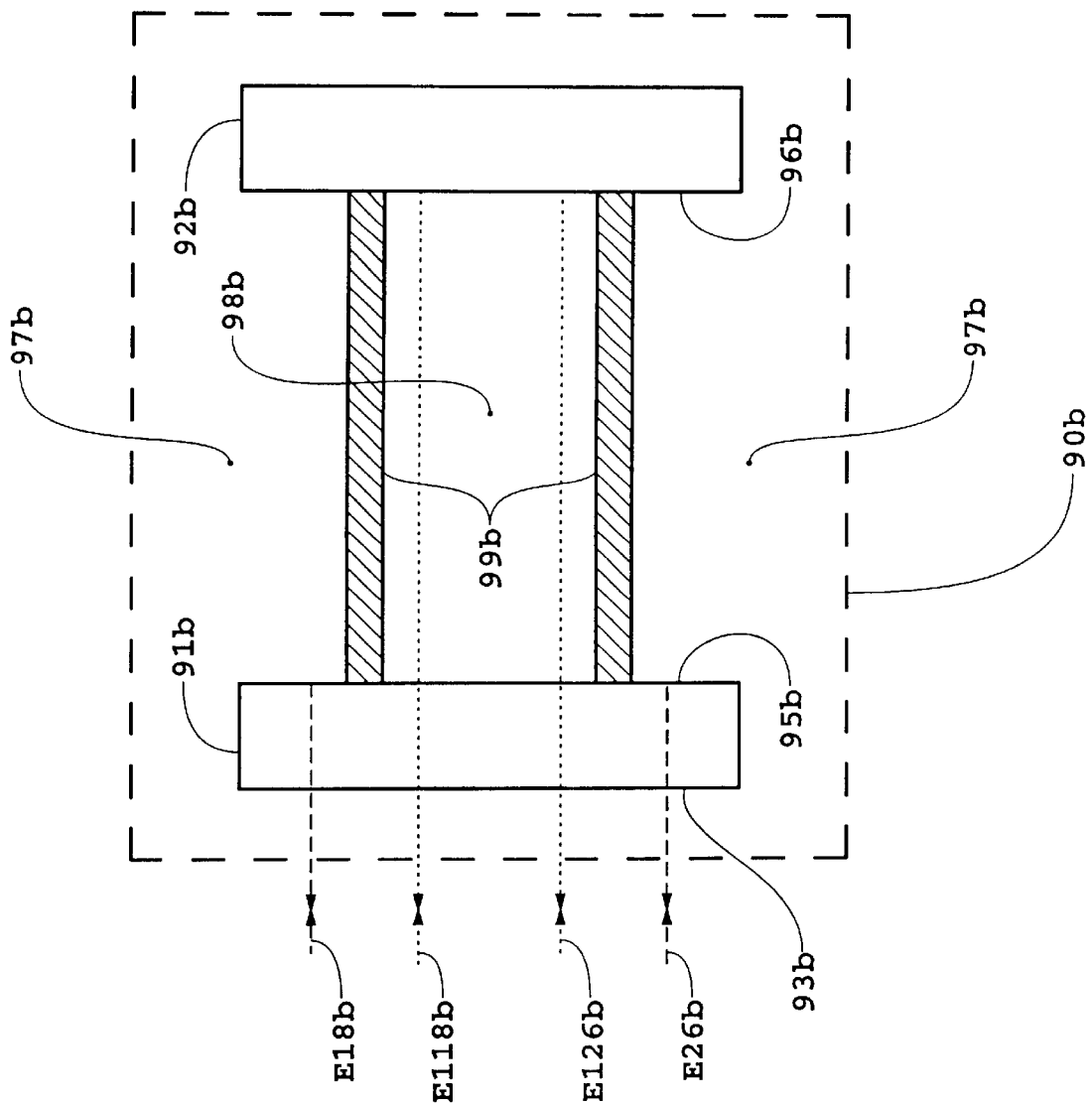

Reference is now made to FIGS. 4a–4c which depict in diagrammatic form the fourth preferred embodiment of the present invention. The description of the source of light beams 9 and 9b of the fourth embodiment is the same as that for light beam 9 of the second preferred embodiment and the description of the source of light beams 10 and 10b of the fourth embodiment is the same as that for light beam 10 of the second preferred embodiment except that the condition on wavelengths $\lambda_1$ and $\lambda_2$ expressed by Eq. (18) is replaced by the condition set fourth in Eq. (41). Light beams 9 and 9b of the fourth embodiment are derived from a common light beam by beam splitter 153A, preferably a non-polarizing type, and mirror 153B and light beams 10 and 10b of the fourth embodiment are derived from a common light beam by beam splitter 154A, preferably a non-polarizing type, and mirror 154B (see FIG. 4a).

Because of the requirement in the fourth preferred embodiment to measure $\chi$ and/or the ratio (K/$\chi$), the fourth preferred embodiment is comprised in part of the same apparatus and method as for the second preferred embodiment and of additional means for determination of $\chi$ and/or the ratio (K/$\chi$). The additional means for determination of $\chi$ and/or the ratio (K/$\chi$) is the same as the apparatus and method of the second preferred embodiment except for the external mirror system 90b. Consequently, a number of elements of the apparatus shown in FIGS. 4a–4c for determination of $\chi$ and/or the ratio (K/$\chi$) perform analogous operations as apparatus for determination of a refractivity of a gas and/or the change in the optical path length of a measurement path due to the gas of the second preferred embodiment, apart from the suffix "b" when referring to apparatus for determination of $\chi$ and/or the ratio (K/$\chi$).

The external mirror system 90b of the fourth preferred embodiment is shown in FIGS. 4b and 4c. The description of external mirror system 90b is the same as that for external mirror system 90 except with respect to the gas in the measurement path 98 and the round-trip physical length of the measurement path 98. The measurement leg in the external mirror system 90b of the fourth preferred embodiment includes measurement path 98b as illustrated in FIGS.

4b and 4c, measurement path 98b preferably being an evacuated volume defined by mirrors 91b and 92b and a cylinder 99b of fixed length ($L_b/2$). Referring to FIGS. 4b and 4c, surface 95b is coated so as to reflect with high efficiency beams E17b, E25b, E18b, and E26b and to transmit with high efficiency beams E117b, E125b, E118b, and E126b. Surface 96b is coated to reflect with high efficiency beams E117b, E125b, E118b, and E126b.

The differences in the external mirror systems 90b and 90 lead to modifications of Eqs. (38) such that the magnitude of phase shifts $\psi_{3b}$ and $\psi_{4b}$, counterparts to phase shifts $\psi_3$ and $\psi_4$, respectively, are related to the round-trip physical length $L_{bi}$ of path i of measurement path 98b and to reference paths as shown in FIGS. 4b and 4c according to the formulae $$\varphi_{1b} = \sum_{i=1}^{i=p} L_{bi}k_1 + \zeta_{1b}, \tag{52}$$

$$\varphi_{2b} = \sum_{i=1}^{i=p} L_{bi}k_2 + \zeta_{2b}.$$

For those applications where changes in the measurement path can be measured interferometrically, a feature for example of an application based on a distance measuring interferometer employed for measuring changes in the measurement path (c.f. the second preferred embodiment), the phase redundancy in θ can be resolved by recording the change in θ as the movable mirror 92 of the external mirror system 90 is scanned in a controlled manner by translator 67 over a given length from a null position, the null position being the position where the physical lengths of the measurement and reference legs are the substantially the same. The accuracy required for the determination of the null position is typically less accurate than the accuracy required for other parameters as exemplified in the following example: for $\lambda_1=0.633$ $\mu$m, $(n_1-1)\cong 3\times10^{-4}$, $(n_2-n_1)\cong 1\times 10^{-5}$, $\epsilon\cong 10^{-9}$, and the condition set fourth in Eq. (17), the desired accuracy for the null position determination corresponds to an uncertainty in θ of the order of ±3.

For those applications where the determination of the refractivity and/or or the change in the optical path length due to the gas in a measurement leg is made and mirror 92 of the external mirror system does not have a scanning capability such as considered in the preceding paragraph, other procedures are available for the resolution of the phase redundancies of θ and $\theta_b$. The effective wavelengths of θ and $\theta_b$ are substantially the same so that only procedures for the resolution of phase redundancy in either θ or $\theta_b$ need be described.

The second procedure described for the resolution of the phase redundancy of Φ in the description of the second embodiment can be adapted for the resolution of the phase redundancies of $\theta_b$, the second procedure being based on the use of a series of external mirror systems of type 90b where the series of round-trip physical lengths of the series of external mirror systems form a geometric progression. The smallest or first round-trip physical length in the series of round-trip physical lengths will be approximately $\lambda_1/8$ divided by the relative precision that the initial value of $\theta_b$ is known. The second round-trip physical length in the series of round-trip physical lengths will be approximately the length of the first round-trip physical length in the series of round-trip physical lengths divided by the relative precision that $\theta_b$ is measured using the first round-trip physical length in the series of round-trip physical lengths. This is again a geometric progression procedure, the resulting series of round-trip physical lengths forming a geometric progression, which is continued until the physical length of the external mirror system 90b used to measure the refractivity or the change in optical path length due to the refractivity of the gas would be exceeded if the number in the series of round-trip physical lengths were incremented by one. For the resolution of phase redundancy in $\theta_b$, a typical round-trip physical length for the first round-trip physical length in the series of round-trip physical lengths is of the order of 0.5 mm, a typical round-trip physical length for the second round-trip physical length in the series of round-trip physical lengths is of the order of 50 mm, and a typical round-trip physical length for a third round-trip physical length in the series of round-trip physical lengths if required is of the order of 5000 mm. The physical lengths in the series of physical lengths used for the resolution of phase redundancy in $\Phi_b$ are typically orders of magnitude larger than the physical lengths in the series of physical lengths used for the resolution of phase redundancy in $\theta_b$.

A third procedure is based upon the use of a source (not shown in FIGS. 4a–4c) of a series of known wavelengths and measuring $\theta_b$ for these wavelengths. The number of known wavelengths required for the resolution of the phase redundancy is generally comprised of a small set.

Another procedure to resolve the phase redundancy in $\theta_b$ is to observe the changes in $\theta_b$ as the measuring path 98b is changed from gas to an evacuated state (the vacuum pump and requisite gas handling system are not shown in FIGS. 4a–4c). The problems normally encountered in measuring absolute values for refractivity and changes in the optical path length due to the refractivity of the gas based in part on changing the gas pressure from a non-zero value to a vacuum are not present in the third preferred embodiment because of a relatively large uncertainty of the order of ±3 typically permitted in the determination of $\theta_b$.

The offset terms $\xi_b$ and $Z_b$ that are present in Eq. (51) and defined in Eqs. (47) and (48), respectively, are terms that may require determination and may require monitoring if variable in time. One procedure for the determination of $\xi_b$ and $Z_b$ is based on replacement of mirror 91b of the external mirror system 90b with a mirror Z91b (not shown in FIGS. 4a–4c) having a surface Z93b corresponding to surface 93b of mirror 91b coated so as be a reflecting surface for both wavelengths $\lambda_1$ and $\lambda_2$ and measuring the resulting $\theta_b$ and $\Phi_b$. Let the resulting values of $\theta_b$ and $\Phi_b$ be $\theta_{bR}$ and $\Phi_{bR}$, respectively. The quantities $\xi_b$ and $Z_b$ are related to $\theta_{bR}$ and $\Phi_{bR}$, respectively, as evident from Eqs. (47) and (48) by the formulae $$\xi_b = \theta_{bR}, \tag{53}$$

$$Z_b = \Phi_{bR}. \tag{54}$$

The non-electronic contributions to $\xi_b$ and $Z_b$ should be substantially constant in time because of the significant level of compensation that takes place in the differential plane mirror interferometers 69b and 70b, beam splitter 65b, and external mirror system 90b. The electronic contributions to $\xi_b$ and $Z_b$ are monitored by purely electronic means (not shown).

The wavenumber χ is calculated by the computer using Eq. (47) and the measured values for $\theta_b$ and $\xi_b$. The ratio K/χ is calculated by the computer using Eq. (51)

The refractivity of a gas and/or the change in the optical path length of a measurement path due to the gas is subsequently obtained using Eqs. (7) and/or (14), respectively. The remainder of the description of the fourth preferred embodiment is the same as that given for corresponding portions of the second and third preferred embodiments.

There are three variants of the fourth embodiment wherein the description of each of the three variants of the fourth embodiment is the same as the description given for corresponding portions of the three variants of the second preferred embodiment.

It will be appreciated by those skilled in the art that the wavelength $\lambda_1$ of the light beam used for the determination of $\psi_1$ in Eqs. (14) and (20) may be different from both of the two wavelengths used to determine the change in the optical path length of the measuring path due to gas in the measuring path without departing from the scope and spirit of the present invention. The requisite reciprocal dispersive power $\Gamma_3$ would be defined in terms of the indices of refraction $n_1$, $n_2$, and $n_3$ of the gas at the three wavelengths $\lambda_1$, $\lambda_2$, and $\lambda_3$, respectively, according to the formula $$\Gamma_3 = \frac{(n_1 - 1)}{(n_3 - n_2)} \tag{55}$$

for $\lambda_3 < \lambda_2$.

It will be further appreciated by those skilled in the art that the two frequency components of either or both beams 9 and 10 may be spatially separated at any point following the means for introducing the frequency shifts and prior to entering the respective interferometers of the described preferred embodiments without departing from the scope and spirit of the present invention. If the two frequency components of the either of the two beams are spatially separated for any significant distance from the respective interferometer, it may be necessary to employ alternative reference beams such as described in the first embodiment.

It will also be appreciated by those skilled in the art that the differential plane mirror interferometer and the external mirror system of the additional means for the determination of $\chi$ and/or the ratio $(K/\chi)$ in the fourth preferred embodiment may be configured such that one of the light beams corresponding to one of the wavelengths may enter and exit from one end of the external mirror system and a second of the light beams corresponding to a differing second wavelength may enter and exit from an opposite end of the external mirror system in contrast to the same end as disclosed in the fourth preferred embodiment without departing from the scope or spirit of the invention as defined in the claims. With the reconfiguring of the external mirror system, beam splitter 65b may obviously be omitted, the light beams of differing wavelengths entering and exiting through the mirrors 91b and 92b with the reflecting and transmitting coatings on mirror surfaces 95b and 96b having been reconfigured accordingly.

The illustrations in FIGS. 2a–2e and 4a–4c depict two preferred embodiments of the present invention wherein all of the optical beams for an embodiment are in a single plane. Clearly, modifications using multiple planes can be made to one or more of the two preferred embodiments and variants thereof without departing from the scope and spirit of the invention.

The second and fourth preferred embodiments of the present invention have external mirror systems 90b and/or 90 wherein the measurement paths for $\lambda_1$ and $\lambda_2$ have the same round-trip physical lengths and the reference paths for $\lambda_1$ and $\lambda_2$ have the same round-trip physical lengths. It will be appreciated by those skilled in the art that the measurement paths for $\lambda_1$ and $\lambda_2$ can have different physical lengths and the reference paths for $\lambda_1$ and $\lambda_2$ can have different physical lengths without departing from the scope and spirit of the present invention as defined in the claims. It will be further appreciated by those skilled in the art that the measurement paths for $\lambda_1$ and $\lambda_2$ can be physically displaced one from the other and the reference paths for $\lambda_1$ and $\lambda_2$ can be physically displaced one from the other without departing from the scope and spirit of the present invention as defined in the claims although there may be some degradation in performance with regard frequency response of the embodiments and/or in accuracy of calculated quantities due to for example spatial gradients in the refractivity of a gas in a measurement path.

It will be appreciated by those skilled in the art that alternative data processing may be considered for the four preferred embodiments and variants thereof of the present invention without departing from the spirit and scope of the present invention.

The four preferred embodiments and variants thereof of the present invention are all configured for use of heterodyne detection. It will be appreciated by those skilled in the art that homodyne detection can be employed in each of the four preferred embodiments and variants thereof without departing from the scope and spirit of the present invention as defined in the claims. Homodyne receivers would be employed such as disclosed in commonly owned U.S. Pat. No. 5,663,793 entitled "Homodyne Interferometric Receiver and Method," issued Sep. 2, 1997 in the name of P. de Groot. The computation of the refractivity of a gas and/or the change in the optical path length of a measurement path due to the gas would be obtained for example in the homodyne version of the first preferred embodiment directly from homodyne phases $\psi_{1H}$ and $\psi_{2H}$, the homodyne phases $\psi_{1H}$ and $\psi_{2H}$ being counterparts to phases $\psi_1$ and $\psi_2$ of the first preferred embodiment, and with homodyne versions of Eqs. (7) and (14).

The third and fourth preferred embodiments of the present invention measure the ratio $(K/\chi)$ and/or $\chi$ and use the measured values of $(K/\chi)$ and/or $\chi$ in the computation of the refractivity of a gas and/or the change in the optical path length of a measurement path due to the gas. It will be appreciated by those skilled in the art that the measured values of $(K/\chi)$ and/or $\chi$ can be used as error signals in a feedback system such the condition expressed by Eq. (18) is satisfied and/or such that $\chi$ is constant without departing from the scope and spirit of the present invention as defined in the claims. The measured value of $(K/\chi)$ and/or $\chi$ in the feedback system are sent to either source 1 and/or source 2 and used to control the respective wavelengths of either source 1 and/or source 2, for example by controlling the injection current and/or temperature of a diode laser or the cavity frequency of an external cavity diode laser.

It will be appreciated by those skilled in the art that combinations of the means of the third and fourth preferred embodiments to measure the ratio $(K/\chi)$ and/or $\chi$ and of the means of the first and second preferred embodiments may be used to determine the refractivity of a gas and/or the change in the optical path length of a measurement path due to the gas other than the combinations used in the third and fourth preferred embodiments without departing from the scope or spirit of the invention as defined in the claims.

Figure 5:
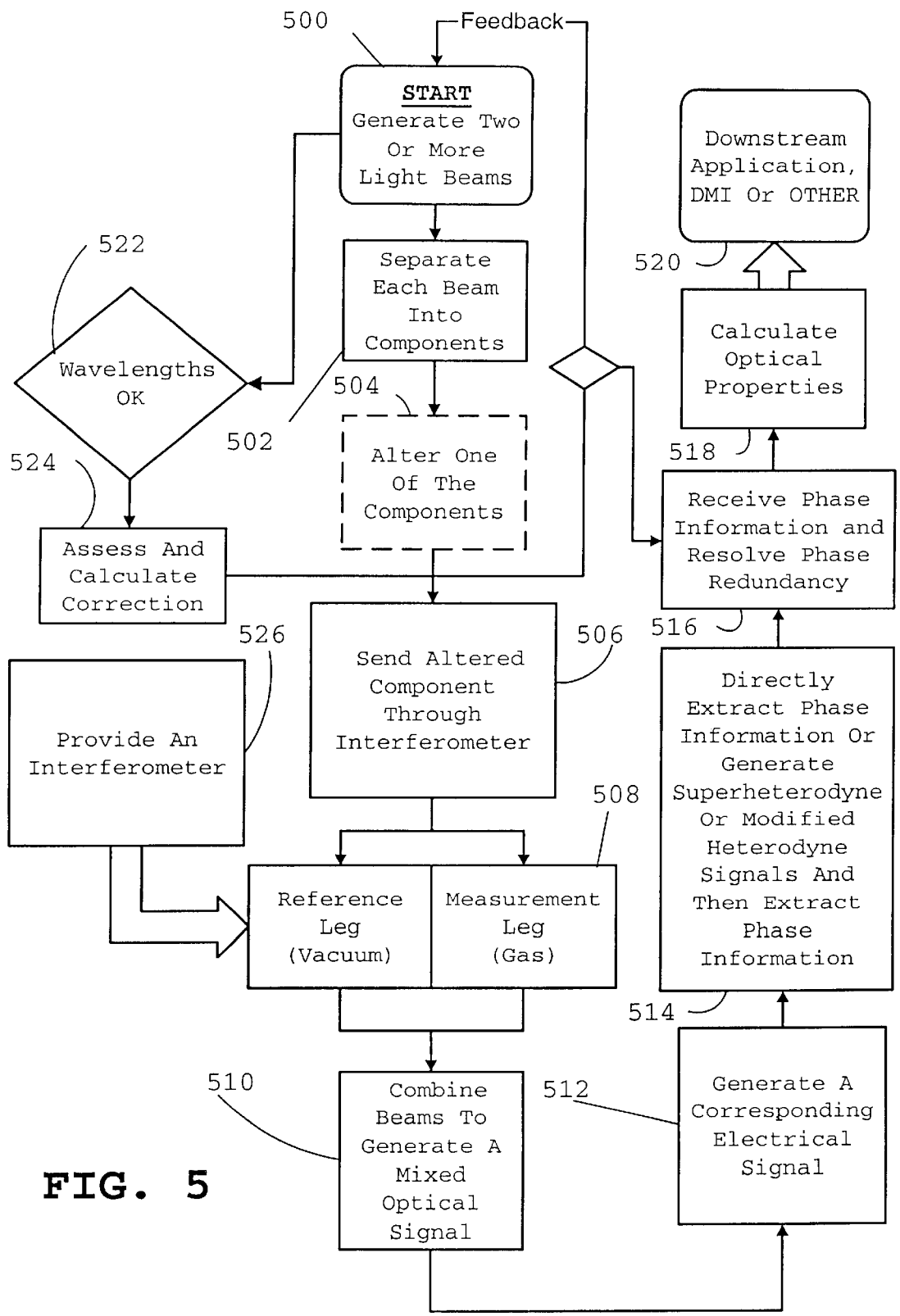
FIG. 5 is a high-level flowchart depicting various steps carried out in practicing a method in accordance with the invention.

Reference is now made to FIG. 5 which is a generalized flowchart depicting via blocks 500–526 various steps for practicing an inventive method for measuring and monitoring the refractivity of a gas in a measurement path and/or the change in the optical path length of the measurement path due to the gas wherein the refractivity of the gas may be changing and/or the physical length of the measurement path may be changing. While it will be evident that the inventive method depicted in FIG. 5 may be carried out using the inventive apparatus disclosed hereinabove, it will also be apparent to those skilled in the art that it may also be implemented with apparatus other than that disclosed. For example, it will be apparent that one need not use differential plane mirror interferometers such as that used in the preferred embodiments, but rather may use other conventional interferometric arrangements so long as the required reference and measurement legs are present. In addition, it will be evident that one may use either a homodyne approach or one in which heterodyning techniques are advantageously employed. As will be further appreciated, many of the steps in FIG. 5 may be carried out via appropriate software run on a general purpose computer or a suitably programmed microprocessor either of which may be used to control other elements of the system as needed.

As seen in FIG. 5, one starts in block 500 by providing two or more light beams having different wavelengths which preferably have an approximate approximate relationship as previously described. In block 502, the light beams are separated into components which in block 504 are preferably altered by either polarization or spatial encoding, or frequency shifting or both. Otherwise, the light beams may simply be left unaltered and passed through to block 506.

As shown in blocks 522 and 524, the relationship of the wavelengths of the light beams may be monitored and if their wavelengths are not within the limits previously discussed, one can adopt corrective measures to compensate from departures of the relationship of the wavelengths from the desired relationship of the wavelengths. Either the departures can be used to provide feedback to control the wavelengths of the light beam sources or corrections can be established and used in subsequent calculations which are influenced by departures or some combination of both approaches can be implemented.

In parallel or contemporaneously with generating the light beams in block 500, one also provides as indicated in block 526 an interferometer having two legs, a reference leg and the other a measurement leg wherein a portion of the measurement path is in a gas whose refractivity and/or effect on the optical path length of the measurement path are to be measured.

As shown by blocks 506 and 508, the previously generated light beam components are introduced into the interferometer legs so that each component has its phase shifted based on the optical path length it experiences in traveling through the physical length of its assigned leg.

After the beams emerge from block 508, they are combined in block 510 to generate a mixed optical signal. These mixed optical signals are then sent to block 512 where by means of photodetection corresponding electrical signals, preferably heterodyne, are generated, and these electrical signals contain information about the relative phases between the light beam components. Preferably the electrical signals are heterodyne signals brought about by previously frequency shifting treatment.

In block 514, the electrical signals may be directly analyzed to extract relative phase information which can then be passed on to blocks 516–520 or, superheterodyne signals are generated, or modified heterodyne and then superheterodyne signals, or modified heterodyne signals, which are then subsequently analyzed for the relative phase information.

In block 516, any phase ambiguities in homodyne, heterodyne, and/or superheterodyne signals are resolved, preferably by means and calculations previously elaborated in connection with describing the preferred embodiments.

In block 518, the refractivity of the gas and/or the effect of the refractivity of the gas on the optical path length of the measurement path are calculated, corrections are applied as previously described, and output signals are generated for subsequent downstream applications or data format requirements.

Those skilled in the art may make other changes to the inventive apparatus and methods without departing from the scope of the inventive teachings. Therefore, it is intended that the embodiments shown and described be considered as illustrative and not in a limiting sense.

The interferometry systems described above can be especially useful in lithography applications (as, for example, represented at 267) used for fabricating large scale integrated circuits such as computer chips and the like. Lithography is the key technology driver for the semiconductor manufacturing industry. Overlay improvement is one of the five most difficult challenges down to and below 100 nm line widths (design rules), see for example the *Semiconductor Industry Roadmap*, p82 (1997). Overlay depends directly on the performance, i.e. accuracy and precision, of the distance measuring interferometers used to position the wafer and reticle (or mask) stages. Since a lithography tool may produce $50–100M/year of product, the economic value from improved performance distance measuring interferometers is substantial. Each 1% increase in yield of the lithography tool results in approximately $1M/year economic benefit to the integrated circuit manufacturer and substantial competitive advantage to the lithography tool vendor.

The function of a lithography tool is to direct spatially patterned radiation onto a photoresist-coated wafer. The process involves determining which location of the wafer is to receive the radiation (alignment) and applying the radiation to the photoresist at that location (exposure).

To properly position the wafer, the wafer includes alignment marks on the wafer that can be measured by dedicated sensors. The measured positions of the alignment marks define the location of the wafer within the tool. This information, along with a specification of the desired patterning of the wafer surface, guides the alignment of the wafer relative to the spatially patterned radiation. Based on such information, a translatable stage supporting the photoresist-coated wafer moves the wafer such that the radiation will expose the correct location of the wafer.

During exposure, a radiation source illuminates a patterned reticle, which scatters the radiation to produce the spatially patterned radiation. The reticle is also referred to as a mask, and these terms are used interchangeably below. In the case of reduction lithography, a reduction lens collects the scattered radiation and forms a reduced image of the reticle pattern. Alternatively, in the case of proximity printing, the scattered radiation propagates a small distance (typically on the order of microns) before contacting the wafer to produce a 1:1 image of the reticle pattern. The radiation initiates photo-chemical processes in the photoresist that convert the radiation pattern into a latent image within the photoresist.

The interferometry systems described above are important components of the positioning mechanisms that control the position of the wafer and reticle, and register the reticle image on the wafer.

In general, the lithography system, also referred to as an exposure system, typically includes an illumination system and a wafer positioning system. The illumination system includes a radiation source for providing radiation such as ultraviolet, visible, x-ray, electron, or ion radiation, and a reticle or mask for imparting the pattern to the radiation, thereby generating the spatially patterned radiation. In addition, for the case of reduction lithography, the illumination system can include a lens assembly for imaging the spatially patterned radiation onto the wafer. The imaged radiation exposes photoresist coated onto the wafer. The illumination system also includes a mask stage for supporting the mask and a positioning system for adjusting the position of the mask stage relative to the radiation directed through the mask. The wafer positioning system includes a wafer stage for supporting the wafer and a positioning system for adjusting the position of the wafer stage relative to the imaged radiation. Fabrication of integrated circuits can include multiple exposing steps. For a general reference on lithography, see, for example, J. R. Sheats and B. W. Smith, in *Microlithography: Science and Technology* (Marcel Dekker, Inc., New York, 1998), the contents of which are incorporated herein by reference.

The interferometry systems described above can be used to precisely measure the positions of each of the wafer stage and mask stage relative to other components of the exposure system, such as the lens assembly, radiation source, or support structure. In such cases, the interferometry system can be attached to a stationary structure and the measurement object attached to a movable element such as one of the mask and wafer stages. Alternatively, the situation can be reversed, with the interferometry system attached to a movable object and the measurement object attached to a stationary object.

More generally, the interferometry systems can be used to measure the position of any one component of the exposure system relative to any other component of the exposure system in which the interferometry system is attached, or supported by one of the components and the measurement object is attached, or is supported by the other of the components.

Figure 6A:
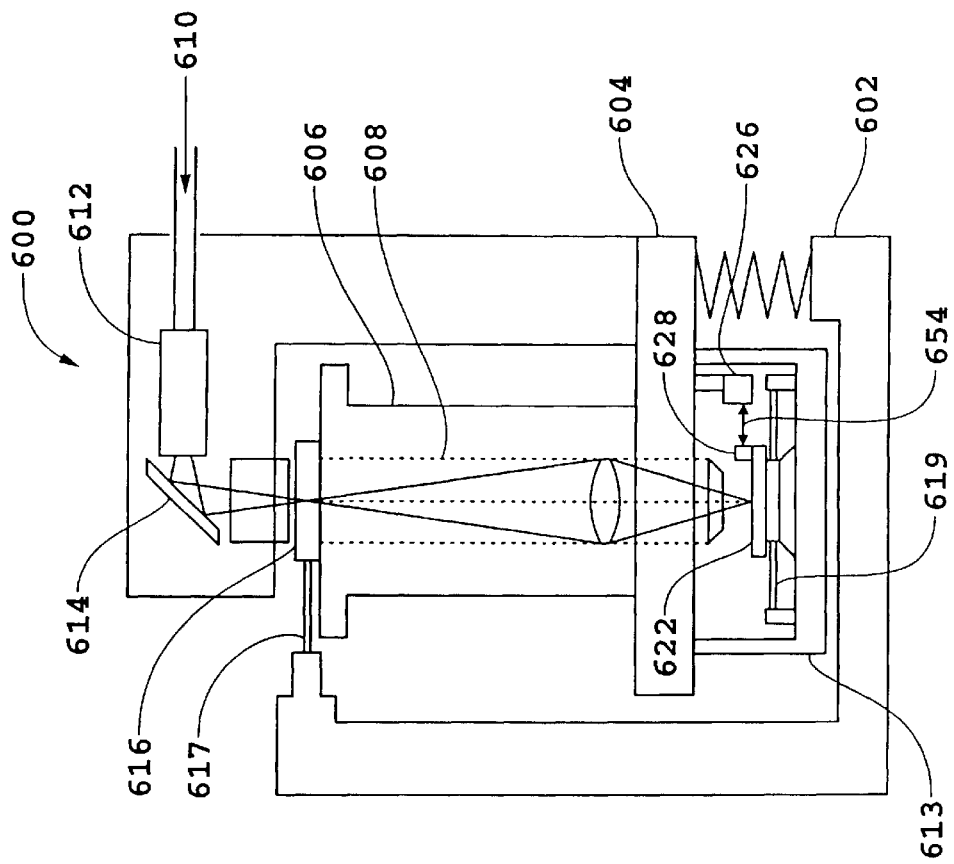

An example of a lithography scanner 600 using an interferometry system 626 is shown in FIG. 6a. The interferometry system is used to precisely measure the position of a wafer within an exposure system. Here, stage 622 is used to position the wafer relative to an exposure station. Scanner 600 comprises a frame 602, which carries other support structures and various components carried on those structures. An exposure base 604 has mounted on top of it a lens housing 606 atop of which is mounted a reticle or mask stage 616 used to support a reticle or mask. A positioning system for positioning the mask relative to the exposure station is indicated schematically by element 617. Positioning system 617 can include, e.g., piezoelectric transducer elements and corresponding control electronics. Although, it is not included in this described embodiment, one or more of the interferometry systems described above can also be used to precisely measure the position of the mask stage as well as other moveable elements whose position must be accurately monitored in processes for fabricating lithographic structures (see supra Sheats and Smith *Microlithography: Science and Technology*).

Suspended below exposure base 604 is a support base 613 that carries wafer stage 622. Stage 622 includes a plane mirror for reflecting a measurement beam 654 directed to the stage by interferometry system 626. A positioning system for positioning stage 622 relative to interferometry system 626 is indicated schematically by element 619. Positioning system 619 can include, e.g., piezoelectric transducer elements and corresponding control electronics. The measurement beam reflects back to the interferometry system, which is mounted on exposure base 604. The interferometry system can be any of the embodiments described previously.

During operation, a radiation beam 610, e.g., an ultraviolet (UV) beam from a UV laser (not shown), passes through a beam shaping optics assembly 612 and travels downward after reflecting from mirror 614. Thereafter, the radiation beam passes through a mask (not shown) carried by mask stage 616. The mask (not shown) is imaged onto a wafer (not shown) on wafer stage 622 via a lens assembly 608 carried in a lens housing 606. Base 604 and the various components supported by it are isolated from environmental vibrations by a damping system depicted by spring 620.

In other embodiments of the lithographic scanner, one or more of the interferometry systems described previously can be used to measure distance along multiple axes and angles associated for example with, but not limited to, the wafer and reticle (or mask) stages. Also, rather than a UV laser beam, other beams can be used to expose the wafer including, e.g., x-ray beams, electron beams, ion beams, and visible optical beams.

In addition, the lithographic scanner can include a column reference in which interferometry system 626 directs the reference beam to lens housing 606 or some other structure that directs the radiation beam rather than a reference path internal to the interferometry system. The interference signal produce by interferometry system 626 when combining measurement beam 654 reflected from stage 622 and the reference beam reflected from lens housing 606 indicates changes in the position of the stage relative to the radiation beam. Furthermore, in other embodiments the interferometry system 626 can be positioned to measure changes in the position of reticle (or mask) stage 616 or other movable components of the scanner system. Finally, the interferometry systems can be used in a similar fashion with lithography systems involving steppers, in addition to, or rather than, scanners.

Figure 6B:
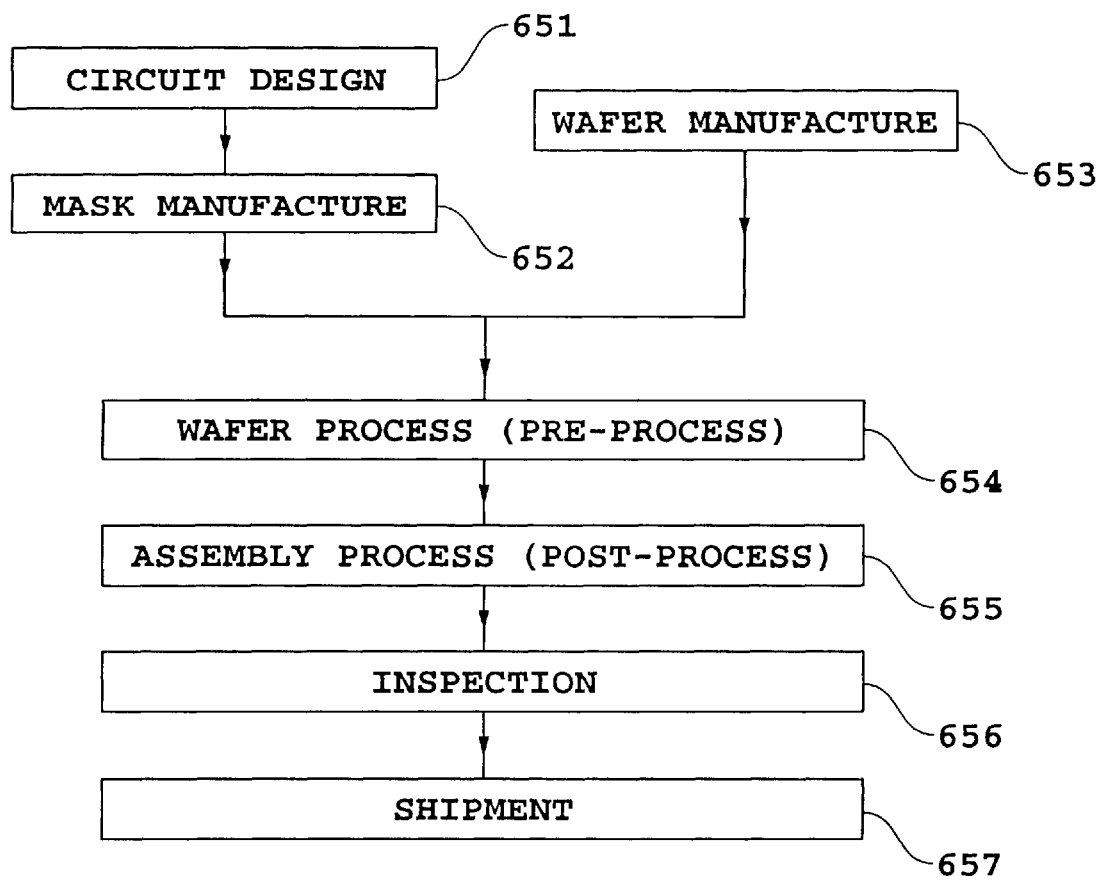

As is well known in the art, lithography is a critical part of manufacturing methods for making semiconducting devices. For example, U.S. Pat. No. 5,483,343 outlines steps for such manufacturing methods. These steps are described below with reference to FIGS. 6b and 6c. FIG. 6b is a flow chart of the sequence of manufacturing a semiconductor device such as a semiconductor chip (e.g. IC or LSI), a liquid crystal panel or a CCD. Step 651 is a design process for designing the circuit of a semiconductor device. Step 652 is a process for manufacturing a mask on the basis of the circuit pattern design. Step 653 is a process for manufacturing a wafer by using a material such as silicon.

Step 654 is a wafer process which is called a pre-process wherein, by using the so prepared mask and wafer, circuits are formed on the wafer through lithography. Step 655 is an assembling step, which is called a post-process wherein the wafer processed by step 654 is formed into semiconductor chips. This step includes assembling (dicing and bonding) and packaging (chip sealing). Step 656 is an inspection step wherein operability check, durability check, and so on of the semiconductor devices produced by step 655 are carried out. With these processes, semiconductor devices are finished and they are shipped (step 657).

Figure 6C:
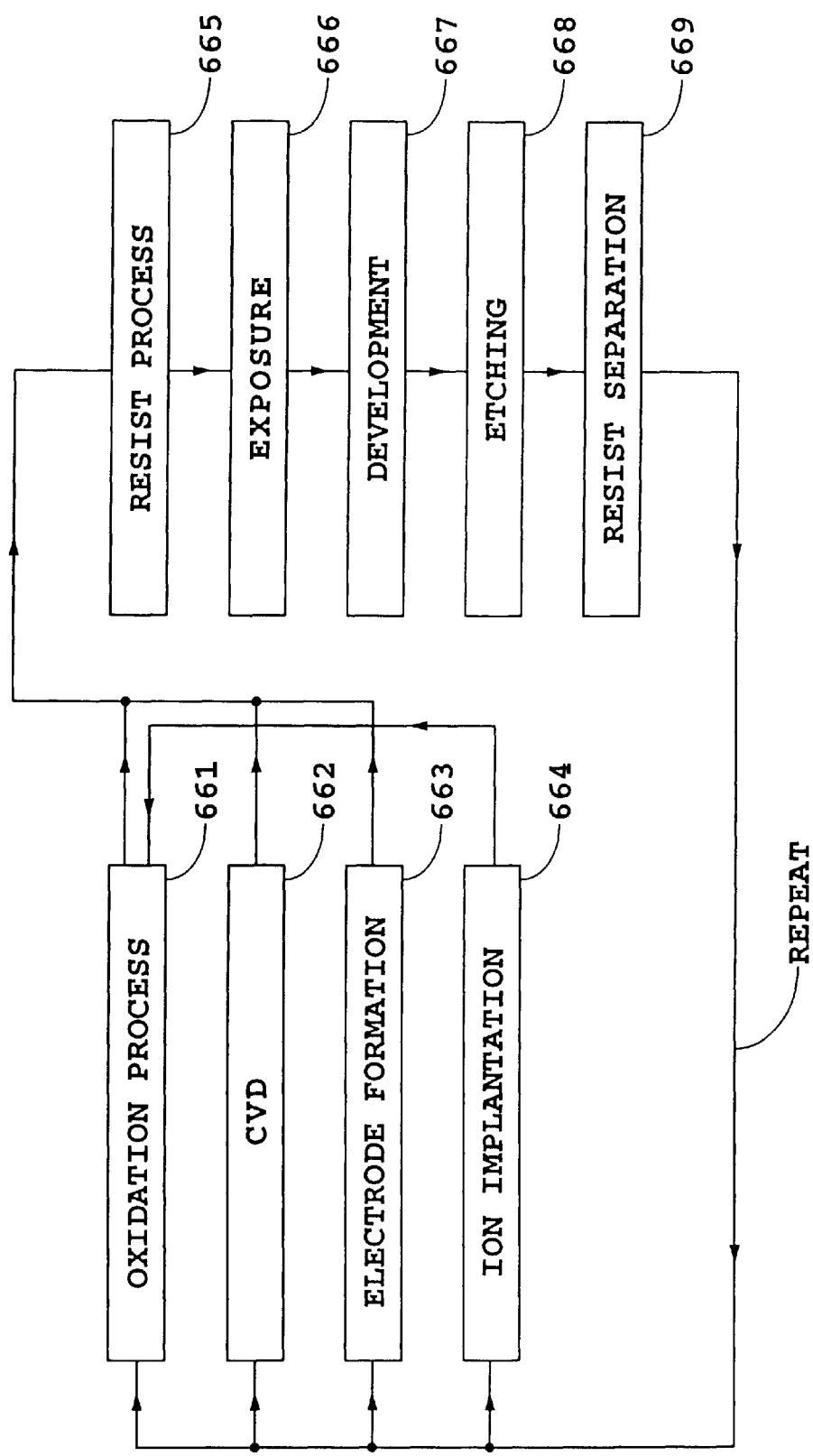

FIG. 6c is a flow chart showing details of the wafer process. Step 661 is an oxidation process for oxidizing the surface of a wafer. Step 662 is a CVD process for forming an insulating film on the wafer surface. Step 663 is an electrode forming process for forming electrodes on the wafer by vapor deposition. Step 664 is an ion implanting process for implanting ions to the wafer. Step 665 is a photoresist process for applying a photoresist (photosensitive material) to the wafer. Step 666 is an exposure process for printing, by exposure, the circuit pattern of the mask on the wafer through the exposure apparatus described above. Step 667 is a developing process for developing the exposed wafer. Step 668 is an etching process for removing portions other than the developed photoresist image. Step 669 is a photoresist separation process for separating the photoresist material remaining on the wafer after being subjected to the etching process. By repeating these processes, circuit patterns are formed and superimposed on the wafer.

The interferometry systems described above can also be used in other applications in which the relative position of an object needs to be measured precisely. For example, in applications in which a write beam such as a laser, x-ray, ion, or electron beam, marks a pattern onto a substrate as either the substrate or beam moves, the interferometry systems can be used to measure the relative movement between the substrate and write beam.

Figure 7:
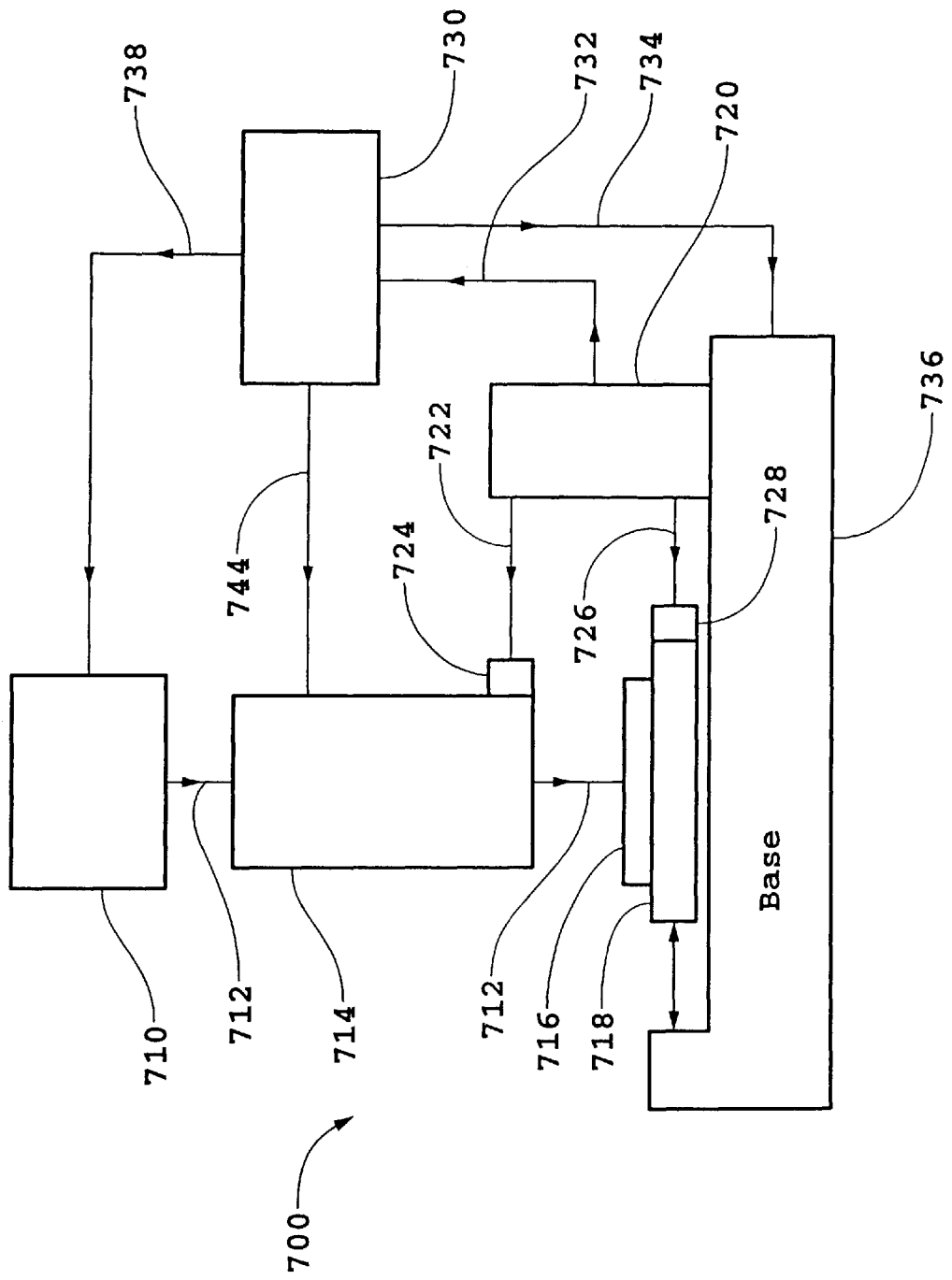
FIG. 7 is a schematic of a beam writing system employing the interferometry system.

As an example, a schematic of a beam writing system 700 is shown in FIG. 7. A source 710 generates a write beam 712, and a beam focusing assembly 714 directs the radiation beam to a substrate 716 supported by a movable stage 718. To determine the relative position of the stage, an interferometry system 720 directs a reference beam 722 to a mirror 724 mounted on beam focusing assembly 714 and a measurement beam 726 to a mirror 728 mounted on stage 718. Interferometry system 720 can be any of the interferometry systems described previously. Changes in the position measured by the interferometry system correspond to changes in the relative position of write beam 712 on substrate 716. Interferometry system 720 sends a measurement signal 732 to controller 730 that is indicative of the relative position of write beam 712 on substrate 716. Controller 730 sends an output signal 734 to a base 736 that supports and positions stage 718. In addition, controller 730 sends a signal 738 to source 710 to vary the intensity of, or block, write beam 712 so that the write beam contacts the substrate with an intensity sufficient to cause photophysical or photochemical change only at selected positions of the substrate. Furthermore, in some embodiments, controller 730 can cause beam focusing assembly 714 to scan the write beam over a region of the substrate, e.g., using signal 744. As a result, controller 730 directs the other components of the system to pattern the substrate. The patterning is typically based on an electronic design pattern stored in the controller. In some applications the write beam patterns a photoresist coated on the susbstrate and in other applications the write beam directly patterns, e.g., etches, the substrate.

An important application of such a system is the fabrication of masks and reticles used in the lithography methods described previously. For example, to fabricate a lithography mask an electron beam can be used to pattern a chromium-coated glass substrate. In such cases where the write beam is an electron beam, the beam writing system encloses the electron beam path in a vacuum. Also, in cases where the write beam is, e.g., an electron or ion beam, the beam focusing assembly includes electric field generators such as quadrapole lenses for focusing and directing the charged particles onto the substrate under vacuum. In other cases where the write beam is a radiation beam, e.g., x-ray, UV, or visible radiation, the beam focusing assembly includes corresponding optics for focusing and directing the radiation to the substrate.

Yet other changes may be made to the invention. For example, it may be desirable in certain applications to monitor the refractive index of the gas contained on both the reference and in the measurement legs of the interferometer. Examples include the well-known column reference style of interferometer, in which the reference leg comprises a target optic placed at one position within a mechanical system, and the measurement leg comprises a target optic placed at a different position within the same mechanical system. Another example application relates to the measurement of small angles, for which both the measurement and reference beams impinge upon the same target optic but at a small physical offset, thereby providing a sensitive measure of the angular orientation of the target optic. These applications and configurations are well known to those skilled in the art and the necessary modifications are intended to be within the scope of the invention.

Additional alternative means of achieving substantial insensitivity to Doppler shifting in a heterodyne interferometer is to track the Doppler shift and compensate by either (1) adjusting the frequency difference between the reference and measurement beams, (2) adjusting the clock frequency of one or both of the electronic A/D modules or (3) any similar means of continuously matching the apparent heterodyne beat frequency of the two wavelengths by active adjustment of the drive or detection electronics.

It is understood that while the invention has been described in conjunction with the detailed description thereof, the foregoing description is intended to illustrate and not limit the scope of the invention, which is defined by the scope of the appended claims.

What is claimed is:

1. Interferometric apparatus for measuring the effects of the refractive index of a gas in a measurement path, said interferometric apparatus comprising:

interferometer means comprising first and second measurement legs, said first and second measurement legs having optical paths structured and arranged such that at least one of them has a variable physical length and at least one of them is at least in part occupied by the gas, the optical path length difference between said first and second measurement legs varying in accordance with the difference between the respective physical lengths of their optical paths and the properties of said gas;

means for generating at least two light beams having different wavelengths;

means for introducing first and second predetermined portions of each of said light beams into said first and second measurement legs, respectively, of said interferometer means so that each of at least one of said first and second predetermined portions of said light beams travels through said first and second measurement legs along predetermined optical paths with the same number of passes, said predetermined first and second portions of said light beams emerging from said interferometer means as exit beams containing information about the respective optical path lengths through said first and second measurement legs at said wavelengths;

means for combining said exit beams to produce mixed optical signals containing information corresponding to the phase differences between each of said exit beams from corresponding ones of said predetermined optical paths of said first and second measurement legs at said wavelengths;

means for detecting said mixed optical signals and generating electrical interference signals containing information corresponding to the effects of the index of refraction of the gas at said different beam wavelengths and the difference in physical path lengths of said measurement legs and their relative rate of change; and electronic means for analyzing said electrical interference signals to determine the effects of said gas in said measurement leg(s) while compensating for the relative rates at which the physical path lengths of said first and second measurement legs are changing, wherein said information corresponding to said phase differences in said mixed optical signals are phase shifts $\psi_j$ related to the differences in total round-trip physical lengths pL of said measurement legs occupied by said gas according to the formulae $$\psi_j = Lpk_j n_j + \xi_j, \; j=1,2,\ldots$$

where $k_j = 2\pi/\zeta_j$, p is the number of multiple passes through the at least one of said first and second measurement legs, and $n_j$ are the refractive indices of gas in said at least one of said measurement legs occupied by the gas corresponding to wavelength, $\lambda_j$, and $\zeta_j$ are phase offsets not associated with optical paths and wherein said electronic means is further configured and arranged to create phases $\theta$ and $\Phi$ where $$\vartheta = \left(\frac{l_1}{p}\varphi_1 + \frac{l_2}{p}\varphi_2\right), \text{ and } \Phi = \left(\frac{l_1}{p}\varphi_1 - \frac{l_2}{p}\varphi_2\right)$$

where $l_1$ and $l_2$ are non-integer values.

2. The interferometric apparatus of claim 1 wherein the refractivity of the gas, $(n_1-1)$ is calculated using the formula:

$$n_1 - 1 = \frac{\Gamma}{\chi L[1-(K/\chi)^2]}\{[\vartheta(K/\chi) - \Phi] - Q\},$$

where $\chi = (l_1 K_1 + l_2 k_2)/2$,
$K = (l_1 k_1 - l_2 k_2)/2$ and $$\Gamma = \frac{n_1 - 1}{n_2 - n_1},$$

the quantity $\Gamma$ being the reciprocal dispersive power of the gas which is substantially independent of environmental conditions and turbulence in the gas and the offset terms Q and $\zeta_i$ are defined as $$Q = \xi(K/\chi) - Z$$

where $$\xi = \left(\frac{l_1}{p}\zeta_1 + \frac{l_2}{p}\zeta_2\right),$$

$$Z = \left(\frac{l_1}{p}\zeta_1 - \frac{l_2}{p}\zeta_2\right)$$

with $\xi$ and Z being determinable quantities.

3. The interferometric apparatus of claim 2 wherein electronic means is further configured and arranged to calculate a physical distance, L, independent of the effects of the refractive index of the gas in the measurement path using the formula $$L = \frac{1}{(\chi+K)}\left\{\frac{l_1}{p}(\varphi_1 - \zeta_1) - \frac{\Gamma}{[1-(K/\chi)]}[(K/\chi)\vartheta - \Phi - Q]\right\}$$

where the ratio of the wavelengths can be expressed in terms of $(K/\chi)$ with $$\frac{\lambda_1}{\lambda_2} = \left(\frac{l_1}{l_2}\right)\left[\frac{1-(K/\chi)}{1+(K/\chi)}\right].$$

4. The interferometric apparatus of claim 1 wherein said electronic means is further configured and arranged to compensate for differences in group delay experienced by said electrical interference signals.

5. Interferometric method for measuring the effects of the refractive index of a gas in a measurement path, said interferometric apparatus comprising:

providing an interferometer means comprising a first and second measurement legs, said first and second measurement legs having optical paths structured and arranged such that at least one of them has a variable physical length and at least one of them is at least in part occupied by gas, the optical path length difference between said first and second measurement legs varying in accordance with the difference in the respective physical lengths of their optical paths and the properties of said gas;

generating at least two light beams having different wavelengths;

introducing first and second predetermined portions of each of said light beams into said first and second measurement legs, respectively, of said interferometer means so that each of at least one of said first and second predetermined portions of said light beams travels through said first and second measurement legs along predetermined optical paths with the same number of passes, said predetermined first and second portions of said light beams emerging from said interferometer means as exit beams containing information about the respective optical path lengths through said first and second measurement legs at said wavelengths;

combining said exit beams to produce mixed optical signals containing information corresponding to the phase differences between each of said exit beams from corresponding ones of said predetermined optical paths of said first and second measurement legs at said wavelengths;

detecting said mixed optical signs and generating electrical interference signals containing information corresponding to the effects of the index of refraction of the gas at said different beam wavelengths and the relative physical path lengths between said first and second measurement legs and their relative rates of change; and electronically analyzing said interference electrical signals to determine the effects of said gas in said measurement leg(s) while compensating for the relative rates at which the physical path lengths of said first and second measurement legs are changing, wherein said information corresponding to said phase differences in said mixed optical signals are phase shifts $\psi_j$ related to the differences in total round-trip physical lengths pL of said measurement legs occupied by said gas according to the formulae $$\psi_j = L p k_j n_j + \zeta_j, \quad j=1,2,\ldots$$

where $k_j = 2\pi/\lambda_j$, p is the number of multiple passes through the at least one of said first and second measurement legs, and $n_j$ are the refractive indices of gas in said at least one of said measurement legs occupied by the gas corresponding to wavelength, $\lambda_j$, and $\zeta_j$ are phase offsets not associated with optical paths and wherein said electronic means is further configured and arranged to create phases $\theta$ and $\Phi$ where $$\vartheta = \left(\frac{l_1}{p}\varphi_1 + \frac{l_2}{p}\varphi_2\right), \text{ and } \Phi = \left(\frac{l_1}{p}\varphi_1 - \frac{l_2}{p}\varphi_2\right)$$

where $l_1$ and $l_2$ are non-integer values.

6. The interferometric method of claim 5 wherein the refractivity of the gas, $(n_1-1)$ is calculated using the formula:

$$n_1 - 1 = \frac{\Gamma}{\chi L[1-(K/\chi)^2]}\{[\vartheta(K/\chi) - \Phi] - Q\},$$

where
$\chi = (l_1 k_1 + l_2 k_2)/2$,
$K = (l_1 k_1 - l_2 k_2)/2$ and $$\Gamma = \frac{n_2 - 1}{n_2 - n_1},$$

the quantity $\Gamma$ being the reciprocal dispersive power of the gas which is substantially independent of environmental conditions and turbulence in the gas and the offset terms Q and $\zeta_i$ are defined as $$Q = \xi(K/\chi) - Z$$

where $$\xi = \left(\frac{l_1}{p}\zeta_1 + \frac{l_2}{p}\zeta_2\right),$$

$$Z = \left(\frac{l_1}{p}\zeta_1 - \frac{l_2}{p}\zeta_2\right)$$

with $\xi$ and Z being determinable quantities.

7. The interferometric method of claim 6 wherein said step of electronically analyzing is further performs calculating a physical distance, L, independent of the effects of the refractive index of the gas in the measurement path using the formula $$L = \frac{1}{(\chi + K)}\left\{\frac{l_1}{p}(\varphi_1 - \zeta_1) - \frac{\Gamma}{[1-(K/\chi)]}[(K/\chi)\vartheta - \Phi - Q]\right\}$$

where the ratio of the wavelengths can be expressed in terms of $(K/\chi)$ with $$\frac{\lambda_1}{\lambda_2} = \left(\frac{l_1}{l_2}\right)\left[\frac{1-(K/\chi)}{1+(K/\chi)}\right].$$

8. The interferometric method of claim 5 wherein said step of electronically analyzing further compensates for differences in group delay experienced by said electrical interference signals.

* * * * *